US008162040B2

(12) United States Patent
Briselden

(10) Patent No.: US 8,162,040 B2
(45) Date of Patent: Apr. 24, 2012

(54) HEAT EXCHANGING INSERT AND METHOD FOR FABRICATING SAME

(75) Inventor: Thomas D. Briselden, North East, PA (US)

(73) Assignee: Spinworks, LLC, North East, PA (US)

( * ) Notice: Subject to any disclaimer, the term of this patent is extended or adjusted under 35 U.S.C. 154(b) by 530 days.

(21) Appl. No.: 11/372,683

(22) Filed: Mar. 10, 2006

(65) Prior Publication Data

US 2007/0224565 A1    Sep. 27, 2007

(51) Int. Cl.
*F28D 7/12* (2006.01)
*F28F 13/12* (2006.01)

(52) U.S. Cl. ............. 165/142; 165/109.1; 165/156; 165/905

(58) Field of Classification Search ............ 165/156, 165/163, 142, 155, 109.1, 905
See application file for complete search history.

(56) References Cited

U.S. PATENT DOCUMENTS

| | | | |
|---|---|---|---|
| 612,175 A | 10/1898 | Phelps | |
| 801,296 A | 10/1905 | Bolling | |
| 1,266,478 A | 5/1918 | Hutchins | |
| 1,716,743 A | 6/1929 | Still | |
| 1,756,457 A | 4/1930 | Fourment | |
| 1,818,082 A * | 8/1931 | Mott | 165/142 |
| 1,833,876 A | 11/1931 | McGrath | |
| 1,852,489 A * | 4/1932 | Sullivan | 165/156 |
| 1,852,490 A * | 4/1932 | Sullivan | 165/156 |
| 1,932,610 A | 10/1933 | Tilley | |
| 1,959,362 A * | 5/1934 | Holzwarth | 165/142 |
| 1,961,907 A * | 6/1934 | Mott | 165/142 |
| 2,016,746 A | 10/1935 | Ireland | |
| 2,021,117 A | 11/1935 | Lucke | |
| 2,118,060 A | 5/1938 | Stone et al. | |
| 2,121,579 A * | 6/1938 | Bahls | 165/156 |
| 2,227,680 A | 1/1941 | Townsend et al. | |
| 2,230,221 A | 2/1941 | Fitch | |

(Continued)

FOREIGN PATENT DOCUMENTS

GB            795693            5/1958

(Continued)

OTHER PUBLICATIONS

"Advertisement—Save Time, Energy and Money with SpyroCor", Heat Treating Progress Magazine,(May/Jun. 2004),1 pg.

(Continued)

*Primary Examiner* — Leonard R Leo
(74) *Attorney, Agent, or Firm* — Jon L. Woodard; Jonathan M. D'Silva; MacDonald, Illig, Jones & Britton, LLP

(57) ABSTRACT

A heated energy system includes an integral ceramic insert heat exchanger having an integral ceramic construction and an outer ceramic wall that is helical in shape. When the heat exchanger is positioned within a surrounding fluid path enclosure, the outer ceramic wall forms, with the enclosure, at least one spiral path for flowing products of energy generation. No more than one insert body has an outer wall that is helical in shape that is present along the first length of the surrounding fluid path enclosure. The outer ceramic wall receives heat energy when the products of energy generation flow through the fluid path.

A method for fabricating integral ceramic insert heat exchangers includes using a tool having a silicon carbide channel and a cavity channel, the silicon carbide channel extending at least partially outside the cavity channel in directions defined by a rotational plane of the tool.

54 Claims, 31 Drawing Sheets

U.S. PATENT DOCUMENTS

| | | | |
|---|---|---|---|
| 2,234,423 A | 3/1941 | Wittmann | |
| 2,244,800 A | 6/1941 | Pascale | |
| 2,245,069 A | 6/1941 | Clarke | |
| 2,247,243 A | 6/1941 | Kritzer | |
| 2,360,094 A | 10/1944 | Arvins et al. | |
| 2,432,308 A | 12/1947 | Goodyer | |
| 2,449,822 A * | 9/1948 | Schibbye | 165/163 |
| 2,463,997 A | 3/1949 | Rodgers | |
| 2,613,066 A | 10/1952 | Newlin | |
| 2,801,831 A * | 8/1957 | Clarkson | 165/142 |
| 2,895,508 A | 7/1959 | Drake | |
| 2,993,682 A | 7/1961 | Huet | |
| 3,015,355 A | 1/1962 | Humphrey | |
| 3,022,049 A | 2/1962 | Abbott | |
| 3,071,159 A | 1/1963 | Coraggioso | |
| 3,128,821 A | 4/1964 | Andersen | |
| 3,174,319 A | 3/1965 | Koyama et al. | |
| 3,267,564 A | 8/1966 | Keyes | |
| 3,295,599 A | 1/1967 | Okamoto | |
| 3,360,036 A * | 12/1967 | Holyfield | 165/142 |
| 3,360,040 A | 12/1967 | Kritzer | |
| 3,394,736 A | 7/1968 | Pearson | |
| 3,407,871 A | 10/1968 | Penney | |
| 3,422,518 A | 1/1969 | French | |
| 3,495,939 A | 2/1970 | Forrest | |
| 3,596,495 A | 8/1971 | Huggins | |
| 3,622,403 A | 11/1971 | French, II | |
| 3,636,982 A | 1/1972 | Drake | |
| 3,662,582 A | 5/1972 | French | |
| 3,681,936 A * | 8/1972 | Park | 165/142 |
| 3,696,863 A | 10/1972 | Kim | |
| 3,730,229 A | 5/1973 | D'Onofrio | |
| 3,731,732 A | 5/1973 | Awe et al. | |
| 3,750,709 A | 8/1973 | French | |
| 3,752,228 A | 8/1973 | Bosse | |
| 3,768,291 A | 10/1973 | Rieger | |
| 3,776,018 A | 12/1973 | French | |
| 3,779,312 A | 12/1973 | Withers, Jr. et al. | |
| 3,847,212 A | 11/1974 | Withers, Jr. et al. | |
| 3,861,462 A | 1/1975 | McLain | |
| 3,865,184 A | 2/1975 | Grover | |
| 3,870,081 A | 3/1975 | Kleppe et al. | |
| 3,882,210 A | 5/1975 | Crossley et al. | |
| 3,885,622 A | 5/1975 | McLain | |
| 3,897,821 A | 8/1975 | Babunovic et al. | |
| 3,902,552 A | 9/1975 | McLain | |
| 3,906,605 A | 9/1975 | McLain | |
| 3,951,587 A | 4/1976 | Allegro et al. | |
| 3,954,097 A * | 5/1976 | Wilson, Jr. | 165/142 |
| 4,007,774 A | 2/1977 | Withers | |
| 4,031,602 A | 6/1977 | Cunningham et al. | |
| 4,090,558 A | 5/1978 | Akama | |
| 4,098,332 A | 7/1978 | Bratthall et al. | |
| 4,113,009 A | 9/1978 | Meyer et al. | |
| 4,153,035 A | 5/1979 | Stiasny | |
| 4,154,296 A | 5/1979 | Fijas | |
| 4,154,787 A | 5/1979 | Brown | |
| 4,163,474 A | 8/1979 | MacDonald et al. | |
| 4,186,779 A | 2/1980 | Wagner | |
| 4,190,105 A | 2/1980 | Dankowski | |
| 4,194,560 A | 3/1980 | Matsuzaki | |
| 4,206,806 A | 6/1980 | Togashi | |
| 4,216,575 A | 8/1980 | Carnavos et al. | |
| 4,227,572 A | 10/1980 | Harlan | |
| 4,228,852 A | 10/1980 | Togashi | |
| 4,245,697 A | 1/1981 | Togashi | |
| 4,258,782 A | 3/1981 | Kao | |
| 4,265,843 A | 5/1981 | Dias et al. | |
| 4,283,824 A | 8/1981 | Schatz et al. | |
| 4,286,655 A | 9/1981 | Trojani | |
| 4,296,539 A | 10/1981 | Asami | |
| 4,300,630 A | 11/1981 | Trojani | |
| 4,305,460 A | 12/1981 | Yampolsky | |
| 4,306,619 A | 12/1981 | Trojani | |
| 4,330,036 A | 5/1982 | Satoh | |
| 4,345,644 A | 8/1982 | Dankowski | |
| 4,351,389 A | 9/1982 | Guarnaschelli | |
| 4,368,777 A | 1/1983 | Grasso | |
| 4,368,779 A | 1/1983 | Rojey et al. | |
| 4,369,837 A | 1/1983 | Moranne | |
| 4,373,578 A | 2/1983 | Saperstein et al. | |
| 4,393,926 A | 7/1983 | Appel | |
| 4,559,998 A | 12/1985 | Counterman | |
| 4,589,481 A | 5/1986 | Mansson | |
| 4,589,844 A | 5/1986 | Loukas et al. | |
| 4,655,282 A | 4/1987 | Roffelsen | |
| 4,685,514 A | 8/1987 | Brown | |
| 4,700,749 A | 10/1987 | Cadars | |
| 4,706,355 A | 11/1987 | Kuhns et al. | |
| 4,761,982 A | 8/1988 | Snyder | |
| 4,789,506 A | 12/1988 | Kasprzyk | |
| 4,798,241 A | 1/1989 | Jarrett et al. | |
| 4,809,415 A | 3/1989 | Okayama et al. | |
| 4,821,389 A | 4/1989 | Nelson | |
| 4,821,795 A | 4/1989 | Lu | |
| 4,823,865 A | 4/1989 | Hughes | |
| 4,832,114 A | 5/1989 | Yeh | |
| 4,847,051 A * | 7/1989 | Parenti, Jr. | 165/156 |
| 4,915,164 A | 4/1990 | Harper, Jr. | |
| 5,167,275 A | 12/1992 | Stokes et al. | |
| 5,238,057 A * | 8/1993 | Schelter et al. | 165/905 |
| 5,339,654 A | 8/1994 | Cook et al. | |
| 5,340,664 A | 8/1994 | Hartvigsen | |
| 5,655,599 A | 8/1997 | Kasprzyk | |
| 5,954,128 A * | 9/1999 | Harkins et al. | 165/142 |
| 5,960,870 A | 10/1999 | Takahashi et al. | |
| 6,029,647 A | 2/2000 | Pisano et al. | |
| 6,484,795 B1 | 11/2002 | Kasprzyk | |
| 6,533,030 B2 | 3/2003 | Mitrovic et al. | |

FOREIGN PATENT DOCUMENTS

| | | |
|---|---|---|
| SU | 840662 | 6/1981 |
| WO | WO 8103539 A1 * | 12/1981 |

OTHER PUBLICATIONS

Bergles, A. E., et al., "Description of Enhancement Techniques", *Literature Review of Heat Transfer Enhancement Technology for Heat Exchangers in Gas-Fire Applications*, (Jun. 1991), 71 pgs.

Bergles, A. E, et al., "Recent Developments From the Patent Literature", *Literature Review of Heat Transfer Enhancement Technology for Heat Exchangers in Gas-Fired Application*, (Jun. 1991), 46 pgs.

Kasprzyk, Michael C., "Why Composite Radiant Tubes?", Heat Treating Progress Magazine,(May/Jun. 2004), 3 pgs.

Wuenning, Joachim G., "Gas Fired Radiant Tube Heating Systems", *Heat Treating Progress Magazine*, (Sep./Oct. 2005), 5 pgs.

Briselden, Tom, Intermediate X-Carbide Metal Infiltrated Heat Exchanger for Framatome High Temperature Reactor, Jun. 2010.

* cited by examiner

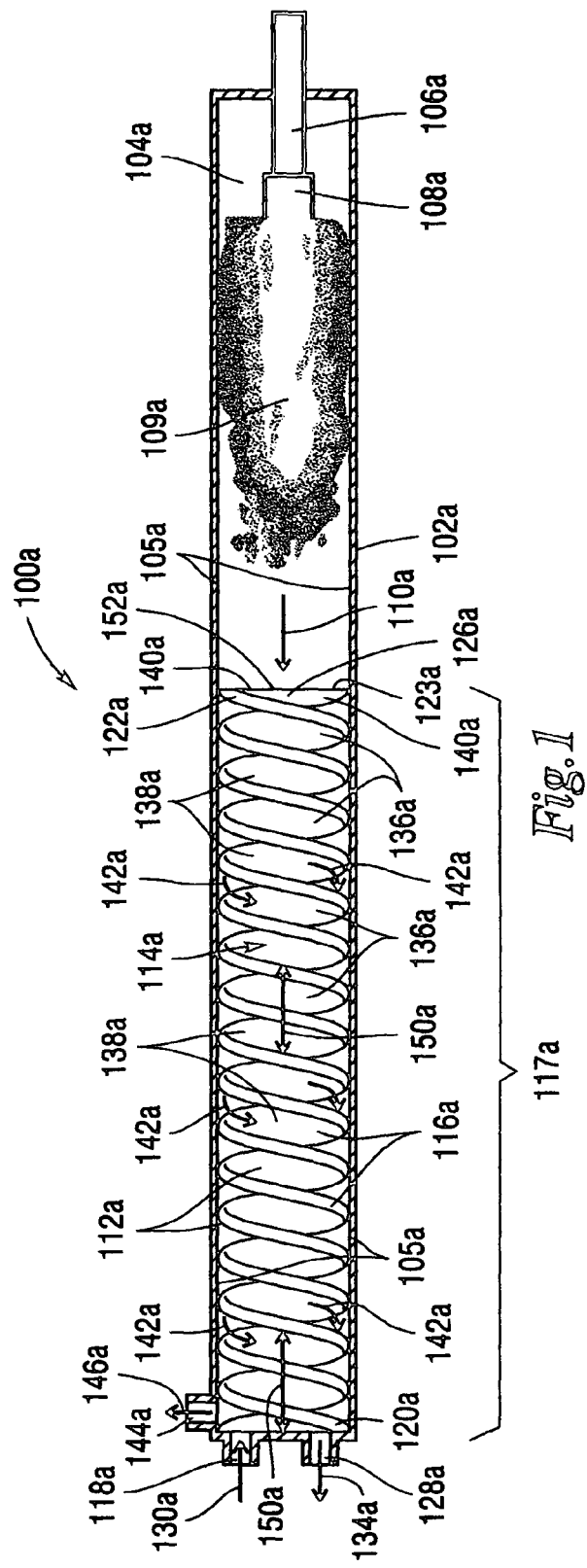

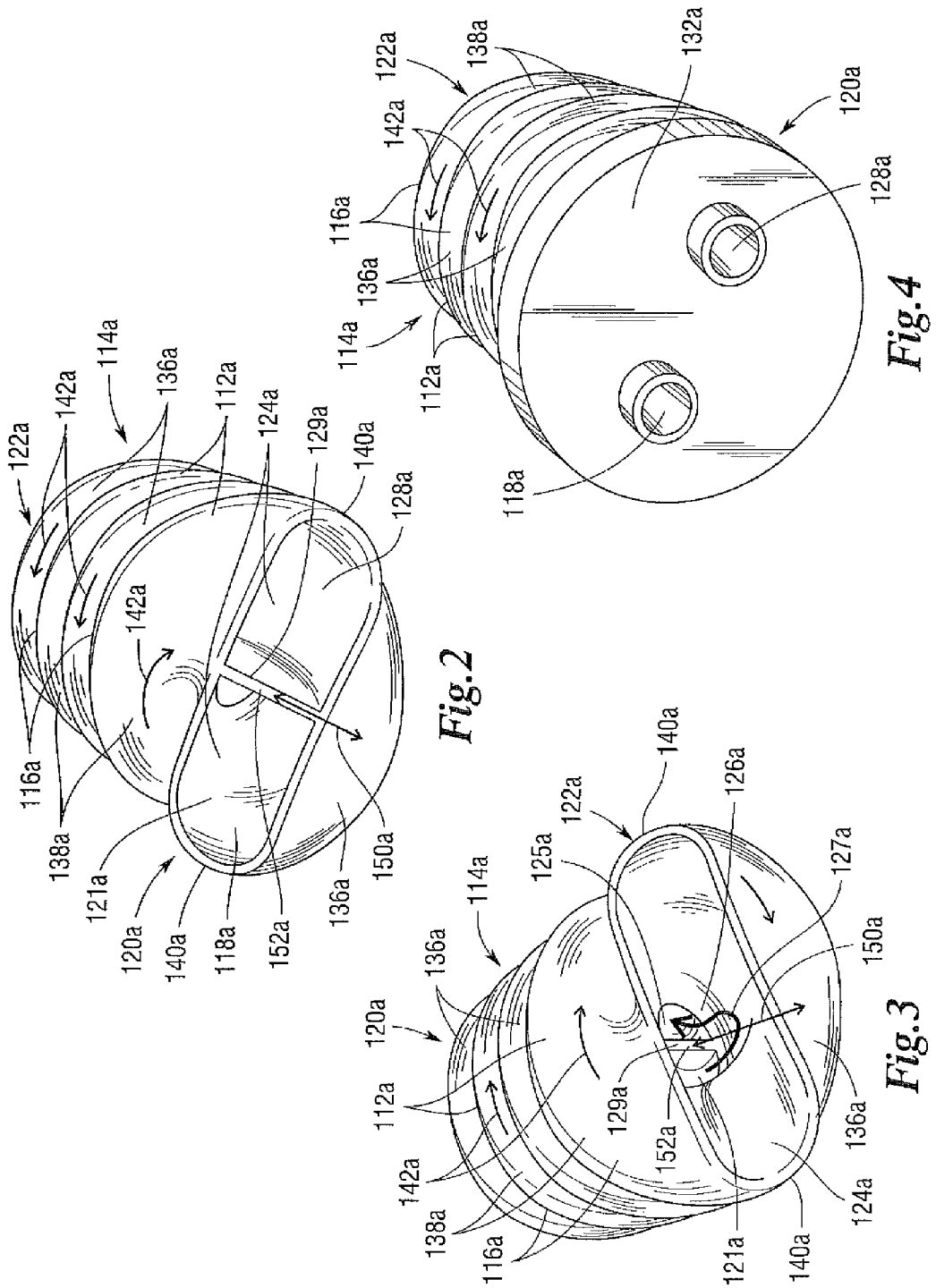

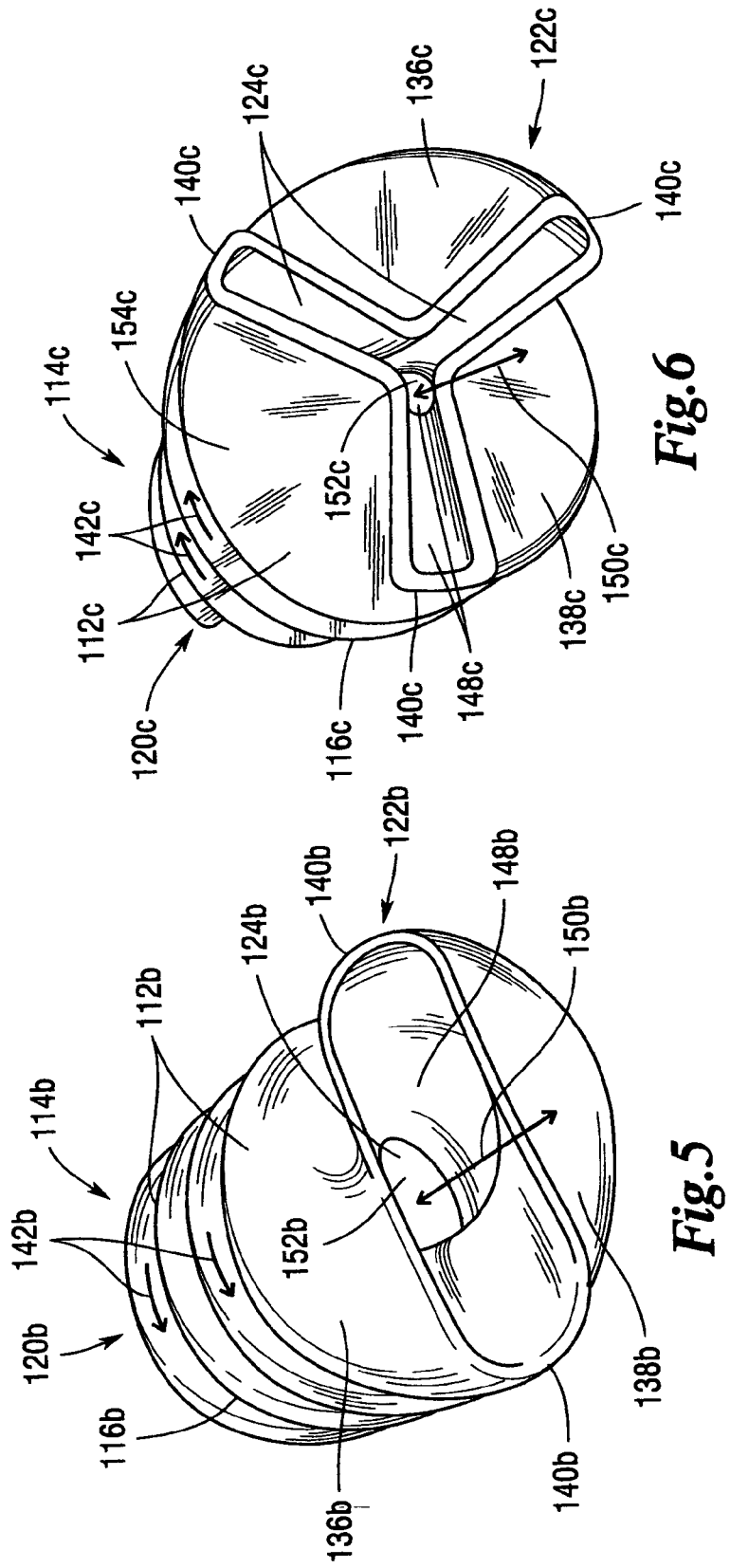

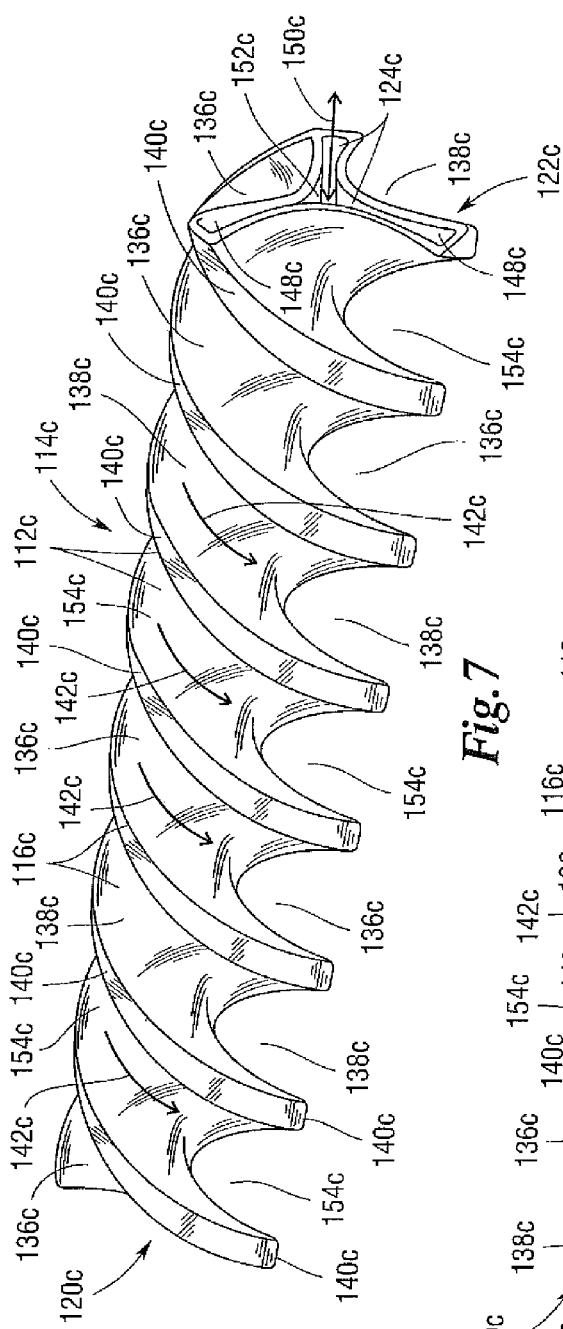
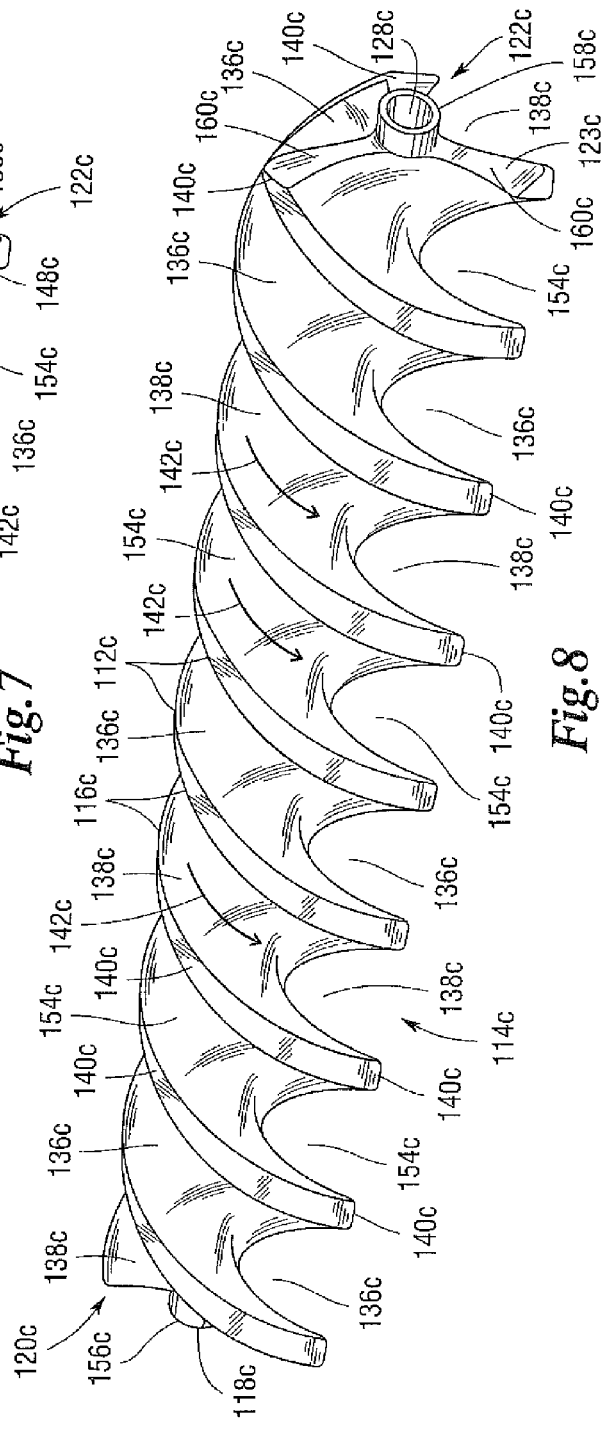

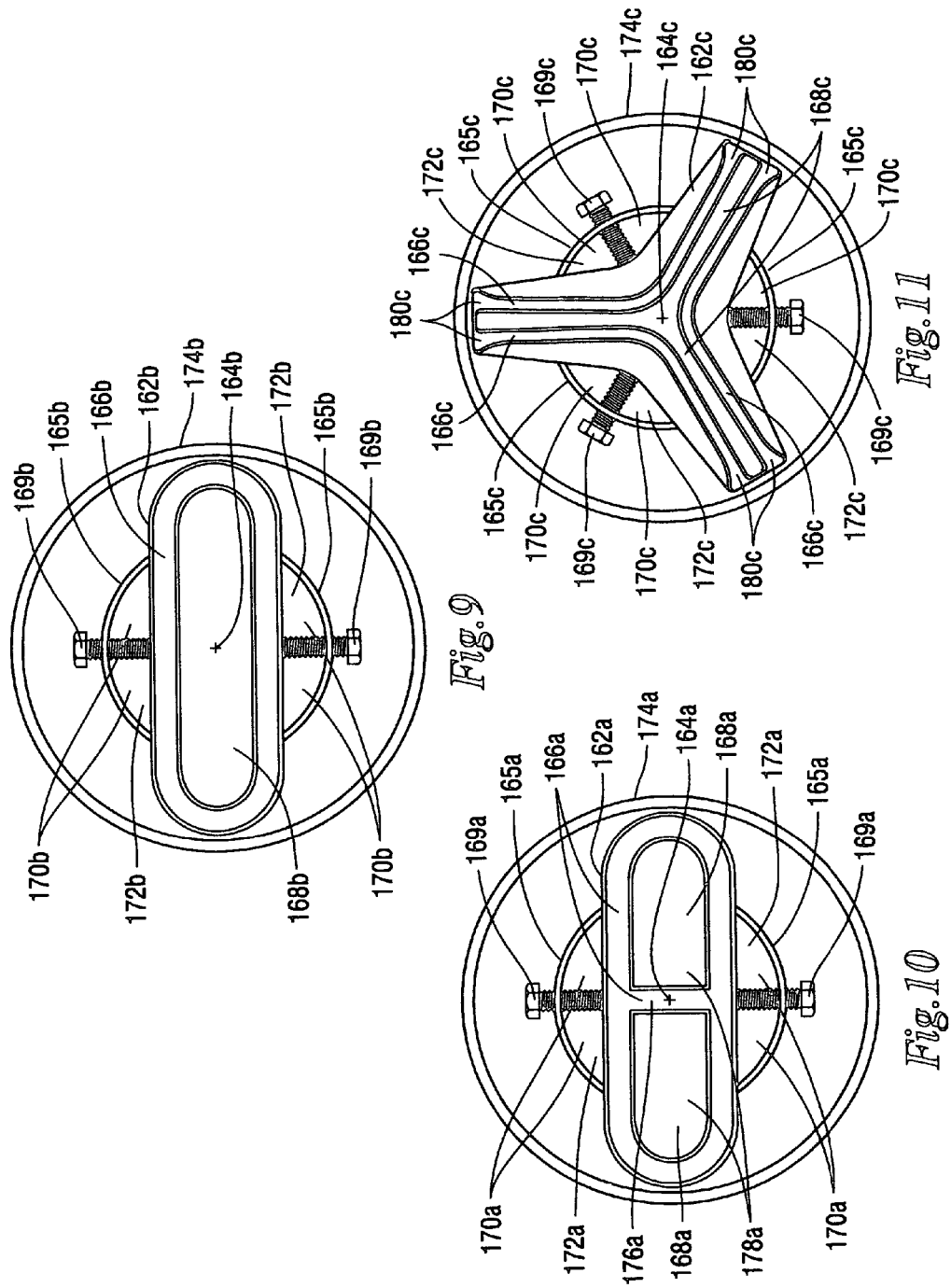

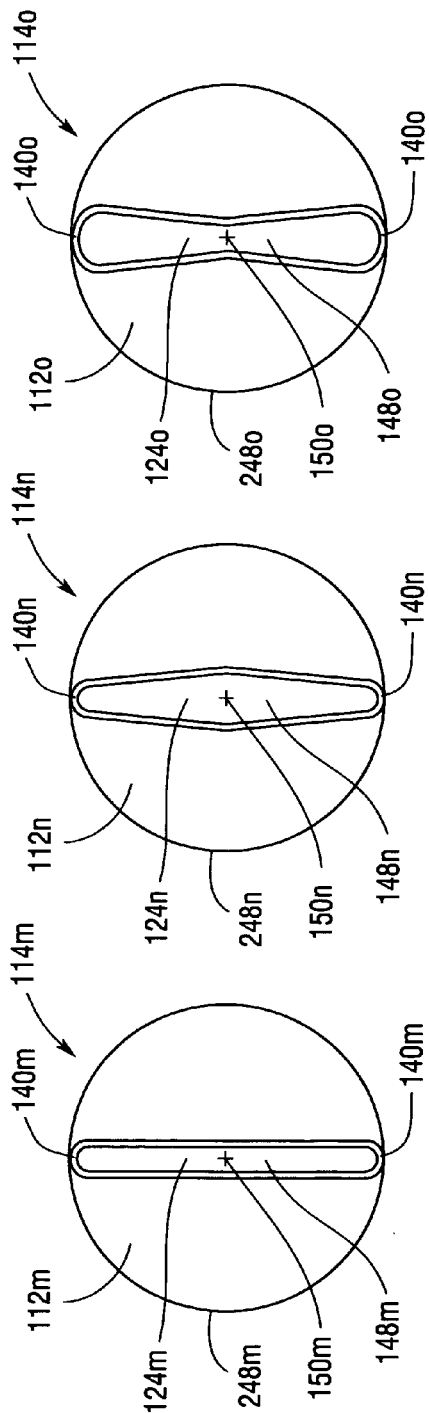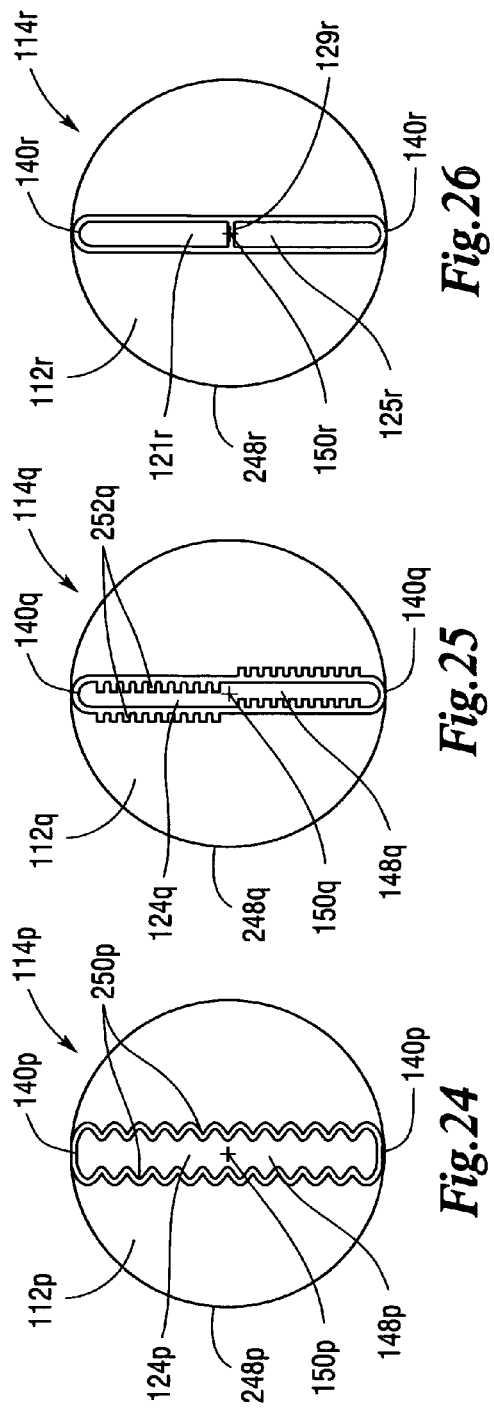

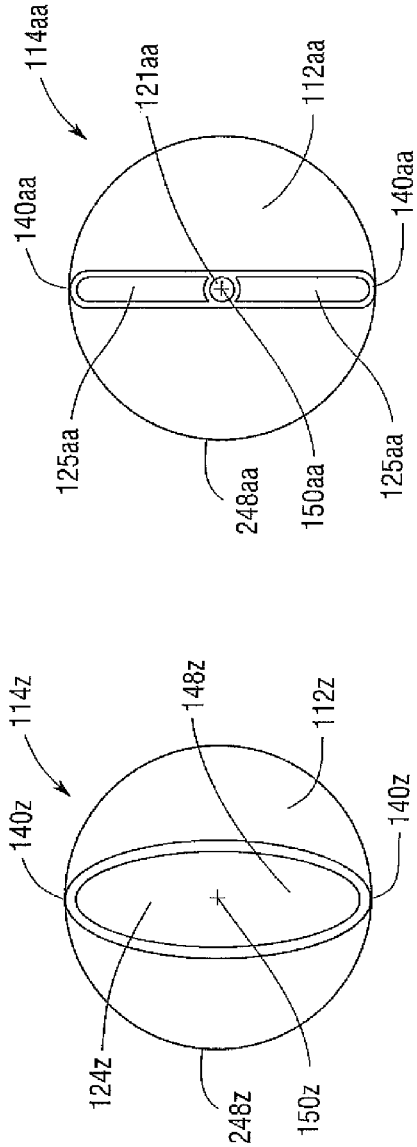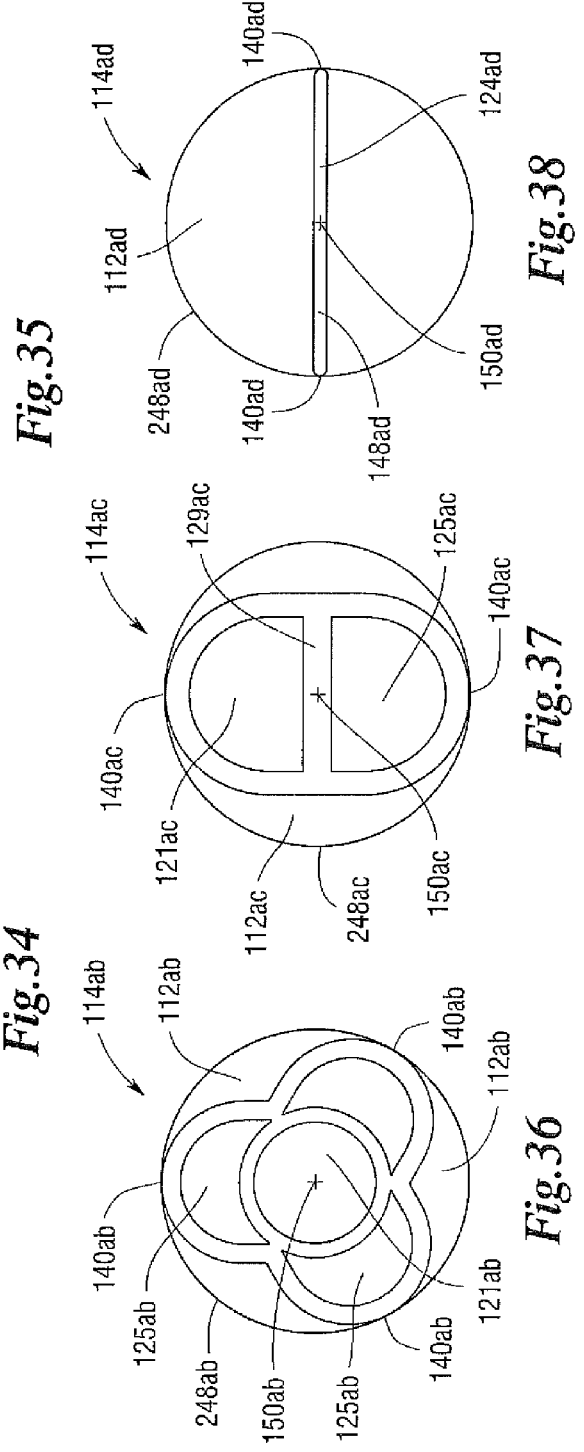

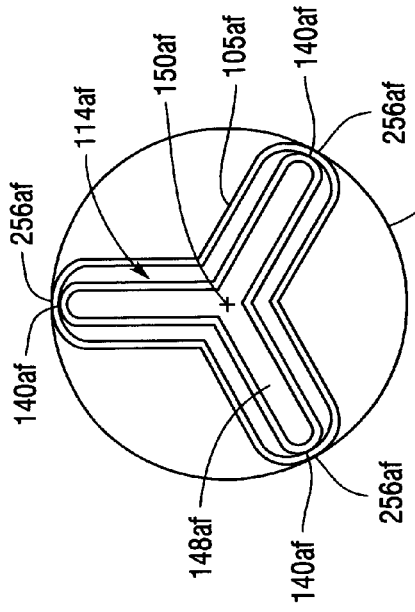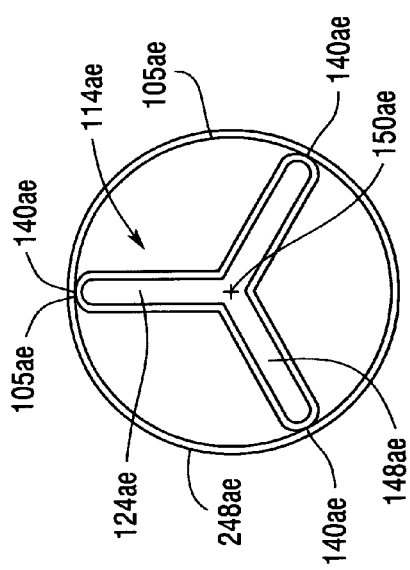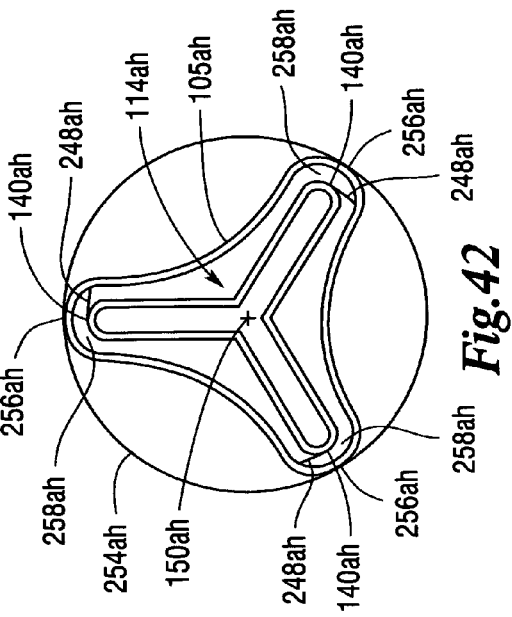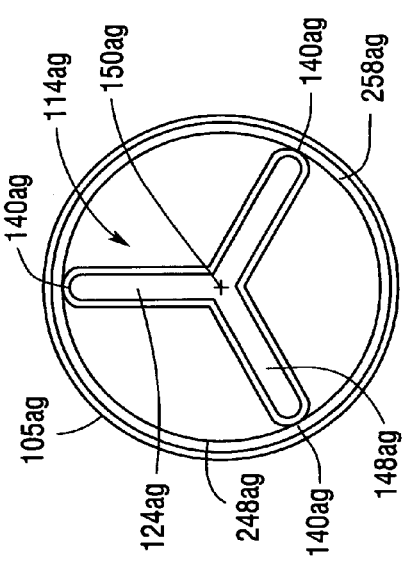

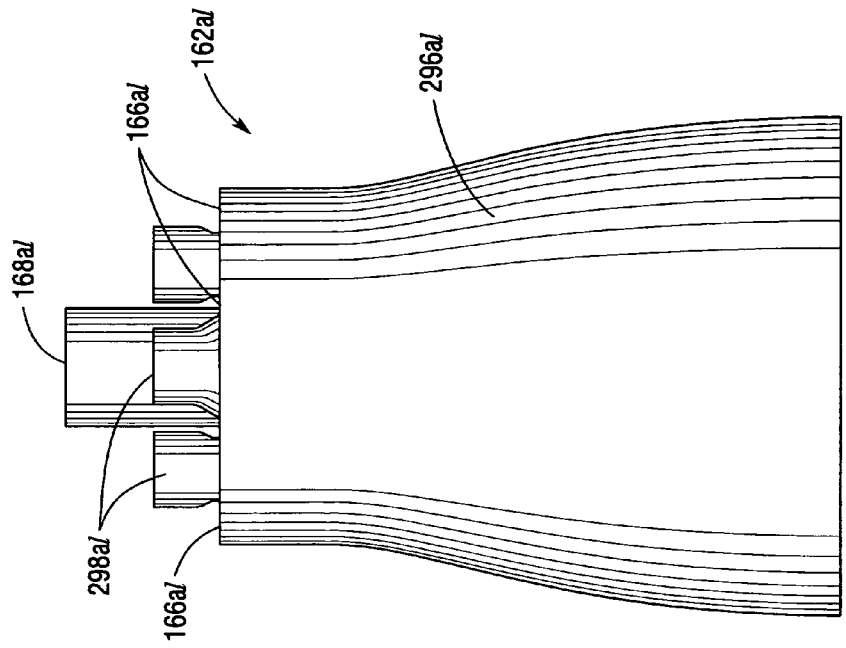
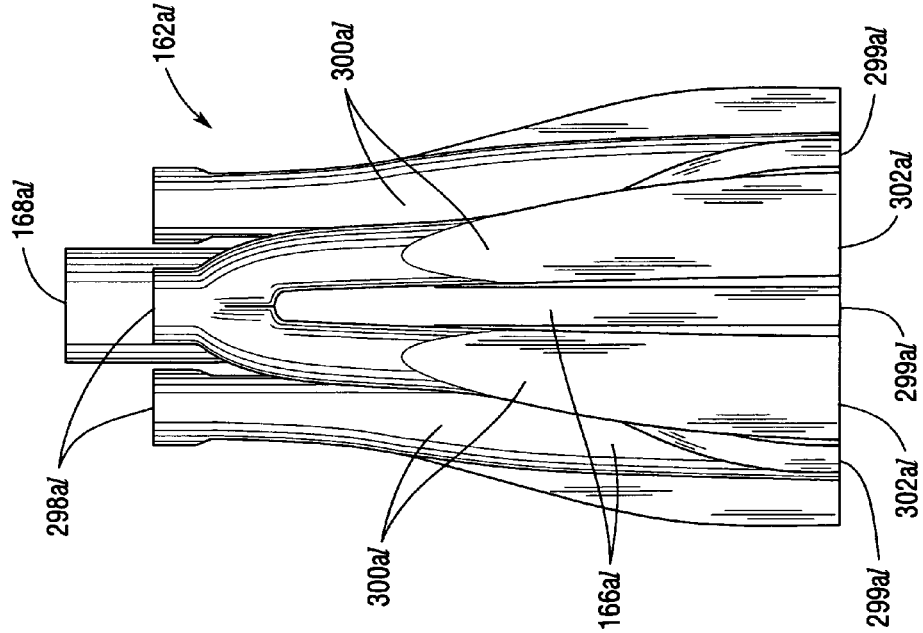

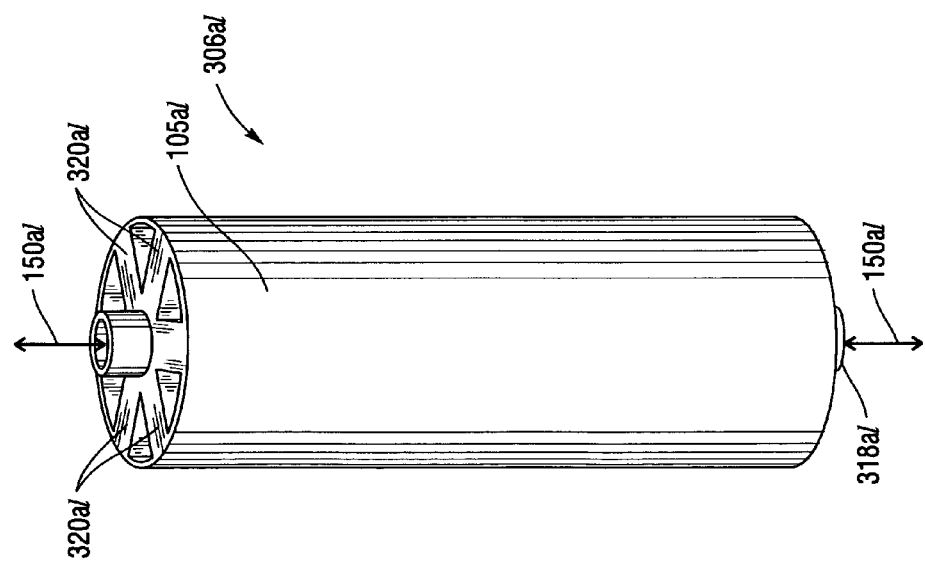
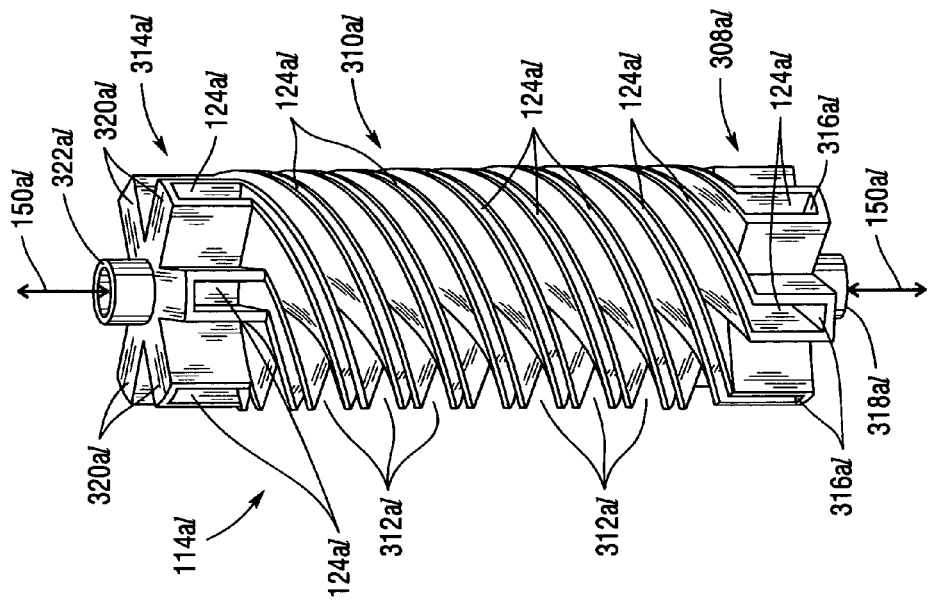
Fig.47B
Fig.47A

HEAT EXCHANGING INSERT AND METHOD FOR FABRICATING SAME

BACKGROUND

Helically shaped inserts are frequently added to heated energy systems, such as furnaces, boilers, and other systems that use radiant tubes, and to catalytic systems, to fuel cells, and to other systems that convert hydrocarbon fuels into usable forms of energy. The addition of helical inserts is advantageous for many reasons, which include enhanced fluid channeling, uniformity of heat transfer and radiation, the moderation of fluid flow and energy-producing reactions, the control and enhancement of energy-producing reactions, system structural enhancement, and increased system efficiency.

Helical inserts are typically positioned within heated energy systems to interact with and/or to be exposed to the products of energy generation, such as combusted hydrocarbon fuel, steam, hydrogen, nitrogen, carbon dioxide, and the products of catalytic reactions, subjecting the inserts to high temperature environments. Heated energy systems often have operating temperatures in the approximate range of about 600° to 2500° F. Inserts must therefore normally be capable of withstanding such high temperature environments.

If heat produced by energy-producing reactions within a system is not properly radiated, captured or recycled due to an inefficiency of the helical insert or of the system as a whole, an undue amount of energy may be lost and wasted or possibly result in a lack of control, economy, or operability of the system. Therefore, when helical inserts are incorporated into energy systems and positioned in the vicinities of high levels of heat energy, helical inserts can also be configured to function as components of heat exchanging systems that absorb and productively use the heat energy produced. This type of insert is often referred to as a heat exchanger. Typically, a heat exchanger will be either fabricated or modified to include a fluid inlet to allow for the entry of a heat exchanging fluid, a fluid channel to allow for the transfer of heat energy to the heat exchanging fluid through the heat exchanger's outer walls, and a fluid outlet to allow for the expulsion of heated heat exchanging fluid. Heat exchanging is normally performed in a manner that prevents the mixing of the heat exchanging fluid and the products of energy generation while the heat exchanging fluid is within the heat exchanger.

Ceramics have been used as construction materials for non-heat exchanging inserts in some systems due to the natural capability of ceramics to withstand high temperature environments. Ceramic inserts are advantageous in that they generally experience less thermal expansion than do other materials when subjected to significant temperature changes. The reduced thermal expansion rates of ceramics can also enhance the ability of a helical insert to match and couple with other system components, reducing thermally-induced stresses that can be associated with intercomponent couplings during high temperature operating conditions.

Helical heat exchangers that have been incorporated into heated energy systems have been constructed of metal materials, such as nickel-chrome alloy. One reason for this is that metals are much easier to fabricate into helically twisted shapes, especially for simple, low twist geometries that allow the efficient exchanging of heat energy to a heat exchanging fluid flowing within the heat exchangers. However, metals exhibit far greater levels of thermal expansion and operate at lower temperatures than do their ceramic counterparts. These characteristics can potentially limit the ability of a metal helical insert to function without adversely affecting other components of a heated energy system.

Although both ceramic and metal materials can pose difficulties in the fabrication of helical inserts that require highly complex shaping, it is believed that ceramics generally allow for greater flexibility than metals in the fabrication of complex insert shapes. Thus, ceramic insert fabrication techniques are often preferred where it is feasible to use them.

When multiple helical inserts are used in a heated energy system, the positioning of multiple inserts that are parallel to each other at a particular location along a single path of products of energy generation can be problematic. In general, overall tooling costs are higher for multiple parallel helical inserts. For example, if multiple parallel inserts are formed or manufactured simultaneously, costly additional or repetitive fabrication equipment may be required which complicate manufacturing processes. Tooling and production costs are also often higher as a result.

If multiple parallel helical heat exchangers are manufactured individually, but are later coupled and/or manifolded in parallel, such coupling and/or manifolding typically results in substantial increases in apparatus cost. Since coupling and/or manifolding components are frequently made of metal, the above-noted problems associated with metal thermal expansion can also have adverse effects on the heated energy system. For example, intercomponent thermal expansion could result in some components breaking or cracking, and if heat exchanging fluid is being used, loss or leakage of fluid from the insert or contamination of the heat exchanging fluid by the products of energy generation.

After a helical insert is fabricated and implemented within a heated energy system, the interaction of the insert with the energy system depends on factors such as insert size, insert shape, the relative positioning of the insert within the system, and the manner in which the insert is configured to interact with energy-producing reactions and/or with the products of those reactions. The presence of multiple parallel helical inserts can cause products of energy generation to migrate or be shared between multiple helical paths, reducing the overall interaction with individual inserts and reducing the efficiency of heat radiation and/or heat transfer in heat exchanging processes. Thus, to maximize heat transfer to a heat exchanging fluid, it is considered advantageous to require products of energy generation to flow through the spiral paths as few helical heat exchangers as possible along a particular length of a fluid path for products of energy generation, while still effectively operating the heat exchanging system.

SUMMARY

A heated energy system, having a fluid path for products of energy generation that is located within a surrounding fluid path enclosure, includes an integral ceramic insert heat exchanger. The insert heat exchanger includes an insert body having an integral ceramic construction and an outer ceramic wall that is helical in shape and that allows for conductive heat transfer through the outer ceramic wall. When the heat exchanger is positioned within the surrounding fluid path enclosure, the outer ceramic wall forms, with the enclosure, at least one spiral path for flowing products of energy generation.

The insert body is located along a first length of the surrounding fluid path enclosure. No more than one insert body has an outer wall that is helical in shape that is present along the first length of the surrounding fluid path enclosure. The outer ceramic wall of the insert body is positioned to be exposed to and to receive heat energy from the products of energy generation when the products flow through the fluid path.

The insert body includes a fluid inlet to allow for the entry of a heat transfer fluid in the insert body. An internal ceramic fluent channel within the ceramic insert body allows for the absorption of heat energy produced by the products of energy generation through the insert body to the heat transfer fluid. A fluid outlet allows for the expulsion of the heat transfer fluid after the heat transfer fluid has absorbed the heat energy through the insert body while in the ceramic fluent channel. The fluid inlet, ceramic fluent channel, and fluid outlet are positioned to allow the heat transfer fluid to absorb heat energy from the products of energy generation without allowing the products to come into contact with the heat transfer fluid before the heat transfer fluid is expelled from the fluid outlet.

A method for fabricating the integral ceramic insert heat exchangers for such heated energy systems includes the use of a tool having a rotational axis and a rotational plane, the rotational axis being about normal to the rotational plane. The tool has a silicon carbide channel and a cavity channel, the silicon carbide channel extending at least partially outside the cavity channel in directions that are defined by the rotational plane of the tool. The tool is rotatable about its rotational axis in the rotational plane. The tool is also movable axially along the rotational axis. A reclaim channel is provided which is movable with the tool when the tool moves along the rotational axis.

A container is provided for receiving cavity fill and silicon carbide powder and resin from the tool and for receiving loose fill from the reclaim channel. The tool is extendable into the container. From the tool, cavity fill flows through the cavity channel, silicon carbide powder and resin flow through the silicon carbide channel, and loose fill flows through the reclaim channel, while the tool is rotated about its rotational axis and moved axially along the rotational axis to fill the container with a column of cavity fill, a helical column of silicon carbide powder and resin, and a column of loose fill. This results in the column of cavity fill being surrounded by the helical column of silicon carbide powder and resin in directions defined by the rotational plane. This also results in the helical column of silicon carbide powder and resin being surrounded by the column of loose fill in directions defined by the rotational plane.

The helical column of silicon carbide powder and resin is heated to a resin-binding temperature that is lower than a silicon-melting temperature to cause the resin in the helical column of silicon carbide powder and resin to bind the silicon carbide powder together. The column of loose fill is removed from surrounding the column of silicon carbide powder and resin. The column of cavity fill is removed from being surrounded by the helical column of silicon carbide powder and resin to form a fluent channel that is surrounded by the column of silicon carbide and resin in directions defined by the rotational plane, with the column of silicon carbide powder and resin being heated in the presence of silicon powder to the silicon-melting temperature that is lower than a silicon-wicking temperature to melt the silicon powder to molten silicon.

The column of silicon carbide powder and resin and the molten silicon are heated to the silicon-wicking temperature to cause distribution of the molten silicon throughout the column of silicon carbide powder and resin. This causes the silicon carbide powder to bind into an integral ceramic insert heat exchanger of at least silicon carbide and silicon, the insert heat exchanger retaining the fluent channel.

Those skilled in the art will realize that this invention is capable of embodiments that are different from those shown and that details of the disclosed heated energy system, integral ceramic insert heat exchanger, and method of fabrication can be changed in various manners without departing from the scope of this invention. Accordingly, the following drawings and descriptions are to be regarded as including such equivalents as do not depart from the spirit and scope of the invention.

BRIEF DESCRIPTION OF THE DRAWINGS

For a more complete understanding and appreciation of this invention, and many of its advantages, reference will be made to the following detailed description taken in conjunction with the accompanying drawings.

FIG. 1 is partial side cross sectional view of a heated energy system of the invention;

FIG. 2 is perspective view of an integral ceramic insert heat exchanger of the invention;

FIG. 3 is a partial cross sectional perspective view of the integral ceramic insert heat exchanger of FIG. 2;

FIG. 4 is a perspective view of the integral ceramic insert heat exchanger of FIG. 2 with a manifold attached to the connection end;

FIG. 5 is a partial cross sectional perspective view of an integral ceramic insert heat exchanger of the invention;

FIG. 6 is a partial cross sectional perspective view of an integral ceramic insert heat exchanger of the invention;

FIG. 7 is a partial cross sectional side perspective view of the integral ceramic insert heat exchanger of FIG. 6;

FIG. 8 is a side perspective view of the integral ceramic insert heat exchanger of FIG. 6;

FIG. 9 is a bottom cross sectional view of a container for receiving cavity fill and a bottom view of a tool positioned on a funnel tube according to one embodiment of the invention;

FIG. 10 is a bottom cross sectional view of a container for receiving cavity fill and a bottom view of a tool positioned on a funnel tube according to one embodiment of the invention;

FIG. 11 is a bottom cross sectional view of a container for receiving cavity fill and a bottom view of a tool positioned on a funnel tube according to one embodiment of the invention;

FIG. 21 depicts a cross sectional end view of an insert heat exchanger of the invention;

FIG. 22 depicts a cross sectional end view of an insert heat exchanger of the invention;

FIG. 23 depicts a cross sectional end view of an insert heat exchanger of the invention;

FIG. 24 depicts a cross sectional end view of an insert heat exchanger of the invention;

FIG. 25 depicts a cross sectional end view of an insert heat exchanger of the invention;

FIG. 26 depicts a cross sectional end view of an insert heat exchanger of the invention;

FIG. 34 depicts a cross sectional end view of an insert heat exchanger of the invention;

FIG. 35 depicts a cross sectional end view of an insert heat exchanger of the invention;

FIG. 36 depicts a cross sectional end view of an insert heat exchanger of the invention;

FIG. 37 depicts a cross sectional end view of an insert heat exchanger of the invention;

FIG. 38 depicts a cross sectional end view of an insert heat exchanger of the invention;

FIG. 39 depicts a cross sectional end view of an insert heat exchanger and surrounding fluid path enclosure of the invention;

FIG. 40 depicts a cross sectional end view of an insert heat exchanger and surrounding fluid path enclosure of the invention;

FIG. 41 depicts a cross sectional end view of an insert heat exchanger and surrounding fluid path enclosure of the invention;

FIG. 42 depicts a cross sectional end view of an insert heat exchanger and surrounding fluid path enclosure of the invention;

FIG. 46C is a side view of the tool of FIG. 46A with the outer bell funnel of the tool removed;

FIG. 46D is a side view of the tool of FIG. 46A, the outer bell funnel of the tool being shown;

FIG. 47A depicts an exterior perspective view of a unitary ceramic component fabricated by the tool of FIGS. 46A and B;

FIG. 47B depicts an interior view of the unitary ceramic component of FIG. 47A with its surrounding fluid path enclosure removed;

DETAILED DESCRIPTION

Figure 12A:
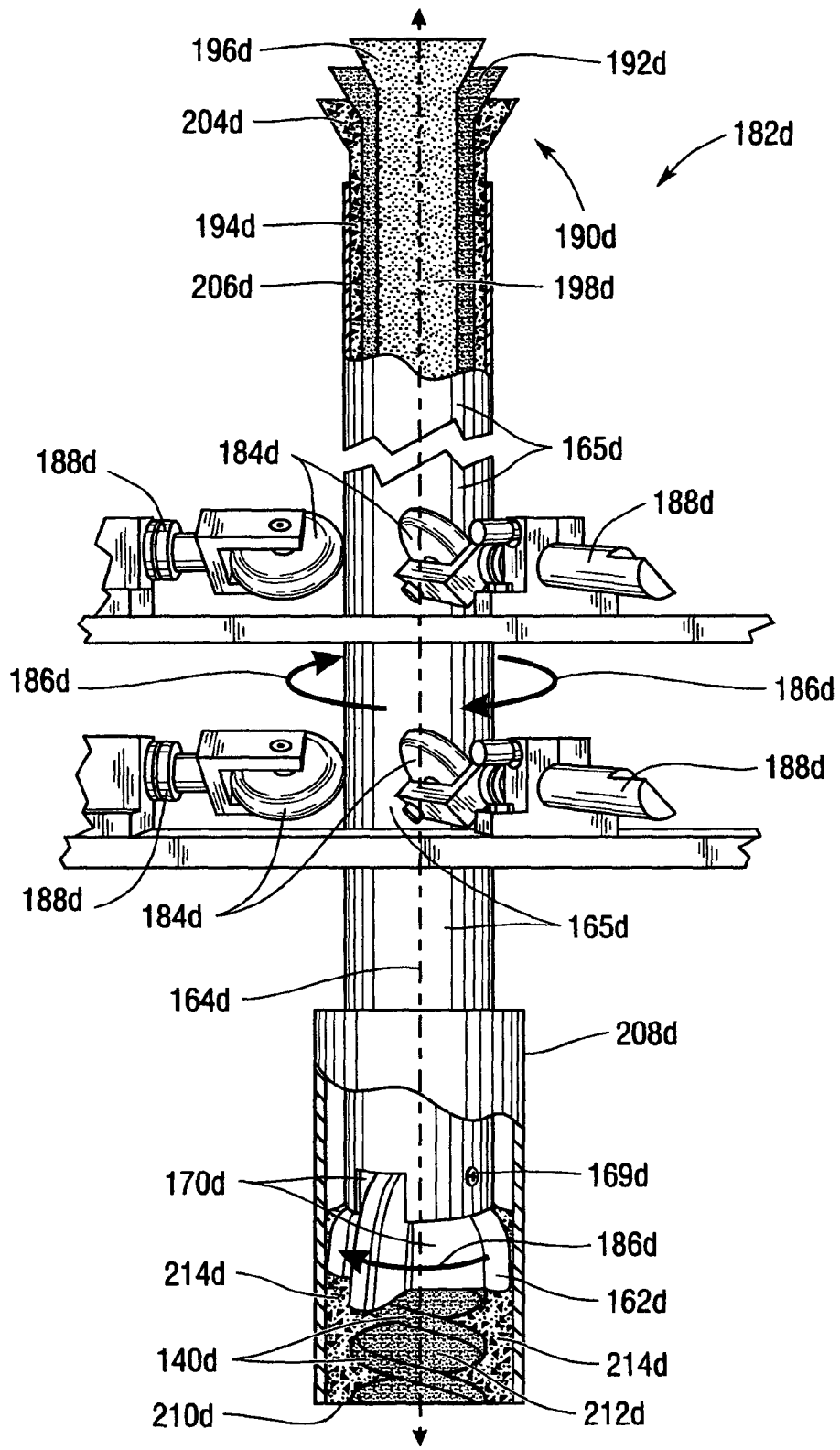
FIG. 12A depicts a partial cross sectional side view of a forming machine for fabricating insert heat exchangers according to the invention.

Referring to the drawings, similar reference numerals are used to designate the same or corresponding parts throughout the several embodiments and figures. Specific embodiment variations in corresponding parts are denoted with the addition of lower case letters.

FIG. 1 depicts a side cross sectional view of a heated energy system 100a of the invention that includes a radiant tube 102a having a combustion chamber 104a and a surrounding fluid path enclosure 105a. Fuel, such as natural gas or other combustible fluid and an oxidant such as air enters the radiant tube 102a through an inlet 106a and is ignited with a burner 108a. The combusting fuel 109a produces products of energy generation within the combustion chamber 104a, the products including at least partially combusted fuel gases possessing substantial heat energy. The products travel through the surrounding fluid path enclosure 105a in a downstream direction 110a and contact and interact with the outer ceramic wall 112a of an integral ceramic insert heat exchanger 114a. In some embodiments, the insert heat exchanger 114a may be positioned sufficiently close to the combusting fuel 109a and oxidant or at another selected location within the surrounding fluid path enclosure 105a or radiant tube 102a that the insert heat exchanger 114a enhances fuel combustion or heat radiation processes.

FIG. 2 is a perspective view of the heat exchanger 114a of FIG. 1, viewed from a connection end 120a of the heat exchanger 114a. FIG. 3 is a cutaway perspective view of a distal end 122a of the heat exchanger 114a of FIG. 1, with a distal tip 123a (not shown in FIG. 3) removed to depict an internal ceramic fluent channel 124a contained within the insert body 116a. The insert heat exchanger 114a includes an insert body 116a having an integral ceramic construction, the outer ceramic wall 112a being helical in shape. No more than one insert body 116a is present along a first length 117a of the surrounding fluid path enclosure 105a, the first length 117a extending from about the connection end 102a to about the distal end 122a of the heat exchanger 114a.

As is best understood with a comparison of FIGS. 1, 2, and 3, the fluent channel 124a includes a counter flow path 121a that extends from a fluid inlet 118a at the connection end 120a of the heat exchanger 114a to the distal end 122a. The counter flow path 121a terminates at the distal end 122a of the heat exchanger 114a at a return point 126a. At the return point 126a, the counter flow path 121a opens into a parallel flow path 125a. Thus, the fluent channel 124a continues around the return point 126a, as indicated with flow arrow 127a, into the parallel flow path 125a, which extends back through the heat exchanger 112a to a fluid outlet 128a that is located at the connection end 120a of the heat exchanger 114a. An inter path divider 129a separates the counter flow path 121a from the parallel flow path 125a along much of the length of the heat exchanger 114a.

The fluent channel 124a allows for accommodation of a liquid or gaseous heat transfer fluid. Referring briefly to FIG. 4, a manifold 132a can be positioned at the connection end 120a of the heat exchanger 114a. The manifold 132a extends the fluid inlet 118a and fluid outlet 128a to extend outside of the radiant tube 102a to allow channeling of the heat transfer fluid, as best understood by comparing FIG. 4 with FIG. 1. As depicted with an inlet flow arrow 130a in FIG. 1, the heat transfer fluid is therefore allowed to enter the heat exchanger 114a from the outside of the radiant tube 102a through the fluid inlet 118a. Comparing FIGS. 1 and 2 with FIG. 3, the heat transfer fluid flows through the fluent channel 124a of the insert heat exchanger 114a by entering through the fluid inlet 118a into the counter flow path 121a and flowing to the return point 126a at the distal end 122a of the heat exchanger 114a. At the return point 126a, the heat transfer fluid then enters the parallel flow path 125a of the fluent channel 124a, as depicted with the return flow arrow 129 of FIG. 3. After entering the parallel flow path 125a, the heat transfer fluid flows back through the heat exchanger 114a to the fluid outlet 118a, which allows for the expulsion of the heat transfer fluid from the heat exchanger 114a, the heat transfer fluid exiting the radiant tube 102a as depicted with outlet flow arrow 134a in FIG. 1.

As best understood with a comparison of FIGS. 1 and 3, the helical shape of the outer ceramic wall 112a creates two helical wings 140a that, in some embodiments, can extend to the surrounding fluid path enclosure 105a when the heat exchanger 114a is positioned along the first length 117a of the enclosure 105a. The helical shape of the outer ceramic wall 112a and positioning of the wings 140a create a first spiral path 136a and a second spiral path 138a with the surrounding fluid path enclosure 105a, each of the first and second spiral paths 136a and 138a extending from the distal end 122a to the connection end 120a of the heat exchanger 114a and along the first length 117a of the fluid path enclosure 105a. When the flowing products of energy generation, moving in the downstream direction 110a, initially encounter the distal end 122a of the insert heat exchanger 114a, the products are routed at the distal tip 123a of the heat exchanger 114a to enter one of the first and second spiral paths 136a and 138a. As the products move toward the connection end 120a, the helical shape of the outer ceramic walls 112a turn the flow of products into semi radial directions 142a along the spiral paths 136a.

The ceramic construction of the insert body 116a comprises a form of silicon carbide, such as siliconized silicon carbide, sintered silicon carbide, reaction-bonded silicon carbide, nitrate-bonded silicon carbide, and/or any silicon carbide material derived from a powdered form. Such materials allow for the conductive transfer of heat through the outer ceramic wall 112a. As the products of energy generation flow along one of the first and second spiral paths 136a and 138a, the exposed outer ceramic wall 112a of the heat exchanger 114a receives heat energy from the flowing products, the heat energy being conductively transferred through the outer ceramic wall 112a to the heat transfer fluid flowing through fluent channel 124a.

The heated products of energy generation resulting from combusting fuel 109a, such as natural gas or other combustible fluids, that enter the first and second spiral paths 136a and 138a, are often predominately one or more of nitrogen, oxygen, carbon dioxide, carbon monoxide, helium, or hydrogen with a temperature typically of between about 500° F. to about 2500° F. Such gases may have flow rates through the spiral paths 136a and 138a that range from as low as 5 lb/hr to as high as 1500 lb/hr. Flow rates may depend on the maximum outside diameter of the heat exchanger 114a and/or the inside diameter of the surrounding fluid path enclosure 105a, which typically range from about 2 to 12 inches, but which can also be smaller or much larger depending on a specific application.

As the heat transfer fluid flows through the fluent channel 124a, it absorbs heat energy that has been convectively transferred from the flowing products of energy generation passing through the first and second spiral paths 136a and 138a through the outer ceramic wall 112a. Heat energy absorbed by the heat transfer fluid is then removed from the heat exchanger 114a when the heat transfer fluid is expelled through the fluid outlet 128a, the heat transfer fluid never coming into contact with products of energy generation prior to the expulsion of the heat transfer fluid from the inset heat exchanger 114a.

The helical shape of the outer ceramic wall 112a of the insert heat exchanger 114a allows for a substantial enhancement in heat exchanging between the flowing products and the heat transfer fluid by increasing the available surface area for contacting flowing products of energy generation. For example, consider that each wing 140a of the heat exchanger 114a represents two wing or "lobe" areas, with the 2-wing insert heat exchanger 114a of FIGS. 1-4 therefore having four lobe areas. Consider further that a center exchanger axis 150a extends to intersect exchanger center points 152a along the major dimensional length of the heat exchanger 114a. For a heat exchanger having a 2-inch helical lobe diameter D, the helical shape of the heat exchanger 114a can be expressed using the relations $$x = r * \cos(b * t)$$

$$y = r * \sin(b * t)$$

$$z = c * t,$$

where x is the length each wing, y is the perpendicular Cartesian axis to x, z is the major dimensional length of the heat exchanger 114a along the center exchanger axis 150a, r is the length from the exchanger center points 152a and center helical axis 152a to the maximum outer dimension of each wing 140a, and c is the twist rate of the helix, and t is the rotation angle of the helix. Assume a constant variable value b of 1 for purposes of calculating the twist rate c. The helix lobe radius r can be expressed as $$r = \frac{D}{2}$$

$$dt = 1 \text{ deg},$$

where dt represents the small rotation angle of the helix (i.e. 0.001 deg, 0.05 deg, 1 deg). Assuming a 1-inch length $L_t$ of each twist of the helix, the twist rate c, or length of the exchanger 114a for each full 360° twist of the helix, can then be expressed $$c = \frac{L_t}{360 \text{ deg.}}$$

$$c = 0.028 \text{ in/deg.}$$

Differentially, the small rotation angle dt is related to the dimensions x, y, and z by the relations $$dx = r\cos(b \cdot dt) \, dx = 1 \text{ in}$$

$$dy = r\sin(b \cdot dt) \, dy = 0.017 \text{ in}$$

$$dz = c \cdot dt \, dz = 0.028 \text{ in,}$$

which represent an amount of unit rotation per spacing along dz. The helical shapes of each wing 140a can be expressed in terms of a trignonometric relationship, with the pitch or twist angle of the wings 140a calculated as $$a\tan\frac{dz}{dy} = 9.28 \text{ deg.}$$

and the "third side" of the triangular pitch angle dh calculated as $$dh = \sqrt{dz^2 + dy^2}$$

$$dh = 0.0172 \text{ in.}$$

The area of a trapezoid can be expressed as $$dA_H = \frac{\frac{1}{2}}{dt} r(dz + dh)$$

where dz and dh represent two trapezoidal sides. Thus the differential area $dA_H$ of the trapezoid per degree of rotation is $$dA_H = .010 \frac{\text{in}^2}{\text{deg.}}$$

Since each wing 140a of the heat exchanger 114a represents two wing or "lobe" areas, and since it is a 2-wing insert heat exchanger 114a, N, the number of lobe areas, is 4. Thus, the helix fin area (trapezoidal area) $A_H$ per helical twist is calculated $$N = 4$$

$$A_H = dA_H 360 \text{ deg.} N$$

$$A_H = 14.42 \text{ in}^2$$

The increased surface area of the outer ceramic wall 112a of the heat exchanger 114a is preferably expressed in terms of the relative tube area of the surrounding fluid path enclosure 105a to determine the advantage of incorporating a helical shape for contacting the products of energy generation. This advantage is expressed as a "helical lobe to round tube area ratio." Where N=4, the inside surface area $A_T$ of the surrounding fluid path enclosure 105a along the first length 117a can be expressed through the relation $$A_T = \pi D L_t$$

Consider an untwisted surface area $A_S$ for each wing 140a, calculated as $$A_S = L_t rN$$

$$A_S = 4 \text{ in.}^2$$

A straight fin area value is then calculated as $$\frac{A_H}{A_S} = 3.6$$

The helical lobe to round tube area ratio is then calculated $$\frac{A_H}{A_T} = 2.295$$

Using such a ratio computation, the helically shaped outer ceramic wall 112a of the insert heat exchanger 114a of FIGS. 1-4 can typically provide approximately two to five times as much available surface area as a comparably sized heat exchanger having a round cross sectional shape.

Heat exchanging between the products of energy generation and heat transfer fluid via the outer ceramic walls 112a typically continues in both the first and second spiral paths 136a and 138a along most of the length of the surrounding fluid path enclosure 105a occupied by the insert body 116a of the heat exchanger 114a. The products of energy generation typically convectively heat the surface of the outer ceramic wall 112a according to the relation:

$$Q_{convection} = h \cdot A \cdot (T_{products} - T_{surface})$$

where $Q_{convection}$ is the rate of heat transfer between the products of energy generation and the surface of the outer ceramic wall 112a, h is the heat transfer coefficient, a function of fluid velocity and properties such as viscosity, thermal conductivity, and/or an applicable Prandtl number, h typically being in the range of between about 50 and 250 W/m²-K, A is the surface area of the outer ceramic wall 112a, $T_{products}$ is the temperature of the products of heat generation, and $T_{surface}$ is the temperature of the outer surface of the outer ceramic wall 112a.

As unheated heat transfer fluid enters the fluid inlet 118a and receives initial heating as it flows through the counter flow path 121a toward the distal end 122a of the heat exchanger 114a, convective heating of the heat transfer fluid occurs according to the relation:

$$Q_{convection} = h \cdot A \cdot (T_{surface} - T_{fluid})$$

where $T_{fluid}$ is the temperature of the heat transfer fluid as it is being heated. Once the partly heated heat transfer fluid reaches the distal end 122a of the heat exchanger 114a and enters the parallel flow path 125a via the return point 126a, the reverse directional flow of the heat transfer fluid continues to be heated according to the same relation until the heat transfer flow is finally expelled from the insert heat exchanger 114a.

This configuration of the heat exchanger 114a in a typical heated energy system normally permits a fluid heat exchange that results in a cooling of the products of energy generation by about 300° F. to 1400° F. and a heating of the heat transfer fluid by about 300° F. to 1400° F. This relatively high level of heat exchanging subjects the heat exchanger 114a to a substantial thermal shock. However, silicon carbide materials have demonstrably high resistances to thermal shock and possess efficient thermal conductivity properties. Silicon carbide materials are also highly resistant to thermal expansion, which can allow the insert body 116a of the heat exchanger 114a to resist thermally-induced structural wear such as cracking and which can enhance the ability of the heat exchanger 114a to be coupled with other components of the heated energy system 100a such as the manifold 132a, surrounding fluid path enclosure 105a, and radiant tube 102a.

After traveling through the first spiral path 136a or second spiral path 138a and exchanging heat with the heat transfer fluid via the outer ceramic wall 112a of the heat exchanger 114a, the products of energy generation are expelled from the radiant tube 102a through a product exhaust 144a, as indicated in FIG. 1 with an exhaust flow arrow 146a. The product exhaust 144a will normally be sufficiently sized and located at a position on the radiant tube 102a that allows for the cooled products of energy generation to be expelled directly from both the first spiral path 136a and second spiral path 138a. In many embodiments, it is also preferable to position the product exhaust 144a as close as possible to the connection end 120a of the insert heat exchanger 114a to optimize the amount of heat that is exchanged between the flowing products of energy generation and heat transfer fluid before the expulsion of products of energy generation from the radiant tube 102a.

Although the invention has been shown and described as including a fluent channel with a bidirectional fluid flow arrangement that includes a parallel flow path and counter flow path, it will be appreciated that other fluent channel configurations are also possible and are within the intended scope of the invention. For example, FIG. 5 depicts an integral ceramic insert heat exchanger 114b of the invention having an integral ceramic construction with an outer ceramic wall 112b that is helical in shape. The heat exchanger 114b has two wings 140b and a fluent channel 124b that is not divided into parallel and counter flow paths with an inter path divider. Instead, the fluent channel 124b comprises a unidirectional flow path 148b for accommodating flowing heat transfer fluid. The unidirectional flow path 148b extends the length of the heat exchanger 114b from about the connection end 120b to about the distal end 122b.

When positioned within a surrounding fluid path enclosure (not shown in FIG. 5), the helical shape of the outer ceramic wall 112b defines a first spiral path 136b and a second spiral path 138b. The spiral paths 136b and 138b serve to turn the flow of products of energy generation into semi radial directions 142b along the spiral paths 136b as the products move from the distal end 122b to the connection end 120b of the heat exchanger 114b within the fluid path enclosure.

As a further example, FIG. 6 depicts an integral ceramic insert heat exchanger 114c of the invention having an integral ceramic construction with an outer ceramic wall 112c that is helical in shape and that has three wings 140c and a fluent channel 124c that is also not divided into separate parallel and counter flow paths. The unidirectional flow path 148c of the fluent channel 124c extends the length of the heat exchanger 114c from about the connection end 120c to about the distal end 122c and accommodates flowing heat transfer fluid.

FIG. 7 is a partial cross sectional side perspective view of the heat exchanger 114c of FIG. 6. As best understood with a comparison of FIGS. 6 and 7, the presence of a third wing 140c creates a third spiral path 154c, that along with the first spiral path 136c and second spiral path 138c, provide three separate pathways, with the surrounding fluid path enclosure 105c, for the products of energy generation to travel from the distal end 122c to the connection end 120c of the heat exchanger 114c and along the first length (not shown in FIGS. 6 and 7) of the fluid path enclosure (not shown in FIGS. 6 and 7). Generally, each additional wing added to a helically-shaped outer ceramic wall will create an additional spiral path for accommodating products of energy generation. In some embodiments having fluent channels with unidirectional flow paths, such as the two wing heat exchanger 114b of FIG. 5 and the three wing heat exchanger 114c of FIGS. 6 and 7, the fluent channels 124b and 124c extend to the exchanger center points 152b and 152c along the center exchanger axis 150c along the lengths of the heat exchangers 114b and 114c.

In heat exchangers having fluent channels with unidirectional flow paths, manifolds can be added to the connection and distal ends to allow for the channeling of heat transfer fluid into the fluent channel of the insert body via a fluid inlet and for the expulsion of heat transfer fluid via a fluid outlet. This can be accomplished with the addition of separate manifold structures, similar to the manifold 132a affixed to the connection end 120a of the heat exchanger 114a depicted in FIG. 4, at both the connection and distal ends of the heat exchanger. This can also be accomplished by forming manifolds as part of the ceramic structure of the insert body of the exchanger.

For example, FIG. 8 depicts a side perspective view of the heat exchanger 114c of FIG. 7 with an inlet manifold 156c formed into the ceramic structure of the heat exchanger 114c at the connection end 120c to function as a fluid inlet 118c and allow for the entry of heat transfer fluid into the fluent channel 124c of the heat exchanger 114c. An outlet manifold 158 is also formed into the ceramic structure of the heat exchanger 114c at the distal end 122c to function as a fluid outlet 128c and allow for the expulsion of heat transfer fluid from the fluent channel 124c of the heat exchanger 114c. A ceramic layer 160 can also be applied to each wing 140c at the distal tip 123c to enclose the fluent channel 124c and help direct heat transfer fluid toward the fluid outlet 128c and outlet manifold 158.

A powder formation technique is utilized in the fabrication of integral ceramic insert heat exchangers of the invention. The method of fabrication includes the utilization of a tool that is rotated about and moved along a rotational axis to deposit silicon carbide powder, which is flowed through a silicon carbide channel to form a helical shape. The shape of the silicon carbide channel of the tool utilized determines the cross sectional shape of a fabricated insert heat exchanger.

Fabrication of heat exchangers of the invention is best initially understood with respect to FIG. 9, which depicts a bottom view of a tool 162b used in a method for fabricating integral ceramic insert heat exchangers for heated energy systems. The tool 162b is depicted in FIG. 9 as it appears across a rotational plane, which is approximately the flat plane of the page of the figure. The tool 162b has a rotational axis 164b, the rotational axis 164b being about normal to the rotational plane, extending perpendicularly to the page of the figure. The tool 162b is rotatable about the rotational axis 164b in about the rotational plane. The tool 162b is also movable along about the rotational axis 164b and is positioned at the lower extremity of a funnel tube 165b that is elongated along about the rotational axis 164b. Positioning screws 169b extend through threaded holes of the funnel tube 165b and secure the tool 162b in position on the funnel tube 165b.

A silicon carbide channel 166b extends outside a cavity channel 168b along directions defined by the rotational plane, and therefore entirely surrounds the cavity channel 168b in the rotational plane depicted in FIG. 9. A reclaim channel 170b is provided either as a channel within the tool 162b, as a channel formed by the open lower extremity of the funnel tube 165b, or as another channel that is otherwise provided to be movable with the tool 162b when the tool 162b moves along about the rotational axis 164b. The reclaim channel 170b can be divided into multiple sub-channels 172b that together are generally symmetrically positioned around the rotational axis 164b of the tool 162b.

FIG. 9 also includes a bottom cross sectional view of a container 174b for receiving cavity fill, silicon carbide powder, and resin from the tool 162b and for receiving loose fill from the reclaim channel 170b, the tool 162b being depicted within the container 174b. The tool 162b is sized to extend approximately across the inside diameter of the container 174b and is rotatable about the rotational axis 164b within the container 174b. Prior to commencing fabrication of an insert ceramic heat exchanger of the invention, the tool 162b is normally extended deep into the container 174b. The tool 162b depicted in FIG. 9 is appropriately configured for fabricating a heat exchanger 114b having two wings 140b and a fluent channel 124b having a unidirectional flow path 148b for accommodating flowing heat transfer fluid as depicted in FIG. 5, as can be better understood with reference to the fabrication method described further below.

It will be appreciated that other tool configurations are intended to be within the scope of the invention, the shape of each fabricated insert ceramic heat exchanger depending on the specific tool shape employed for fabrication. For example, FIG. 10 depicts a bottom view of a tool 162a of the invention for fabricating a heat exchanger 114a of the type depicted in FIGS. 1 and 2, the tool 162a also being depicted in FIG. 9 as it appears across a rotational plane, which is approximately the flat plane of the page of the figure, a further depicted within a container 174a for receiving cavity fill, silicon carbide powder, resin, and loose fill. The rotational axis 164a of the tool 162a is about normal to the rotational plane, extending perpendicularly to the page of the figure. The tool 162a is rotatable about the rotational axis 164a in about the rotational plane, is movable along about the rotational axis 164a, and is positioned at the lower extremity of a funnel tube 165a that is elongated along about the rotational axis 164a. Positioning screws 169a extend through threaded holes of the funnel tube 165a and secure the tool 162a in position on the funnel tube 165a.

A silicon carbide channel 166a extends outside a cavity channel 168a along directions defined by the rotational plane, and therefore entirely surrounds the cavity channel 168a in the rotational plane depicted in FIG. 9. A divider segment 176a of the silicon carbide channel 166a bisects the cavity channel 168a into inner segments 178a, the divider segment 176a corresponding to the inter path divider 129a of the tool 162a as best understood with reference to FIG. 2 and as discussed further below. Due to the bisecting positioning of the divider segment 176a and the remaining portions of the silicon carbide channel 166a, each inner segment 178a of the cavity channel 168a is surrounded independently by the silicon carbide channel 166a. The tool 162a is shown positioned on a funnel tube 165a, with the reclaim channel 170a being provided as a channel formed by the open lower extremity of the funnel tube 165a, the reclaim channel 170a being divided into multiple sub-channels 172a symmetrically positioned around the rotational axis 164a of the tool 162a.

In a further example, FIG. 11 depicts a bottom view of a tool 162c of the invention for fabricating a three-wing heat exchanger 114c of the type depicted in FIGS. 6 and 7, the tool 162c depicted in FIG. 11 as it appears across a rotational plane that is approximately the flat plane of the page of the figure, and further depicted within a container 174c for receiving cavity fill, silicon carbide powder, resin, and loose fill. The rotational axis 164c of the tool 162c is about normal to the rotational plane, extending perpendicularly from the page of the figure. The tool 162c is rotatable about the rotational axis 164c in about the rotational plane, is movable along about the rotational axis 164c, and is positioned with three positioning screws 169c at the lower extremity of a funnel tube 165c that is elongated along about the rotational axis 164c.

Since the tool 162c is designed to fabricate the three-wing heat exchanger 114c of FIGS. 6 and 7, the tool 162c includes a silicon carbide channel 166c, divided into three outer segments 180c extending outside a cavity channel 168a along directions defined by the rotational plane. Accordingly, each outer segment 180c extends along approximately an outside one-third of the combined major dimensions of the tool 162c in the rotational plane, as best understood from FIG. 11. The three outer segments 180c of the silicon carbide channel 166c together extend at least partially outside a unitary cavity channel 165c that corresponds to the three-winged fluent channel 124c of the heat exchanger 114c of FIGS. 6 and 7. To achieve symmetrical positioning around the rotational axis 164c of the tool 162c, the reclaim channel 170c is divided into three sub-channels 172a formed by the open lower extremity of the funnel tube 165c.

The fabrication of insert heat exchangers such as those depicted in FIGS. 1-8 using the tools depicted in FIGS. 9-11 involves positioning a tool in a forming machine having at least two degrees of freedom, including axial and rotational. For example, in FIG. 12 a forming machine 182d of the invention includes a tool 162d similar to the tool 162c of FIG. 11. The tool 162d of FIG. 12 is positioned at the lower extremity of a funnel tube 165d, the funnel tube 165d being elongated along the vertically oriented rotational axis 164d. The funnel tube 165d is mounted vertically on precision roller wheels 184d that contact the outer rolled surface of the funnel tube 165d at a pitch angle relative to the rotational plane of the tool 162d to allow the funnel tube 165d and tool 162d to be rotated about the rotational axis 164d in a rotational direction 186d. The angular contact between the funnel tube 165d and roller wheels 184d also causes the funnel tube 165d and tool 162d to move vertically along the rotational axis 164d when being rotated in the rotational direction 186d.

Each roller wheel 184d can be adjusted on an orientation mounting 188d to change the pitch angle at which each roller wheel 184d contacts the funnel tube 165d. Increasing the pitch angle of the roller wheels 184d with respect to the rotational plane of the tool 162d causes an increase in vertical movement of the funnel tube 165d and tool 162d along the rotational axis 164d for each complete rotation of the funnel tube 165d and tool 162d about the rotational axis 164d. Increasing the pitch angle of the roller wheels 184d to ninety degrees, an approximately normal pitch angle to the rotational plane of the tool 162d that is approximately parallel to the rotational axis 164d results in vertical movement of the funnel tube 165d and tool 162d without causing rotation of the funnel tube 165d and tool 162d about the rotational axis 164d.

Figure 12B:
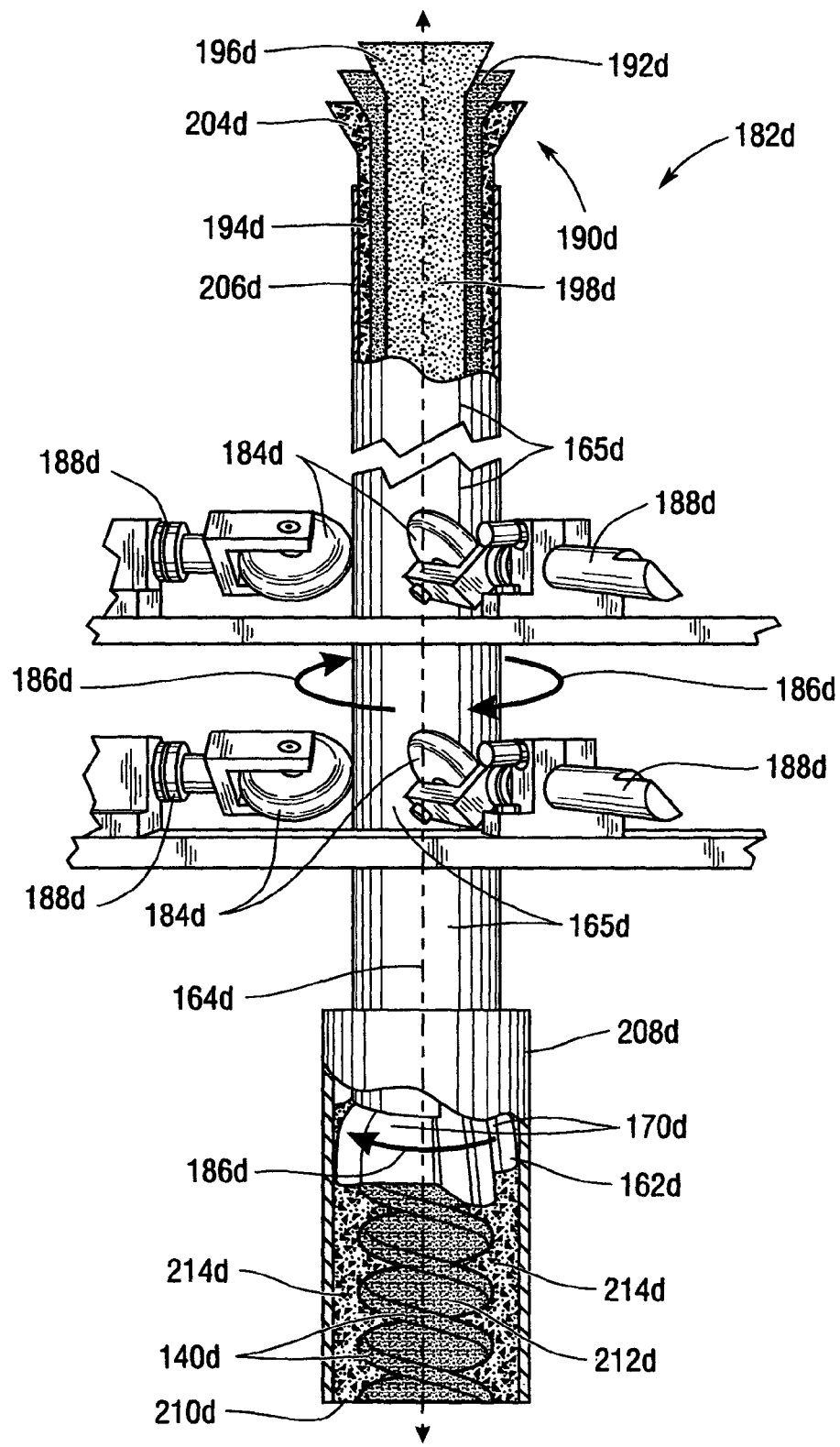
FIG. 12B depicts a partial cross sectional side view of the forming machine of FIG. 12A.
Figure 12C:
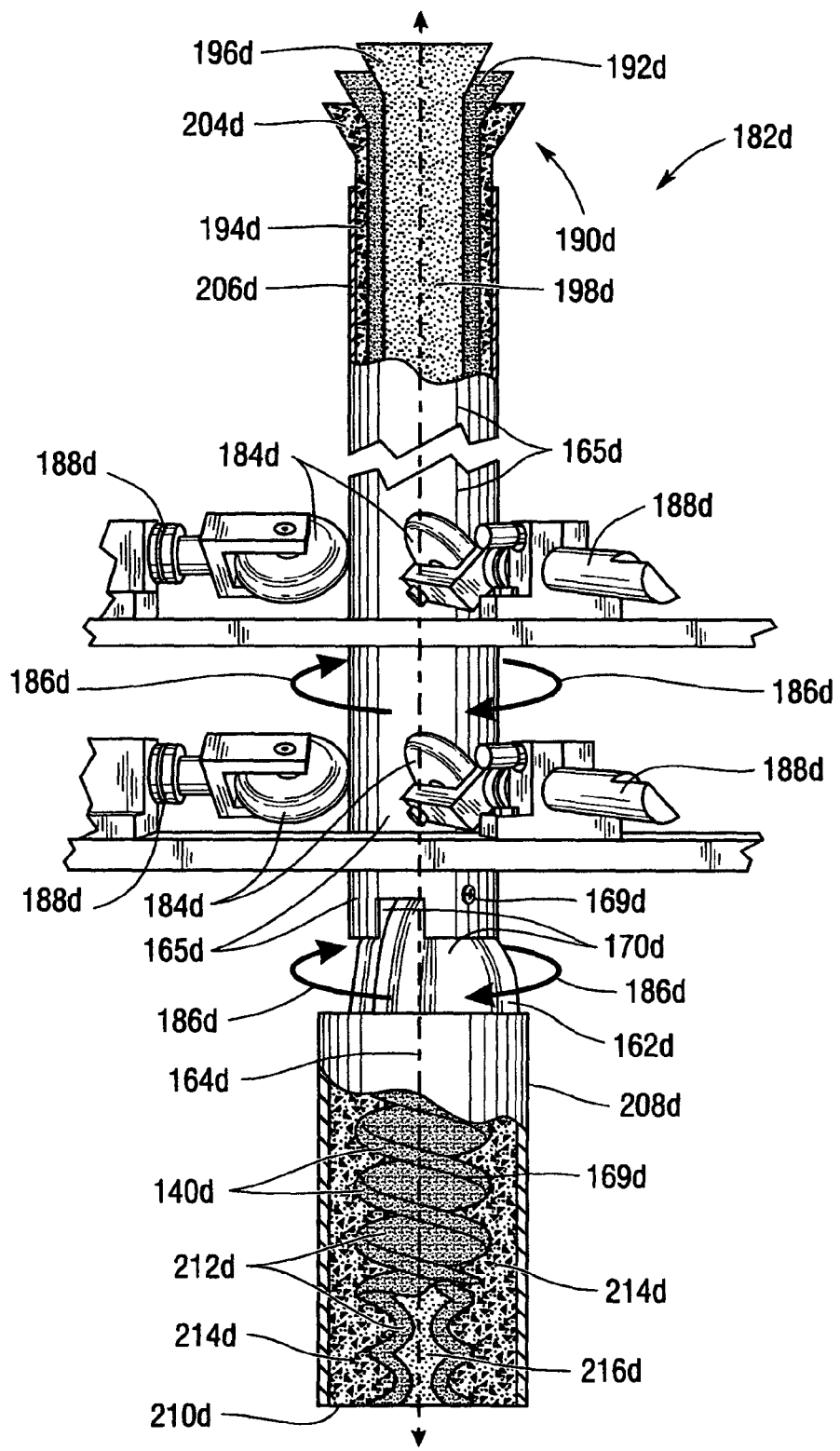
FIG. 12C depicts a partial cross sectional side view of the forming machine of FIG. 12A.

As best understood with reference to FIGS. 12A-C, the funnel tube 165d includes separate, concentric funnel paths that extend inside and along the height of the funnel tube 165d and that allow for flowing material to be supplied to appropriate channels of the tool 162d and/or to the reclaim channel 170d from the top portion 190d of the funnel tube 165d. A silicon carbide funnel 192d allows silicon carbide powder and resin to be added to a silicon carbide funnel path 194d to provide a supply flow of the silicon carbide powder and resin to the silicon carbide channel (not shown in FIGS. 12A-C) of the tool 162d. Arrangement of the silicon carbide channel of the tool 162d is best understood by comparing FIGS. 12A-C with the silicon carbide channel 166c of the similar tool 162c depicted in FIG. 11.

The silicon carbide powder is normally supplied to the silicon carbide funnel 192d in a non-caking powder where the silicon carbide powder particles comprise pure silicon carbide, siliconized silicon carbide, sintered silicon carbide, reaction-bonded silicon carbide, nitrate-bonded silicon carbide, and/or another appropriate silicon carbide or silicon carbide composite material. One appropriately implemented silicon carbide grain is 80 grit Electrocarb grade silicon carbide available from ElectroAbrasives of Buffalo, N.Y. A resin is added to the silicon carbide powder and can be mixed into the powder either as separate powder particles or bonded to and/or otherwise combined with the silicon carbide powder particles themselves. The resin can be any organic binder such as phenolic resin, powdered sugar, or corn starch. One appropriately implemented commercial phenolic novolac resin powder is Varcum grade 29302 phenolic two step resin available from Occidental Chemical Corporation of Dallas, Tex. The combined silicon carbide powder and resin is formed to result in a free flowing powdered mixture capable of moving through the silicon carbide funnel path 194d of the funnel tube 165d and silicon carbide channel of the tool 162d. The powdered mixture should have particle sizes that are sufficiently coarse to flow freely with gravity through the silicon carbide funnel path 194d and through the silicon carbide channel of the tool 162d. Conversely, the particle sizes should be sufficiently fine to not bridge together, cake, or otherwise obstruct the funnel path silicon carbide 194d or funnel tube 165d. Suitable mixtures have been found to include silicon carbide grains in the 50 to 500 micron range and more typically 150 to 250 microns.

Fine powdered phenolic resins added to the silicon carbide grain can impede the flowing powdered mixture and should be present in the mixture in a sufficiently low percentage to avoid causing an obstruction in flow through the silicon carbide funnel path 194d and tool 162d. However, a sufficient amount of resin must be maintained to impart sufficient structural strength to allow the silicon carbide powder to bind together and be handled as a green state part after heating the silicon carbide powder and resin to the resin-binding temperature. Powdered mixtures have been found to both retain sufficient flow properties and, after heating to resin-binding temperatures, retain sufficient green state structural strength where resin is added at about 0.5 to 5 percent by weight. If, rather than supplying powdered resin, the silicon carbide powder grains are coated with resin prior to being added to the silicon carbide funnel 192d, the grains can be appropriately coated with a solvent or warm blending, which is a technique known in the art and commonly used in the foundry industry for coating sand used for sand casting molds.

A cavity funnel 196d allows cavity fill to be added to a cavity funnel path 198d to provide a supply flow of cavity fill to the cavity channel (not shown in FIGS. 12A-C) of the tool 162d. Arrangement of the cavity channel of the tool 162d is best understood by comparing FIGS. 12A-C with the cavity channel 168c of the similar tool 162c depicted in FIG. 11.

The cavity fill supplied to the cavity funnel 196d most often includes a plain silicon grain, but can be any free flowing, self-packing material capable of acting as a filler and temporary mold surface, and capable of withstanding a resin-binding temperature, which is often in the range of approximately 350° F. or higher. Suitable cavity fill materials have been found to include flowing, non-caking materials such as common beach sand, silica powder, crushed glass, aluminum powder, silicon powder, silicon carbide powder, and boron nitrate powder. One appropriately implemented and commercially available silicon metal grain is 30 mesh×80 mesh grade with typical impurities of 0.05% iron and 0.04% aluminum available from Globe Metallurgical, Inc. of Selma, Ala. Where the resin-binding temperature is less than 450° F., common organic materials such as plant seed can also be used as cavity fill. If the cavity fill includes silicon powder that must be retained for later wicking, a resin can also be mixed with the silicon powder and included as part of the cavity fill.

As best understood by comparing FIGS. 12A-C with FIGS. 9-11, the cavity channels 168a, 168b, and 168c of the tools 162a, 162b, and 162c are generally wider annulus openings compared to the silicon carbide channels 166a, 166b, and 166c. Referring specifically to FIGS. 12A-C, since there is no additional funnel path located inside the cavity funnel path 198d, cavity fill flowing therein is not required to flow through any narrow opening from the cavity funnel 196d to the cavity channel of the tool 162d. This allows the cavity fill flowing through the cavity funnel path 198d to have a finer or coarser particle size than powders that flow through other funnel paths of the funnel tube 165d. However, it may be preferable to utilize the same silicon powder material as is selected to flow through other funnel paths of the funnel tube 165d as a matter of convenience.

A reclaim funnel 204d allows loose fill to be added to a reclaim funnel path 206d to provide a supply flow of loose fill to the reclaim channel 170d of the funnel tube 165d. The positioning of the reclaim channel 170d with respect to the tool 162d is best understood by comparing FIGS. 12A-C with the similarly configured reclaim channel 168c, funnel tube 165c, and tool 162c depicted in FIG. 11.

The loose fill supplied to the reclaim funnel 204d is most often a plain silicon grain, but, like the cavity fill supplied to the cavity funnel 196d, loose fill can be any free flowing, self-packing material capable of acting as a filler and temporary mold surface, and capable of withstanding a resin-binding temperature, with suitable materials including flowing, non-caking materials such as common beach sand, silica powder, crushed glass, aluminum powder, silicon powder, silicon carbide powder, boron nitrate powder, and for resin-binding temperatures under 450° F., common organic materials. As best understood by comparing FIGS. 12A-C with FIGS. 9-11, the reclaim channels 170a, 170b, 170c, and 170d of the funnel tubes 165a, 165b, 165c, and 165d are generally wider annulus openings compared to the silicon carbide channels 166a, 166b, and 166c of the tools 162a, 162b, 162c, and 162d. This allows the loose fill flowing through the reclaim funnel path 206d to have a finer or coarser particle size than powders that flow through the silicon carbide funnel path 194d, though it may be preferable as a matter of convenience to utilize the same silicon powder material as is selected to flow through other funnel paths of the funnel tube 165d.

In forming a ceramic insert heat exchanger according to the invention, silicon is provided in the presence of silicon carbide powder to later bind the silicon powder together to form an insert body. FIGS. 12A-C represent one example of an insert heat exchanger formation process according to the invention in which silicon is appropriately provided by supplying, to the cavity funnel path 198d through the cavity funnel 196d, a powdered mixture of silicon and resin. The powdered mixture of silicon and resin is then provided as the supply flow of cavity fill to the cavity channel of the tool 162d. The resin added to the silicon powder can be mixed into the powder either as separate powder particles or bonded to and/ or otherwise combined with the silicon powder particles themselves. The resin can be any organic binder such as phenolic resin, powdered sugar, or corn starch. The combined silicon powder and resin is formed to result in a free flowing powdered mixture capable of moving through the cavity funnel path 198d of the funnel tube 165d and cavity channel of the tool 162d.

FIGS. 12A-C depict sequential rotation of the funnel tube 165d and tool 162d to form the helical shape of an insert heat exchanger prior to binding. Each roller wheel 184d is adjusted on its orientation mounting 188d to a common pitch angle with respect to the rotational axis 164d to reflect a desired twist rate c of the insert heat exchanger to be fabricated. Prior to the addition of cavity fill to the cavity funnel 196d, silicon carbide powder to the silicon carbide funnel 192d, and loose fill to the reclaim funnel 204d, the funnel tube 165d and tool 162d are moved downward along the rotational axis 164d. Due to the pitch angle of the roller wheels 184d, this downward movement results in the funnel tube 165d and tool 162d rotating about the rotational axis 164d in a direction that is opposite the rotational direction 186d. The funnel tube 165d and tool 162d are lowered into a cylindrical container 208d until the tool 162d contacts the container bottom 210d so that the container bottom 210d is generally flush against the bottom of the tool 162d across the rotational plane.

Once the tool 162d contacts the container bottom 210d, cavity fill, which in FIGS. 12A-C is the mixture of silicon powder and resin, is added to the cavity funnel 196d to provide flowing cavity fill to the cavity funnel path 194d and cavity channel of the tool 162d. Silicon carbide powder and resin is added to the silicon carbide funnel 192d to provide flowing silicon carbide powder and resin to the silicon carbide funnel path 198d and silicon carbide channel of the tool 162d. Loose fill is added to the reclaim funnel 204d to provide flowing loose fill to the reclaim funnel path 206d and reclaim channel 170d of the funnel tube 165d. The loose fill passes through the reclaim channel 170d and fills the portion of the container 208d surrounding the tool 162d.

From the container bottom 210d, the tool 162d is raised upwards along the rotational axis 164d as shown in FIG. 12A. An electric motor, hydraulic, pneumatic, or combination drive system us normally employed as an actuator to cause this upward movement of the tool 162d by lifting the funnel tube 165d or by mechanically driving the individual roller wheels 184d, though it is contemplated that manual or other methods of actuating the lifting and rotation of the tool 162d and funnel tube 165d can be employed. As the tool 162d moves away from the container bottom 210d, the common pitch angle of the roller wheels 184d with respect to the rotational axis causes the funnel tube 165d and tool 162d to rotate about the rotational axis 164d in the rotational direction 186d. Moving the funnel tube 165d and tool 162d upward and away from the container bottom 210d allows cavity fill, which includes silicon powder and resin FIG. 12A, to flow uniformly down the cavity funnel path 198d through the cavity channel of the tool 162d. Silicon carbide powder and resin is simultaneously allowed to flow uniformly down the silicon carbide funnel path 194d and silicon carbide channel of the tool 162d. Loose fill is also allowed to continue flowing out the reclaim channel 170d of the funnel tube 165d into the container.

As best understood by comparing FIGS. 12A and B, as the tool 162d moves away from the container bottom 210d, first to the position depicted in FIG. 12A and then subsequently to the position depicted in FIG. 12B, the rotation of the funnel tube 165d and tool 162d about the rotational axis 164d causes the flowing silicon carbide powder and resin to be deposited within the container 208d in the form of a helical column of silicon carbide powder and resin 212d. Loose fill flowing out the reclaim channel 170d is also deposited in the container 208d, forming a column of loose fill 214d that surrounds the helical column of silicon carbide powder and resin 212d and packs the silicon carbide powder and resin in the location in which it is initially deposited by the tool 162d, preserving the helical shape of the column of silicon carbide powder and resin 212d. The helical column of silicon carbide powder and resin 212d has wings 140d and a helical twist rate c that is determined by the common pitch angle of the roller wheels 184d with respect to the rotational axis 164d.

Moving the tool 162d away from the container bottom 210d to the positions depicted in FIGS. 12A and B while rotating the funnel tube 165d and tool 162d about the rotational axis 164d also allows cavity fill to be deposited within the container 208d. As the tool 162d continues to be rotated about the rotational axis 164d, it moves from the position depicted in FIG. 12B to the position depicted in FIG. 12C, further depositing loose fill, silicon carbide, resin, and cavity fill.

FIG. 12C includes a partial cross sectional view of the helical column of silicon carbide powder and resin 212d that continues to form as the tool 162d and funnel tube 165d continue to move up and rotate about the rotational axis 164d. Since the silicon carbide channel of the tool 162d at least partially surrounds the cavity channel, the cavity fill is deposited as a column of cavity fill 216d that is surrounded by the helical column of silicon carbide powder and resin 212d in directions defined by the rotational plane. As the tool 162d and funnel tube 165d continue moving up and rotating about the rotational axis 164d, the helical column of silicon carbide powder and resin 212d allows the cavity fill to be packed into the locations where the cavity fill is deposited into the column of cavity fill 216d by the tool 162d. The tool 162d and funnel tube 165d continue to move up and rotate about the rotational axis 164d and continue to deposit loose fill, silicon carbide powder, resin, and cavity fill, until the container 208d is completely filled or until the helical column of silicon carbide powder and resin 212d and the column of cavity fill 216d are of the desired height along the rotational axis 164d.

After the funnel tube 165d and tool 162d are used to form the column of loose fill 214d, the helical column of silicon carbide powder and resin 212d, and the column of cavity fill 216d, the flow of loose fill, silicon carbide powder, resin, and cavity fill through the funnel tube 165d and/or the tool 162d is terminated. The container 208d, containing the deposited columns of loose fill, silicon carbide powder and resin, and cavity fill 214d, 212d, and 216d can then be removed from the forming machine 182d. The relative packing of the adjacent columns of loose fill, silicon carbide powder and resin, and cavity fill 214d, 212d, and 216d is generally sufficient to prevent significant material shifting or particle intermixing between the separate columns as long as reasonable care is exercised during removal and handling of the container 208d and its contents.

After the container 208d is removed from the forming machine 182d, the container 208d and its contents are then subjected to a resin-binding temperature. This can be performed by positioning the container 208d within an electric kiln or other similar heating apparatus. The resin-binding temperature causes the resin in the helical column of silicon carbide powder and resin 212d and in the column of cavity fill 216d to at least partially liquefy and saturate the silicon carbide powder and silicon powder in the columns. If the resin in the helical column of silicon carbide powder and resin 212d and/or in the column of cavity fill 216d is an organic binder such as phenolic resin, powdered sugar, or corn starch, an appropriate resin-binding temperature on the order of about 350° F. to about 450° F. can generally be sufficient to set the resin and cause powder saturation without adversely affecting other materials contained within the container 208d. However, a resin-binding temperature that is significantly lower than 450° F. may be preferred if an organic material such as plant seed is present in the column of loose fill 214d or the column of cavity fill 216d.

After heating to the resin-binding temperature, the container 208d and its contents are cooled to allow the resin to re-solidify, cure, and bind together the silicon carbide powder in the helical column of silicon carbide powder and resin 212d. In the column of cavity fill 216d, re-solidifying and curing resin also binds together the silicon powder of the cavity fill. The lack of resin in the column of loose fill 214d allows the loose fill to remain unbound and in powder form.

The contents of the container 208d, including the column of loose fill 214d, column of silicon carbide powder and resin 212d, and column of cavity fill 216d are then removed from the container 208d. Since the column of loose fill 214d remains unbound and in powder form, the column of loose fill 214d can be first removed by pouring the loose fill from the container 208d, the loose fill easily evacuating the container 208d due to the free flowing, self-packing characteristics of the loose fill material.

After removal of the column of loose fill 214d, the column of silicon carbide powder and resin 212d and the column of cavity fill 216d remain as an integral, resin set greenbody having the general exterior helical shape or "near-net-shape" of a heat exchanger of the invention. Throughout the greenbody, individual grains of silicon carbide and silicon remain bound together by the cured resin, which provides sufficient structural integrity to the greenbody to allow for intact removal from the container 208d and handling. After removal of the greenbody from the container 208d, the greenbody is usually cut to a specified length, and, if required, other structural machining or modifications to the greenbody can be made.

Additional heating is required to further bind silicon carbide powder with silicon powder in the greenbody. The selected heating method is generally sufficient to achieve silicon-melting temperatures of an approximate magnitude of the order of 2500° F., and subsequently achieve silicon-wicking temperatures of an approximate magnitude of the order of at least 3000° F. Such appropriate heating has been successfully conducted using a vacuum furnace operating initially at less than 1 torr.

The positioning of the column of cavity fill 216d, within and immediately adjacent the helical column of silicon carbide powder and resin 212d, allows the column of silicon carbide powder and resin 212d to be heated to a silicon-melting temperature in the presence of silicon of the column of cavity fill 216d. Upon reaching the silicon-melting temperature, the silicon in the column of cavity fill 216d begins to melt, gradually assuming a molten form. At about or above the silicon-melting temperature, molten silicon of the column of cavity fill 216d also begins to partially evacuate from within the column of cavity fill 216d. This evacuation begins to form a fluent channel (not shown in FIG. 12C) within the green body.

After achieving the silicon-melting temperature, additional heating continues to raise the temperature of the green body to a silicon-wicking temperature. Upon achieving the silicon-wicking temperature, remaining molten silicon of the column of cavity fill 216d begins to interact with the silicon carbide powder in the column of silicon carbide powder and resin 212d, the silicon carbide powder developing a capillary action that allows for absorption and impregnation of the molten silicon throughout the column of silicon carbide powder and resin 212d. This process "wicks" the molten silicon throughout the silicon carbide powder to allow for broad distribution of the molten silicon throughout the column of silicon carbide powder and resin 212d, essentially impregnating the molten silicon throughout the near-net-shape of the insert heat exchanger being fabricated.

As the molten silicon wicks throughout the column of silicon carbide powder and resin 212d, cavity fill is further evacuated from the column of cavity fill 216d to the extent that the fluent channel extends the length of the heat exchanger that is being fabricated, the fluent channel assuming the general shape of the inside profile of the column of silicon carbide powder and resin 212d. Carbon within the resin that is present in both the column of cavity fill 216d and the column of silicon carbide powder and resin 212d reacts with the molten silicon to create additional silicon carbide that is present among the molten silicon, reducing impurities that are present among the remaining molten silicon and silicon carbide powder. However, the wicking process does not otherwise produce significant volumetric changes in the near-net-shape of the column of silicon carbide powder and resin 212d, which represents the fired shape of the insert heat exchanger of the invention.

This process also approximately preserves the near-net-shape of the insert heat exchanger after subsequent cooling. Cooling from the silicon-wicking temperature to, for example, room temperature, causes the molten silicon to re-solidify and bind together the silicon carbide powder through which the molten silicon has been impregnated. The final fired shape of the fabricated insert heat exchanger is approximately that of the pre-fired column of silicon carbide powder and resin 212d, with the resulting fluid channel assuming the general shape of the former column of cavity fill 216d, though significant volumetric changes are absent. The combination of silicon carbide powder bound with silicon distributed throughout is considered a ceramic and comprises the primary structural makeup of the fabricated insert heat exchanger.

Figure 13:
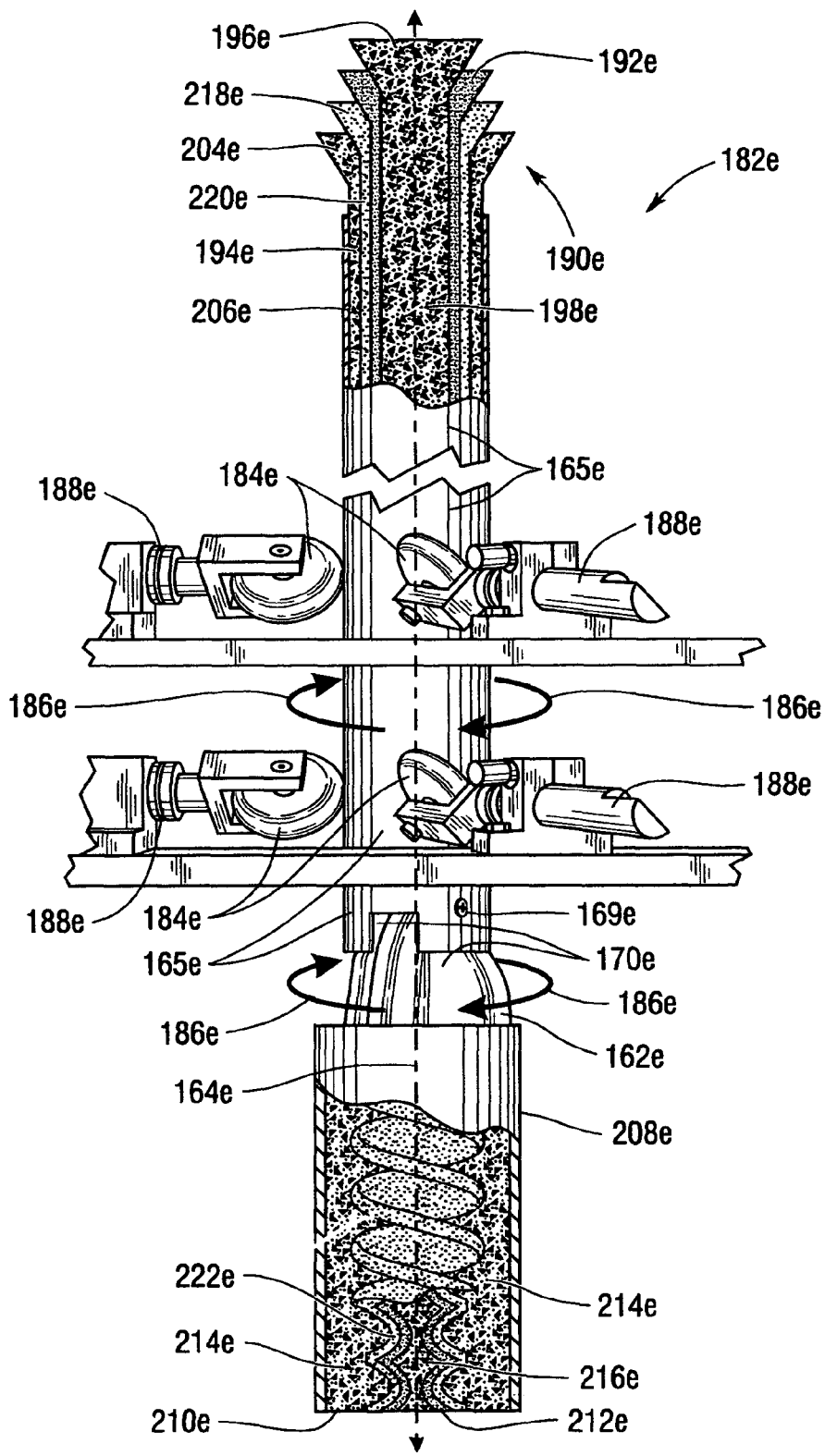
FIG. 13 depicts a partial cross sectional side view of a forming machine for fabricating insert heat exchangers according to the invention.

It will be appreciated that silicon powder can also be positioned outside of a column of silicon carbide powder during the fabrication of an insert heat exchanger of the invention within the intended invention scope. For example, FIG. 13 depicts a partial cross sectional view of a forming machine 182e for fabricating an insert heat exchanger of the invention in which the tool 162e includes an outer silicon channel (not shown). Silicon powder and resin are supplied through an outer silicon funnel 218e to an outer silicon funnel path 220e that surrounds a silicon carbide funnel path 194e and that is surrounded by a reclaim funnel path 206e, the outer silicon funnel path 220e providing silicon powder and resin to the outer silicon channel of the tool 162e. Cavity fill, such as silicon powder or other appropriate free flowing, self-packing material is provided to the cavity funnel path 198e via the cavity funnel 196e and does not include a resin or other material that would bind the cavity fill together upon being heated to a resin-binding temperature.

The formation of an insert heat exchanger of the invention using the forming machine 182e of FIG. 13 is best understood with reference to the partial cross sectional view of the container 208e in FIG. 13. The tool 162e is raised from contact with the container bottom 210e as the roller wheels 184e rotate the funnel tube 165e in the rotational direction 186e about the rotational axis 164e. As the tool 162e moved toward the position depicted in FIG. 13, cavity fill flows through the cavity channel of the tool 162e to form a column of cavity fill 216e. Silicon carbide powder and resin flow through the silicon carbide channel of the tool 162e to form a helical column of silicon carbide powder and resin 212e that surrounds the column of cavity fill 216e. Silicon powder and resin flow through the outer silicon channel of the tool 162e to form a column of silicon powder and resin that is an outer column of silicon powder and resin 222e which surrounds the column of silicon carbide powder and resin 212e. Loose fill also flows out of the reclaim channel of the funnel tube 165e into the container 208e to form a column of loose fill 214e that surrounds the column of silicon powder and resin 222e.

After the container 208e is completely filled or the column of silicon carbide powder and resin 212e and outer column of silicon powder and resin 222e are of the desired height along the rotational axis 164e, the container 208e and its contents are removed from the forming machine 182e, subjected to a resin-binding temperature, and are allowed to cool. This causes resin in the column of silicon carbide powder and resin 212e to liquefy, re-solidify, cure, and bind together silicon carbide powder and resin in the column of silicon carbide powder and resin 212e. This also causes resin in the outer column of silicon powder and resin 222e to bind together silicon powder in the column of silicon powder and resin 222e. The lack of resin in the column of loose fill 214e and in the column of cavity fill 216e allows both the loose fill and cavity fill to remain in an unbound and free-flowing powder form. This allows the column of loose fill 214e and column of cavity fill 216e to be removed from the container by pouring the powdered loose fill and cavity fill from the container 208e.

The remaining outer column of silicon powder and resin 222e and column of silicon carbide powder and resin 212e remain as an integral, resin set greenbody. The greenbody retains a helically shaped cavity, previously occupied by the column of cavity fill 216e, having the general near-net-shape of a fluent channel of an insert heat exchanger of the invention.

The exterior dimensions of the greenbody are larger than the insert heat exchanger that is to be fabricated due to the presence of the outer column of silicon powder and resin 222e on the greenbody exterior. The relative sizing of the outer column of silicon powder and resin 222e to the column of silicon carbide powder and resin 212e depends on the amount of silicon powder needed for the wicking of the column of silicon carbide powder and resin 212e. A relative column of silicon powder and resin 222e thickness to column of silicon carbide powder and resin 212e thickness of 1.5 to 1 has been observed to generally retain a sufficient quantity of silicon powder to enable thorough silicon wicking and silicon carbide powder binding when a silicon-melting temperature of 2500° F. has been followed by silicon-wicking temperature of 3000° F. Where, as in FIG. 13, a column of silicon carbide powder and resin 212e surrounds a column of silicon powder and resin 222e in directions defined by the rotational plane, capillary absorption of molten silicon from the column of silicon powder and resin 222e and distribution and impregnation throughout the column of silicon carbide powder and resin 212e occurs inwardly. Excess amounts of molten silicon that are not absorbed and impregnated drip away or otherwise evacuate from the surface of the column of silicon carbide powder and resin 212e when subjected to the silicon-melting temperature followed by the silicon-wicking temperature. The additional greenbody dimension created by the outer column of silicon powder and resin 222e is therefore eliminated and the insert heat exchanger that is fabricated assumes the pre-fired, near-net-shape of the column of silicon carbide powder and resin 212e.

Figure 14:
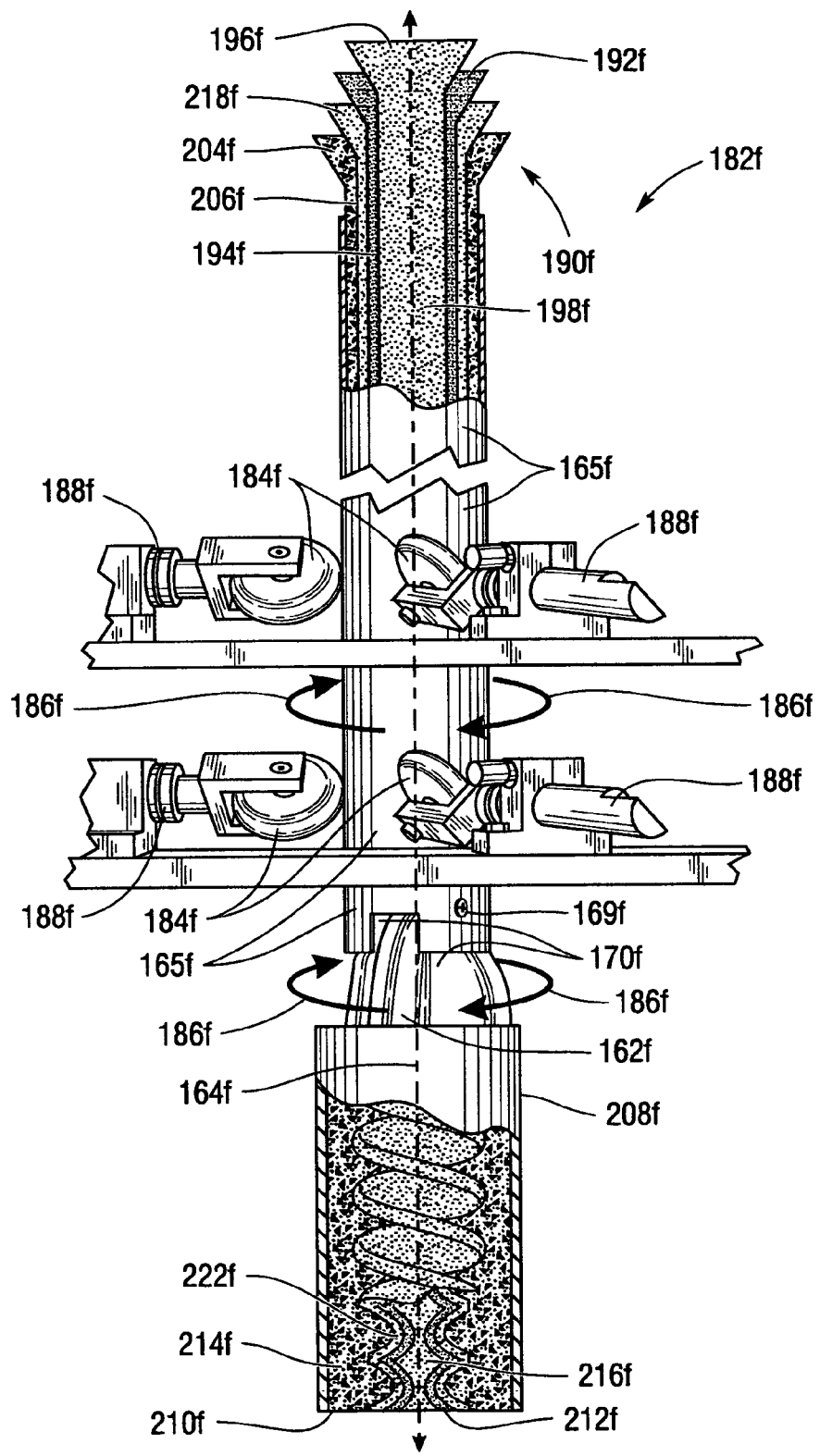
FIG. 14 depicts a partial cross sectional side view of a forming machine for fabricating insert heat exchangers according to the invention.

It is also possible to position silicon powder both inside and outside of a column of silicon carbide powder and resin. FIG. 14 depicts a partial cross sectional view of a forming machine 182f for fabricating an insert heat exchanger of the invention in which the tool 162f includes an outer silicon channel (not shown). Silicon powder and resin is supplied through an outer silicon funnel 218f to an outer silicon funnel path 220f that surrounds a silicon carbide funnel path 194f and that is surrounded by a reclaim funnel path 206f, the outer silicon funnel path 220f providing silicon powder and resin to the outer silicon channel of the tool 162f. Silicon powder and resin is also supplied as cavity fill to the cavity funnel path 198f via the cavity funnel 196f.

The formation of an insert heat exchanger of the invention using the forming machine 182f of FIG. 14 is best understood with reference to the partial cross sectional view of the container 208f in FIG. 14. The tool 162f is raised from contact with the container bottom 210f as the roller wheels 184f rotate the funnel tube 165f in the rotational direction 186f about the rotational axis 164f. As the tool 162f moves toward the position depicted in FIG. 14, cavity fill flows through the cavity channel of the tool 162f to form a column of cavity fill 216f that is a column of silicon powder and resin. Silicon carbide powder and resin flow through the silicon carbide channel of the tool 162f to form a helical column of silicon carbide powder and resin 212f that surrounds the column of cavity fill 216f. Silicon powder and resin flow through the outer silicon channel of the tool 162f to form an outer column of silicon powder and resin 222f that surrounds the column of silicon carbide powder and resin 212f. Loose fill also flows out of the reclaim channel of the funnel tube 165f into the container 208f to form a column of loose fill 214f that surrounds the outer column of silicon powder and resin 222f.

When the container 208f and its contents are removed from the forming machine 182f, subjected to a resin-binding temperature and are allowed to cool, resin in the column of cavity fill and resin 216f, column of silicon carbide powder and resin 212f, and outer column of silicon powder and resin 222f liquefies, re-solidifies, cures, and binds together silicon carbide powder and resin in the column of silicon carbide powder and resin 212f and further binds silicon powder and resin in the column of cavity fill 216f and in the outer column of silicon powder and resin 222f. The lack of resin in the column of loose fill 214f allows the loose fill to remain in an unbound and free-flowing powder form. This allows the column of loose fill 214f to be removed from the container by pouring the powdered loose fill from the container 208f.

The remaining outer column of silicon powder and resin 222f, column of silicon carbide powder and resin 212f, and column of cavity fill 216f remain as an integral, resin set greenbody. The exterior dimensions of the greenbody are larger than the insert heat exchanger that is to be fabricated due to the presence of the outer column of silicon powder and resin 222f on the greenbody exterior. The greenbody also lacks a fluent channel due to the resin set column of cavity fill 216f.

When the greenbody is heated to a silicon-melting temperature followed by heating to a silicon-wicking temperature, capillary absorption of molten silicon by the column of silicon carbide powder and resin 212f occurs outwardly from the column of cavity fill 216f and inwardly from the column of silicon powder and resin 222f. This results in distribution and impregnation of silicon throughout the column of silicon carbide powder and resin 212f. Excess amounts of molten silicon that are not absorbed by and impregnated into the column of silicon carbide powder and resin 212f drip away or otherwise evacuate from the outside and inside surfaces of the column of silicon carbide powder and resin 212f. This causes the formation of a fluent channel and allows the insert heat exchanger that is fabricated to assume the pro-fired, near-net-shape of the column of silicon carbide powder and resin 212f.

Figure 15:
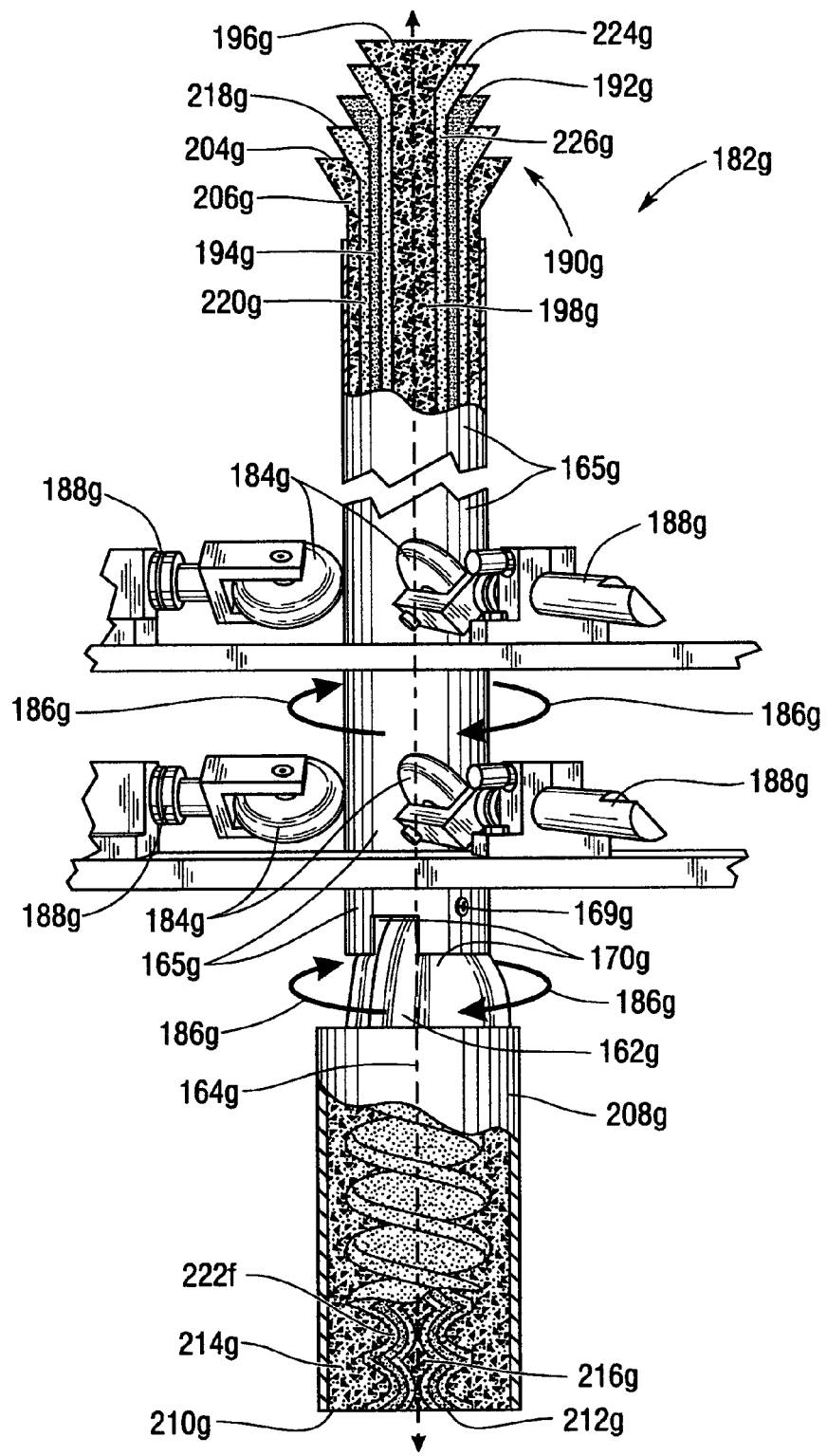
FIG. 15 depicts a partial cross sectional side view of a forming machine for fabricating insert heat exchangers according to the invention.

It is also possible to configure a forming machine to allow molten silicon to be absorbed both inwardly and outwardly by a column of silicon carbide powder and resin without completely filling the fluent channel space of the greenbody with silicon powder bound with resin. FIG. 15 depicts a partial cross sectional view of a forming machine 182g for fabricating an insert heat exchanger of the invention in which the tool 162g includes both outer and inner silicon channels (not shown) and a separate cavity channel (not shown). Silicon powder and resin is supplied through an outer silicon funnel 218g to an outer silicon funnel path 220g that surrounds a silicon carbide funnel path 194g and that is surrounded by a reclaim funnel path 206g, the outer silicon funnel path 220g providing silicon powder and resin to the outer silicon channel of the tool 162g. Silicon powder and resin is also supplied through an inner silicon funnel 224g to an inner silicon funnel path 226g that provides silicon powder and resin to the inner silicon channel of the tool 162g. The cavity funnel 196g supplies cavity fill, that does not include resin or another binder, to the cavity funnel path 198g, which in turn provides the cavity fill to the separate cavity channel of the tool 162g.

When the tool 162g is rotated in the rotational direction 186g about the rotational axis 164g and raised from contact with the container bottom 210g to the position depicted in FIG. 15, cavity fill, which does not include resin, flows through the cavity channel of the tool 162g to form a column of cavity fill 216g. Silicon powder and resin flows through the inner silicon channel of the tool 162g to form an inner column of silicon powder and resin 228g that surrounds the column of cavity fill 216g in directions defined by the rotational plane. The column of silicon carbide powder and resin 212g surrounds the inner column of silicon powder and resin 228g.

After heating the container 208g and its contents to a resin-binding temperature, the column of cavity fill 216g and column of loose fill 214g, lacking resin, remain in powdered form and can be removed from the resulting greenbody by being poured from the container 208g. Once the cavity fill is removed, a cavity exists that is surrounded by the inner column of silicon powder and resin 228g, though the cavity is smaller than the fluent channel that is present after the greenbody is heated to the silicon-melting temperature and silicon-wicking temperature due to the extra dimension of the inner column of silicon powder and resin 228g.

The presence of the inner column of silicon powder and resin 228g and the outer column of silicon powder and resin 222g allow for wicking of the column of silicon carbide powder and resin 212g to occur from both inward and outward directions when the greenbody is heated to the silicon-melting temperature. However, the presence of a cavity surrounded by the inner column of silicon powder and resin 228g allows for its thickness to be restricted relative to the thickness of the column of silicon carbide powder and resin 212g, allowing for an optimal ratio of silicon to silicon carbide to be achieved prior to wicking. This restriction in size also allows the amount of silicon carbide powder that is mixed with resin to be reduced, allowing for a reduction in the amount of resin consumed and further allowing for the increased use of resin-free silicon powder, which can be re-used as cavity fill after being poured away from a greenbody.

Figure 16:
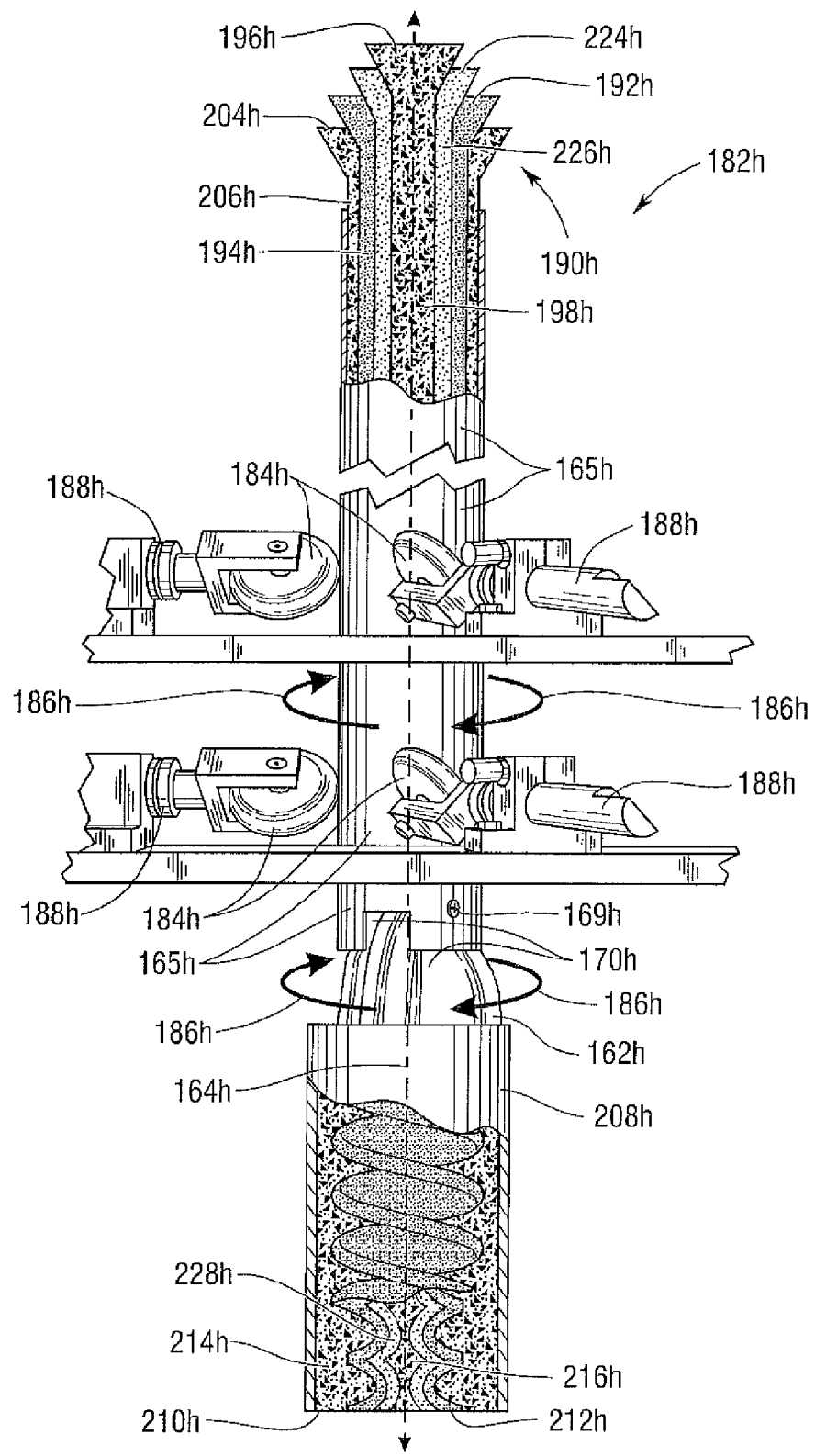
FIG. 16 depicts a partial cross sectional side view of a forming machine for fabricating insert heat exchangers according to the invention.

The inclusion of a column of cavity fill and separate inner column of silicon powder and resin also allows for the omission of an outer column of silicon powder and resin while retaining the ability to restrict the amount of silicon powder used. FIG. 16 depicts a partial cross sectional view of a forming machine 182h for fabricating an insert heat exchanger of the invention in which the tool 162h includes an inner silicon channel (not shown) and a cavity channel (not shown), but no outer silicon channel.

When the tool 162h is rotated in the rotational direction 186h about the rotational axis 164h and raised from contact with the container bottom 210h to the position depicted in FIG. 16, a column of cavity fill 216h is formed that is surrounded by an inner column of silicon powder and resin 228h. There is no column of silicon powder and resin between the column of silicon carbide powder and resin 212h and the column of loose fill 214h. As a result, when the formed greenbody, which includes the inner column of silicon powder and resin 228h and the column of silicon carbide powder and resin 212h, is heated first to a silicon-melting temperature and then to a silicon-wicking temperature, molten silicon wicks in an outward direction to permeate silicon carbide powder in the column of silicon carbide powder and resin 212h.

Figure 17:
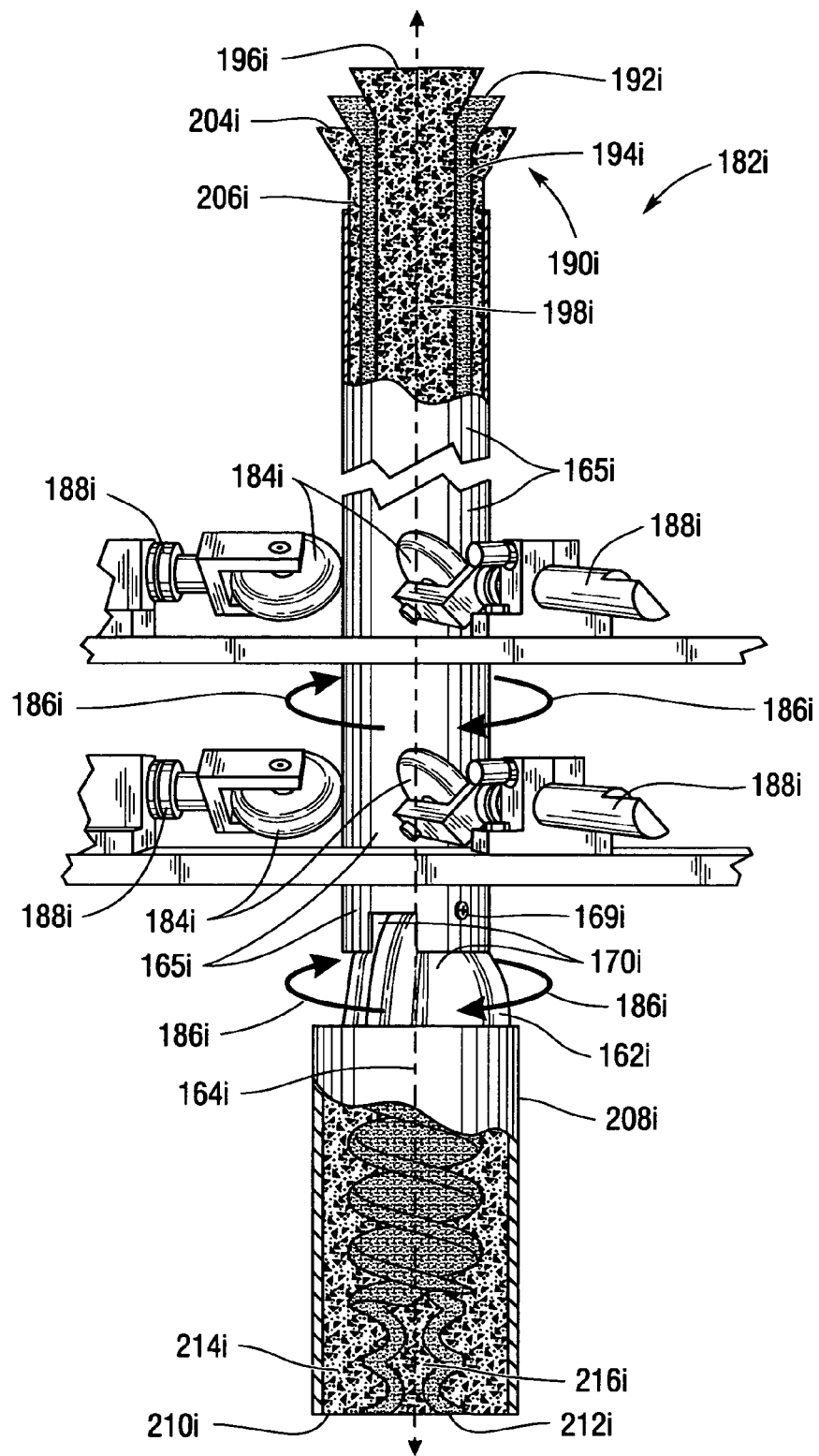
FIG. 17 depicts a partial cross sectional side view of a forming machine for fabricating insert heat exchangers according to the invention.

During the fabrication of an insert heat exchanger of the invention, it is also possible to omit an inner or outer column of silicon powder and resin until after a greenbody has been formed. FIG. 17 depicts a partial cross sectional view of a forming machine 182i for fabricating an insert heat exchanger of the invention in which the tool 162i has no inner or outer silicon channels. Cavity fill is supplied through a cavity funnel to cavity funnel path 198i to provide cavity fill to the cavity chamber of the tool 162i. Silicon carbide powder and resin are supplied through a silicon carbide funnel 192i to a silicon carbide funnel path 194i to providing silicon carbide powder and resin to the silicon carbide channel of the tool 162i.

When the tool 162i is rotated in the rotational direction 186i about the rotational axis 164i and raised from contact with the container bottom 210i to the position depicted in FIG. 17, cavity fill, which does not include resin, flows through the cavity channel of the tool 162i to form a column of cavity fill 216i. Silicon carbide powder and resin flows through the silicon carbide channel of the tool 162i to form a column of silicon carbide powder and resin 228i that surrounds the column of cavity fill 216i in directions defined by the rotational plane. A column of loose fill 214i surrounds the column of silicon carbide and resin 228i.

After heating the container 208i and its contents to a resin-binding temperature, the column of cavity fill 216i and column of loose fill 214i, lacking resin, remain in powdered form and can be removed from the resulting greenbody by being poured from the container 208i. The remaining greenbody lacks a column of silicon powder and resin and consists entirely of the remaining column of silicon carbide and resin 228i. The greenbody therefore has a near-net-shape of the insert heat exchanger that is being fabricated.

To allow the column of silicon carbide and resin 228i to be heated in the presence of silicon, silicon powder can be sprinkled or otherwise applied directly on to the outer surface of the greenbody, into the near-net-shape fluent chamber of the greenbody, or both on to the outer surface and into the fluent chamber of the greenbody. It has been found that even localized application of silicon powder on the greenbody can allow for distribution and impregnation of molten silicon throughout the greenbody when the greenbody is heated to a silicon-wicking temperature. Therefore, the even application of silicon over and throughout the greenbody is optional, but may be unnecessary. After heating the greenbody and applied silicon to the silicon-melting temperature and silicon wicking temperature, the resulting fired insert heat exchanger returns to a size and shape that is substantially the near-net-shape and size of the column of silicon carbide and resin 228*i* of the greenbody.

Figure 18A:
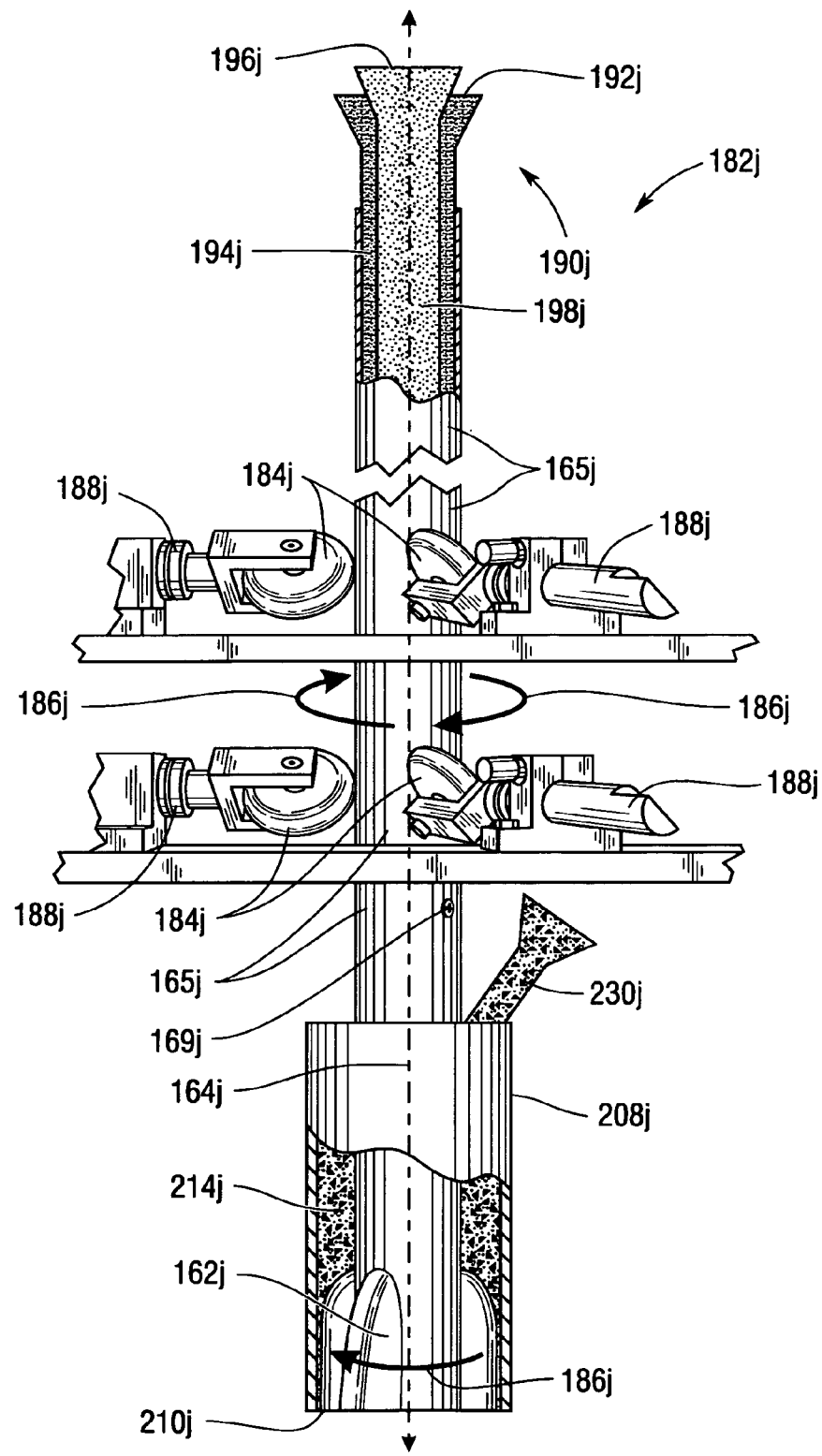
FIG. 18A depicts a partial cross sectional side view of a forming machine for fabricating insert heat exchangers according to the invention.

The fabrication of insert heat exchangers of the invention may also involve the sequential formation of one or more powder columns. FIGS. 18A and B depict partial cross sectional views of a forming machine 182*j* for fabricating an insert heat exchanger of the invention in which the tool 162*j* includes only a cavity channel (not shown) and a silicon carbide channel (not shown). Silicon carbide powder and resin are supplied through a silicon carbide funnel 192*j* to a silicon carbide funnel path 194*g*, providing silicon carbide powder and resin to the silicon carbide channel of the tool 162*j*. Cavity fill is supplied through a cavity funnel 196*j* to a cavity funnel path 198*j*, providing cavity fill to the cavity channel of the tool 162*j*. No reclaim funnel or reclaim funnel path are included within the funnel tube 165*j*.

Figure 18B:
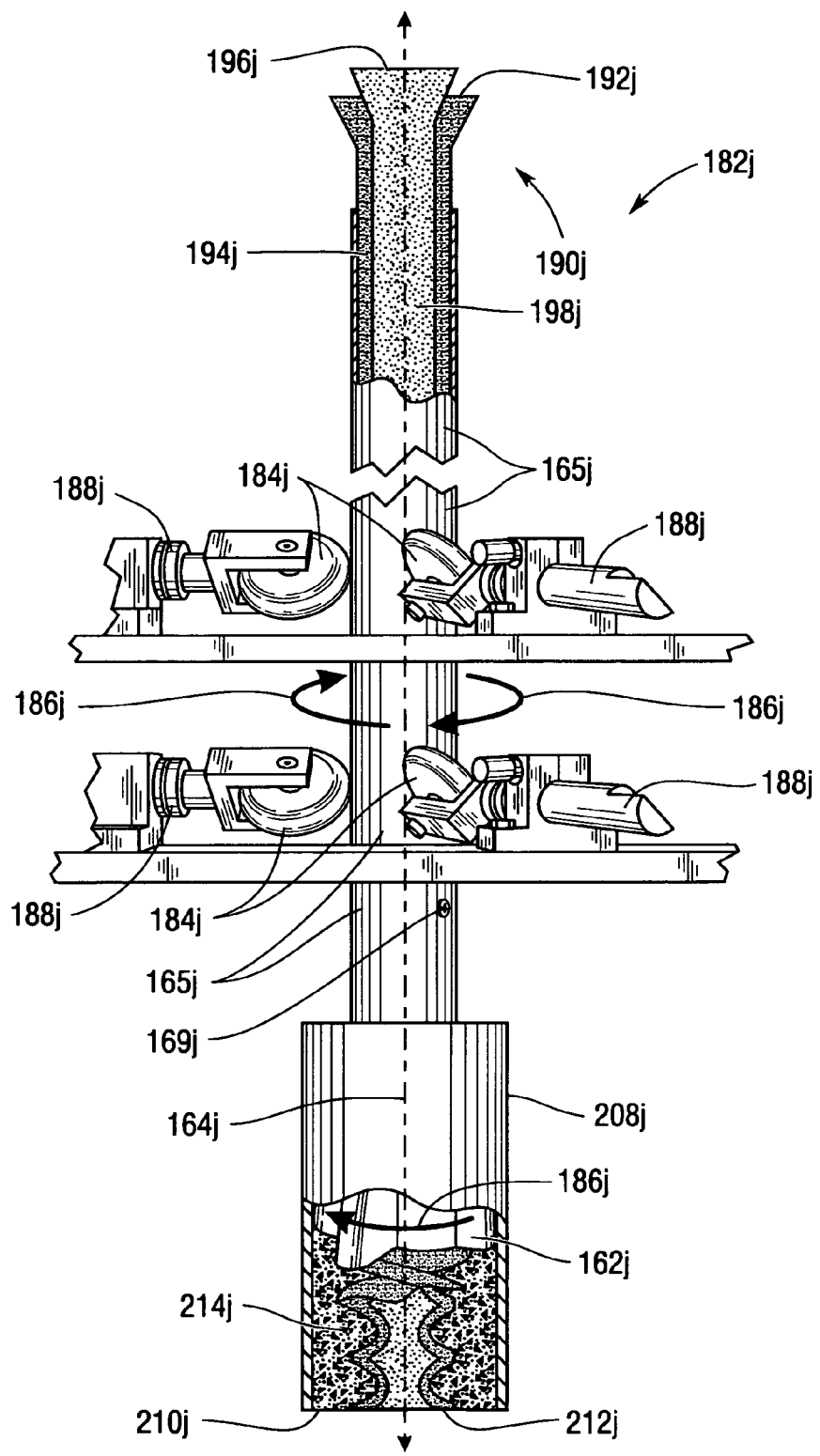
FIG. 18B depicts a partial cross sectional side view of the forming machine of FIG. 18A.

After the tool 162*j* is lowered to the container bottom 210*j*, a separate reclaim container funnel 230*j* is inserted into the container 208*j* and is used to fill the container 208*j* with a column of loose fill 214*j*, submerging the tool 162*j* as shown in FIG. 18A. After the container 208*j* is partially filled with loose fill, the reclaim container funnel 230*j* is removed. The tool 162*j* and funnel tube 165*j* are then rotated in the rotational direction 186*j* about the rotational axis 164*j*, the tool 162*j* being raised from contact with the container bottom 210*j*. As the tool 162*j* and funnel tube 165*j* move to the positions depicted in FIG. 18B, a column of silicon carbide powder and resin 212*j* is deposited that is surrounded in directions defined by the rotational plane by the column of loose fill 214*j*. The tool 162*j* also deposits a column of cavity fill 216*j* containing resin that is surrounded by the column of silicon carbide powder and resin 212*j*.

The forming machine of FIGS. 18A and B allows the column of silicon carbide powder and resin 212*j* and the column of cavity fill 216*j* to be formed within the container 208*j* after the container 208*j* has been filled with the column of loose fill 214*j*. However, as the tool 162*j* and funnel tube 165*j* are rotated in the rotational direction 186*j* about the rotational axis 164*j* and are raised from the position depicted in FIG. 18A to the position depicted in FIG. 18B, considerable drag is created by the powder loose fill. As a result, a more powerful method of actuating the lifting and rotation of the funnel tube 165*d* and tool 162*d*, such as a larger or more powerful electric motor or combination drive system, must normally be used.

Figure 19A:
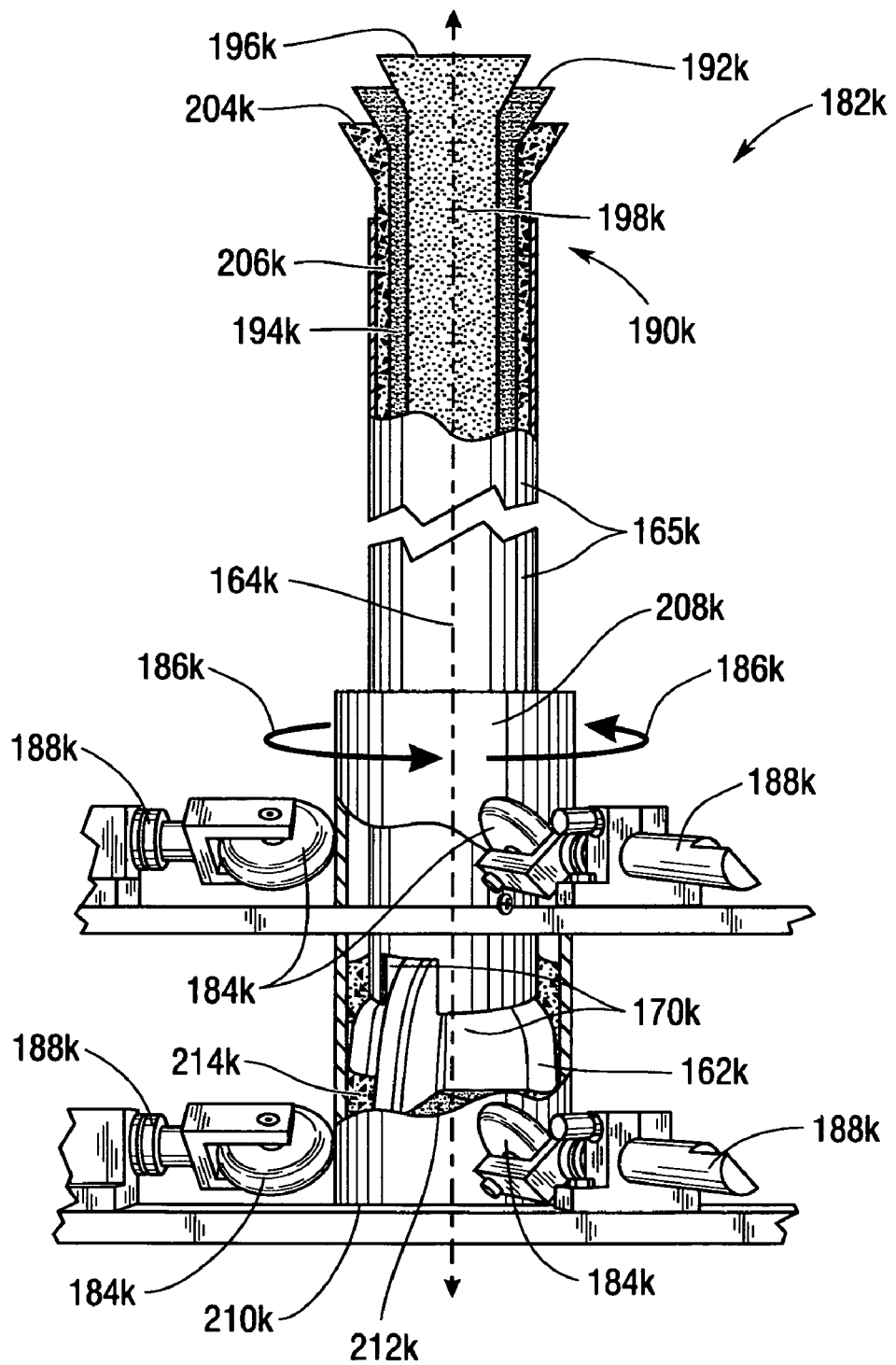
FIG. 19A depicts a partial cross sectional side view of a forming machine for fabricating insert heat exchangers according to the invention.

Although forming machines for fabricating insert heat exchangers have been shown and described as having funnel tubes and tools that are rotated about a rotational axis across a rotational plane, it will be appreciated that the fabrication of insert heat exchangers can also be conducted using stationary funnel tubes and tools. FIGS. 19A and B depict a partial cross sectional view of a forming machine 182*k* for fabricating an insert heat exchanger of the invention in which the funnel tube 165*k* and tool 162*k* are positioned to remain stationary and therefore do not rotate about the rotational axis 164*k*. Rather than engaging the funnel tube 165*k*, the roller wheels 184*k* are positioned to engage the outer rolled surface of the cylindrical container 208*k*, which is itself configured to rotate and move along the rotational axis 164*k*. The roller wheels 184*k* cause the container 208*k* to rotate at a twist rate c according to the common pitch angle that is shared by each of the wheels 184*k*, the twist rate corresponding to the twist rate of an insert heat exchanger fabricated with the forming machine 182*k*. Actuation of movement of the container 208*k* along the rotational axis can be by an electric motor, hydraulic, pneumatic, manually operated or combination drive system that causes the upward movement of the container 208*k* or by mechanically driving the individual roller wheels 184*k*.

Figure 19B:
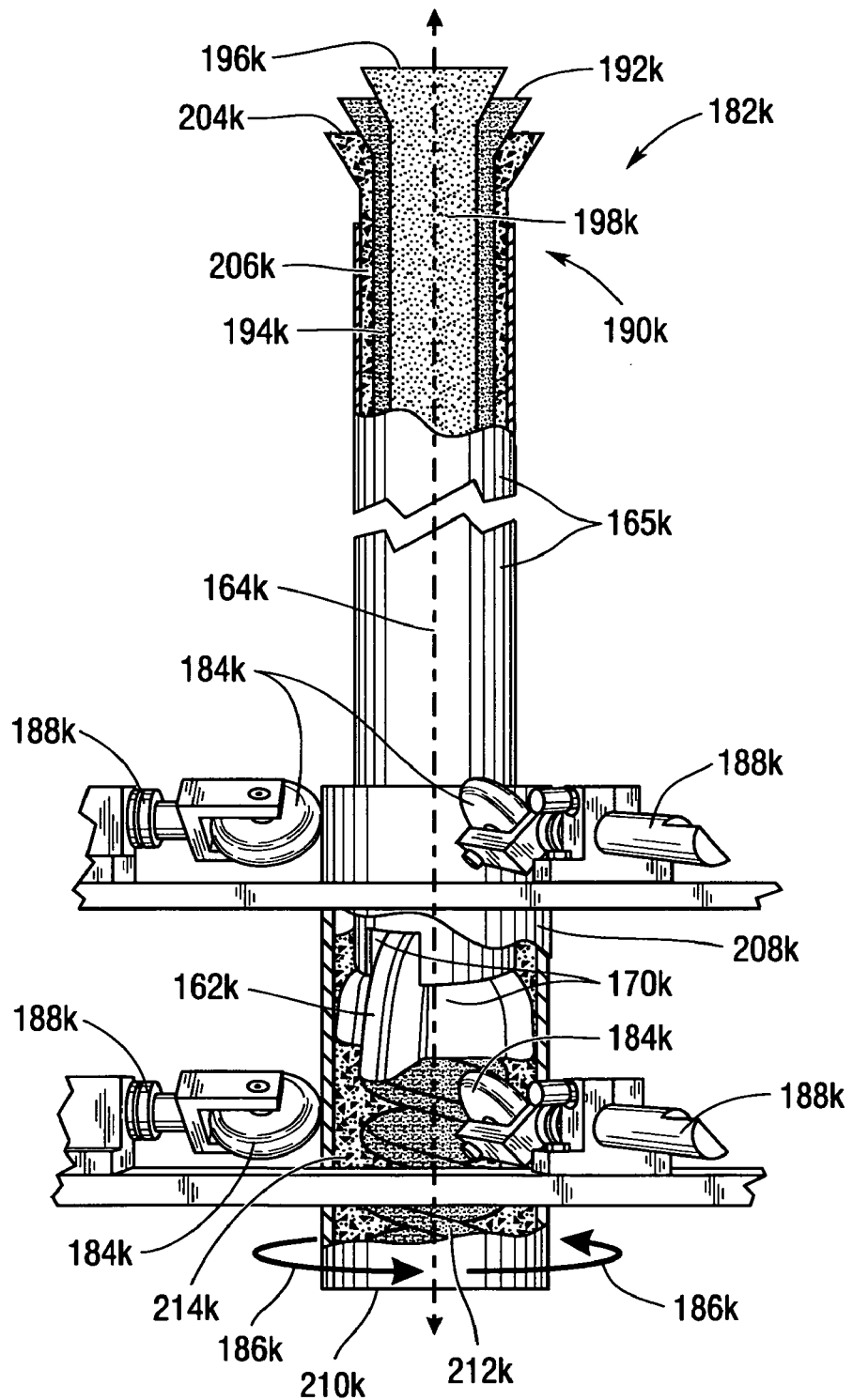
FIG. 19B depicts a partial cross sectional side view of the forming machine of FIG. 19A.

In forming an insert heat exchanger of the invention with the forming machine 182*k* of FIGS. 19A and B, the container 208*k* is raised up over the lower end of the funnel tube 165*k* until the tool 162*k* contacts the container bottom 210*k* so that the container bottom 210*k* is generally flush against the bottom of the tool 162*k* across the rotational plane. Cavity fill that is silicon powder and resin is then supplied to the cavity funnel path 198*k* via the cavity funnel 196*k*, silicon carbide powder and resin is supplied to the silicon carbide funnel path 194*k* via the silicon carbide funnel 192*k*, and loose fill is supplied to the reclaim funnel path 206*k* via the reclaim funnel 204*k*. The container 208*k* is then rotated in the rotational direction 186*k* and moved downward along the rotational axis 164*k*, first to the position depicted in FIG. 19A, and then to the position depicted in FIG. 19B. This downward movement of the container 208*k* along the rotational axis 164*k* allows the cavity fill, silicon carbide powder and resin, and loose fill to flow through appropriate channels of the tool 162*k* to create a column of cavity fill (not shown in FIGS. 19A and B), a column of silicon carbide powder and resin 212*k*, and a column of loose fill 214*k*. The rotational movement of the container 208*k* about the rotational axis 164*k* allows for the formation of a helical shape of the column of silicon carbide powder and resin 212*k*, which ultimately assumes the near-net-shape of the insert heat exchanger that is fabricated after heating of the container 208*k*, its contents, and the resulting greenbody as described above with respect to FIGS. 12A through C.

It will be further appreciated that forming machines can be configured to fabricate insert heat exchangers without the use of roller wheels. For example, FIGS. 20A and B depict a partial cross sectional view of a forming machine 182*l* having a funnel tube 165*l* and tool 162*l* that are positioned to remain stationary and therefore do not rotate about the rotational axis 164*l*. The container 208*l* is positioned on a rotary table 232*l* mounted on the upward extending drive shaft 234*l* of a rotary motor 236*l*. The rotary motor 236*l* is mounted to the underside of a vertical slide table 238*l*, through which the drive shaft 234*l* extends and is positioned to rotate in the rotational direction 186*l* about the rotational axis 164*l*. The positioning of the container 208*l* on the rotary table 232*l*, which is rotatable with the drive shaft 234*l* of the rotary motor 236*l*, allows the container 208*l* to rotate about the rotational axis 164*l* with respect to the slide table 238*l*, funnel tube 165*l*, and tool 162*l* when the rotary motor 236*l* turns.

The slide table 238*l* has female threads 240*l* that are positioned to engage male threads 242*l* of a linear screw drive 244*l*. The linear screw drive 244*l* is connected to a linear drive motor 246*l* that rotates the linear screw drive 244*l* along its major dimensional axis to cause the slide table to move in upward and/or downward directions with respect to the rotational axis 164*l*, thereby causing the rotary motor 236*l* and container 208*l* to move upward and/or downward along the rotational axis 164*l*.

Figure 20A:
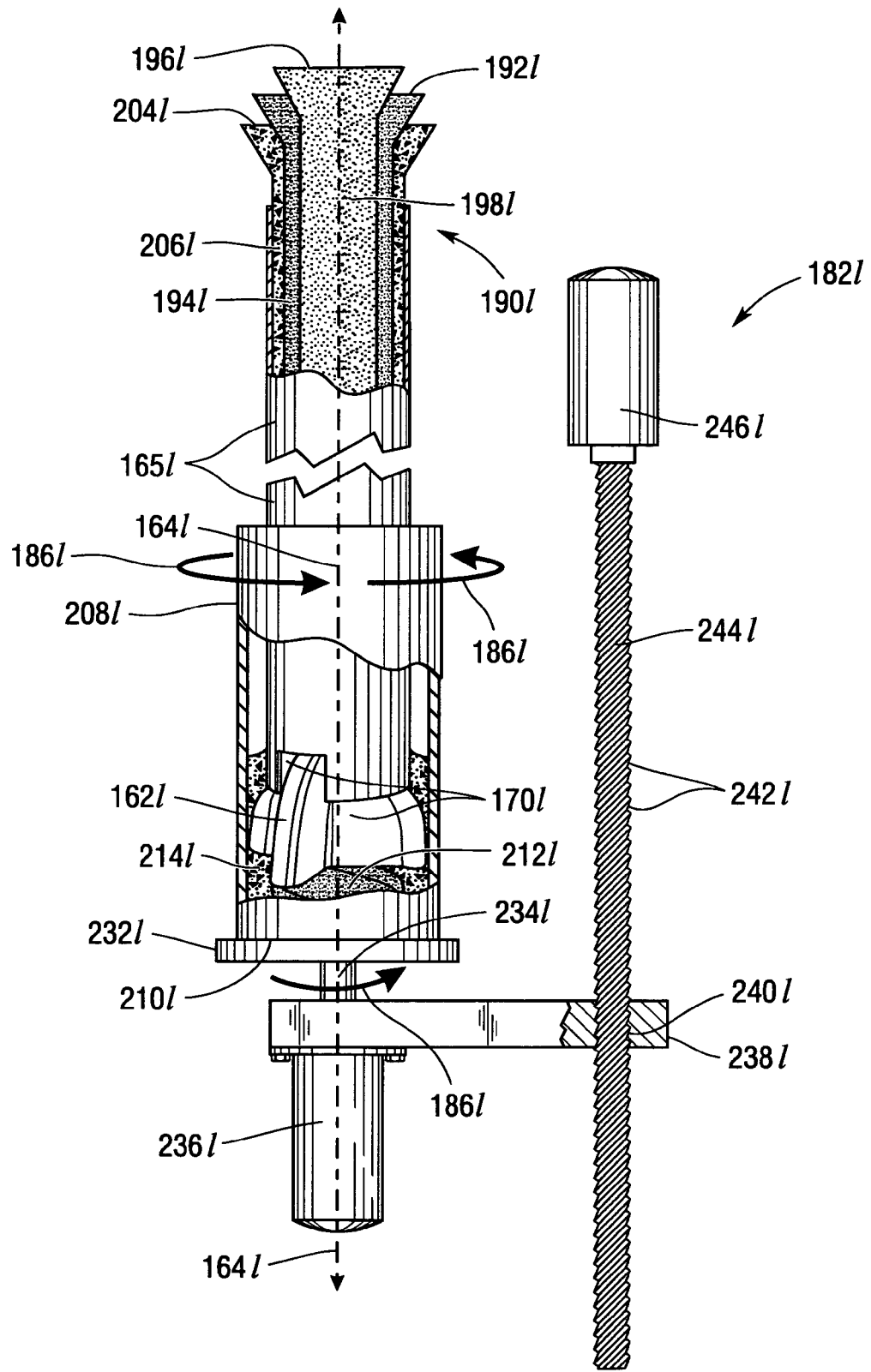
FIG. 20A depicts a partial cross sectional side view of a forming machine for fabricating insert heat exchangers according to the invention.

In forming an insert heat exchanger of the invention with the forming machine 182*l* of FIGS. 20A and B, the container 208*l* is raised up over the lower end of the funnel tube 165*l* until the tool 162*l* contacts the container bottom 210*l* so that the container bottom 210*l* is generally flush against the bottom of the tool 162*l* across the rotational plane. Cavity fill that is silicon powder and resin is then supplied to the cavity funnel path 198*l* via the cavity funnel 196*l*, silicon carbide powder and resin is supplied to the silicon carbide tunnel path 194*i* via the silicon carbide funnel 192*l*, and loose fill is supplied to the reclaim funnel path 206*l* via the reclaim funnel 204*l*.

Figure 20B:
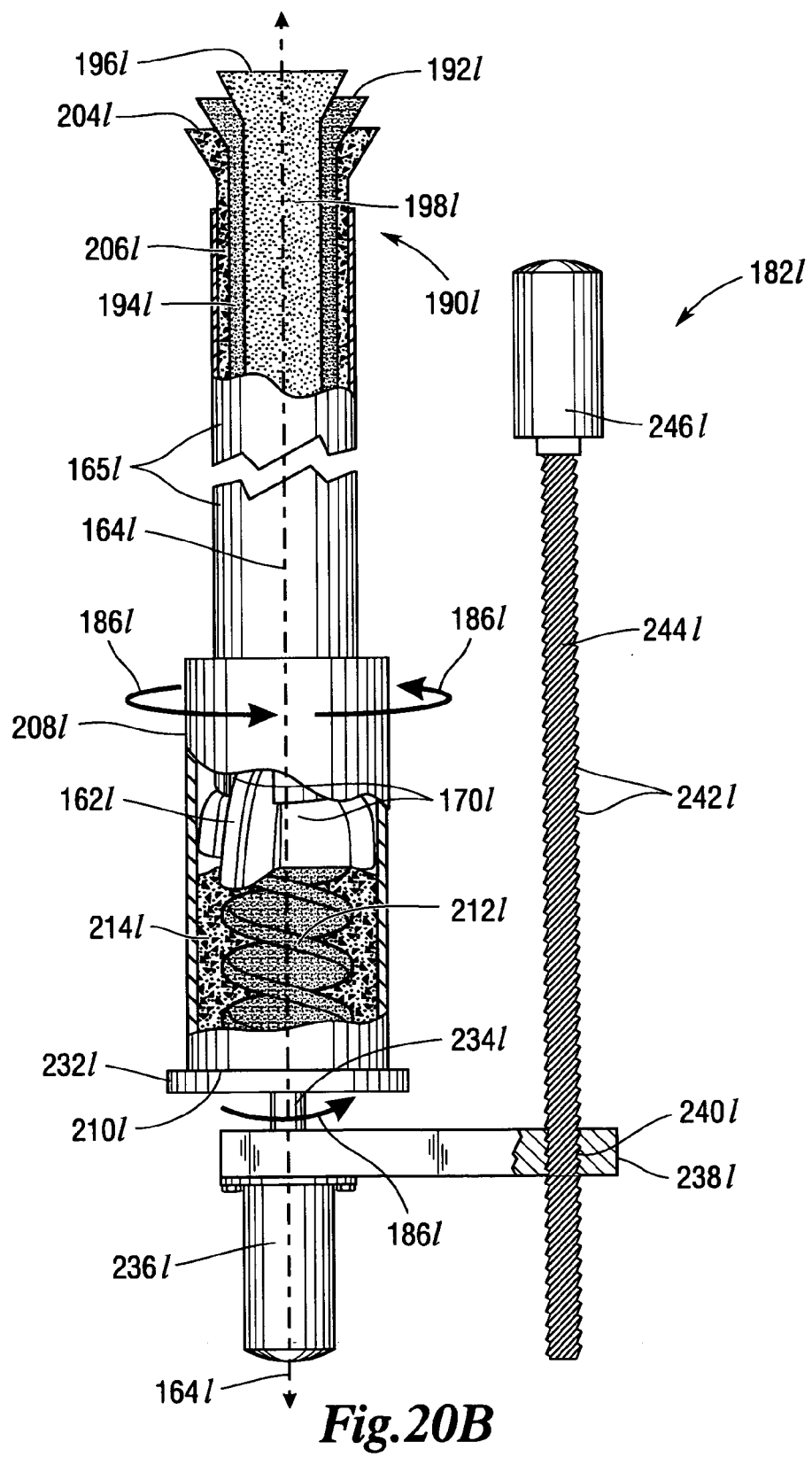
FIG. 20B depicts a partial cross sectional side view of the forming machine of FIG. 20A.

The rotary motor 236*l* rotates the rotary table 232*l* and container 208*l* in the rotational direction 186*l* while, simultaneously, the linear drive motor 246*l* rotates the linear screw drive 244*l* to cause the vertical slide table 238*l* to move downward. This causes the rotary table 232*l* and container 208*l* to also move downward along the rotational axis 164, first to the position depicted in FIG. 20A, and then to the position depicted in FIG. 20B, as the rotary table 232*l* and container 208*l* are rotated. The downward movement of the container 208*l* along the rotational axis 164*l* allows the cavity fill, silicon carbide powder and resin, and loose fill to flow through appropriate channels of the tool 162*l* to create a column of cavity fill (not shown in FIGS. 20A and B), a column of silicon carbide powder and resin 212*l*, and a column of loose fill 214*l*. The rotational movement of the container 208*l* about the rotational axis 164*l* allows for the formation of a helical shape of the column of silicon carbide powder and resin 212*l*, which ultimately assumes the near-net-shape of the insert heat exchanger that is fabricated after heating of the container 208*l*, its contents, and the resulting greenbody as described above with respect to FIGS. 12A through C.

Slight modifications to the shape of the silicon carbide channel, cavity channel and other characteristics of a tool used in a forming machine can allow for variations in the cross sectional shape of an inlet heat exchanger fabricated according to the invention. For example, consider FIG. 21, which depicts a cross sectional end view of an insert heat exchanger 114*m* of the invention that is similar to the insert heat exchanger 114*b* of FIG. 5, the heat exchanger 114*m* of FIG. 5 having two wings 140*m* and a fluent channel 124*m* that comprises a unidirectional flow path 148*m* for accommodating flowing heat transfer fluid. The outer profile rings 248*m* through 248*ad* in FIGS. 21 through 38 represent the visible outer ceramic walls 112*m* and wings 140*m* through 112*ad* that are visible in each end view due to the helical shape of each depicted insert heat exchanger 114*m* through 114*ad* of the invention. A slight variation in the shape of the silicon carbide channel of the tool would allow for the fabrication of the insert heat exchanger 114*n* depicted in FIG. 22, having a tapered in fluent channel 124*n* that is wider at the exchanger axis 150*n* than at the wings 140*n*. Among other additional contemplated cross sectional configurations of contemplated insert heat exchangers of the invention are those depicted in FIGS. 23 through 38.

FIG. 23 depicts an insert heat exchanger 114*o* of the invention having a unidirectional flow path 148*o* and a tapered out fluent channel 124*o*. The fluent channel 124*o* is wider at the exchanger axis 150*o* than at the wings 140*o*.

FIG. 24 depicts an insert heat exchanger 114*p* of the invention having a unidirectional flow path 148*p* and a corrugated fluent channel 124*p*. Individual corrugations 250*p* are formed into the outer ceramic wall 112*p* according to a pattern included in the silicon carbide chamber of the tool used for fabrication.

FIG. 25 depicts an insert heat exchanger 114*q* of the invention having a unidirectional flow path 148*q* and a finned fluent channel 124*q*. Individual fins 252*q* are also formed into the outer ceramic wall 112*q* according to a pattern included in the silicon carbide chamber of the tool used for fabrication.

FIG. 26 depicts an insert heat exchanger 114*r* of the invention having both a counter flow path 121*r* and a parallel flow path 125*r* divided with an inter path division 129*r*. Though similar to the insert heat exchanger 114*a* of FIG. 2, the insert heat exchanger 114*r* of FIG. 26 includes a narrower counter flow path 121*r* and a parallel flow path 125*r* due to reduced spacing between the outer ceramic walls 112*r*.

Figure 27:
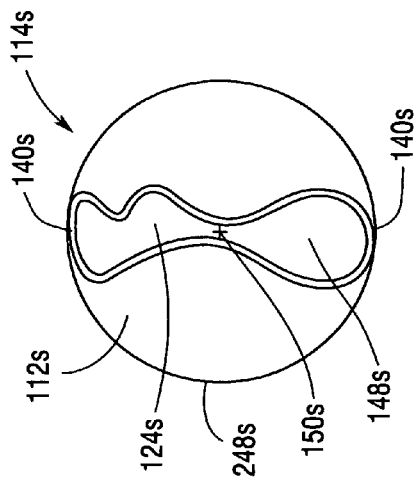
FIG. 27 depicts a cross sectional end view of an insert heat exchanger of the invention.
Figure 29A:
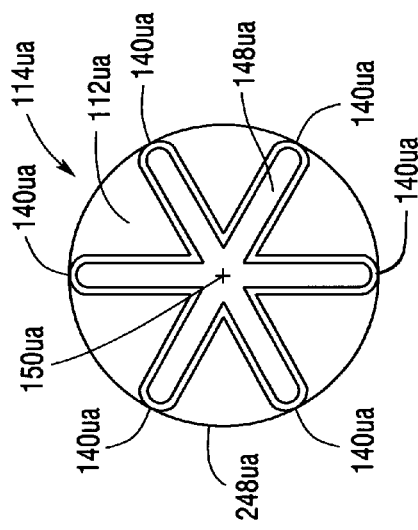
FIG. 29A depicts a cross sectional end view of an insert heat exchanger of the invention.
Figure 31:
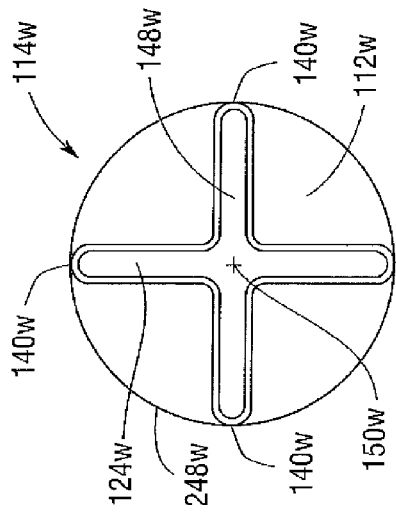
FIG. 31 depicts a cross sectional end view of an insert heat exchanger of the invention.

FIG. 27 depicts an insert heat exchanger 114*s* of the invention having an irregular fluent channel 124*s* in which the wings 140*p* lack relative symmetry with respect to the exchanger axis 150*s*.

Figure 28:
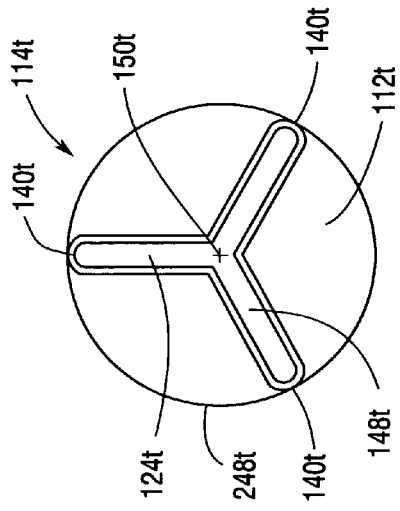
FIG. 28 depicts a cross sectional end view of an insert heat exchanger of the invention.
Figure 29B:
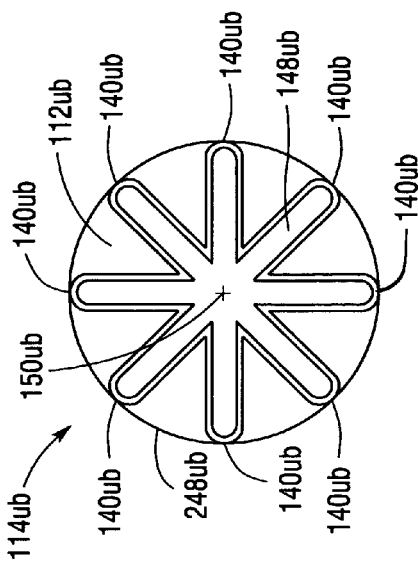
FIG. 29B depicts a cross sectional end view of an insert heat exchanger of the invention.

FIG. 28 depicts an insert heat exchanger 114*t* of the invention having a unidirectional flow path 148*t* and three wings 140*t*, similar to the insert heat exchanger 122*c* of FIG. 6, providing three spiral paths for the products of energy generation to pass when used in a heated energy system according to the invention. The insert heat exchanger 114*t* of FIG. 28 can be compared to another contemplated insert heat exchanger 114*ua* of FIG. 29A which includes six wings 140*ua*, creating six spiral paths for the products of energy generation, and FIG. 29B which includes eight wings 140*ub*, creating eight spiral paths for the products of energy generation. It will be appreciated that other insert heat exchangers of the invention may include other numbers of wings.

Figure 33:
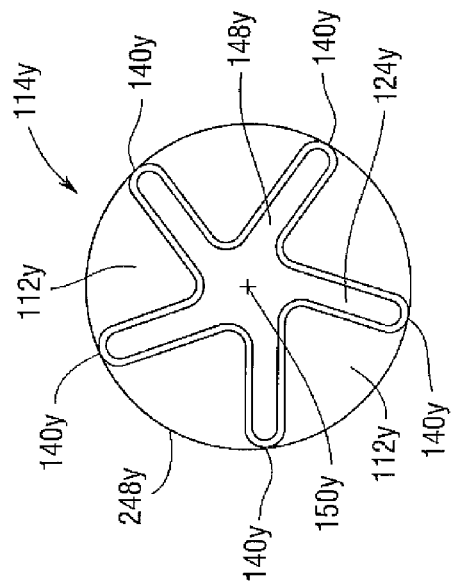
FIG. 33 depicts a cross sectional end view of an insert heat exchanger of the invention.
Figure 30:
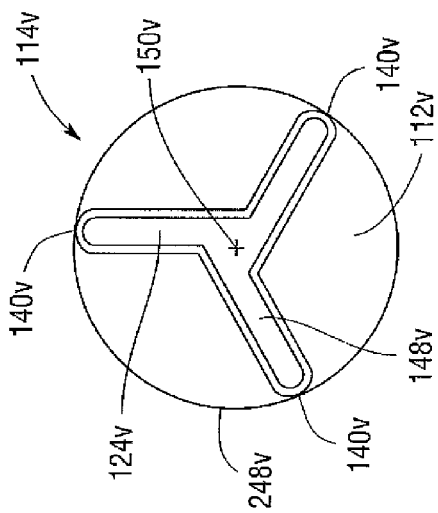
FIG. 30 depicts a cross sectional end view of an insert heat exchanger of the invention.
Figure 32:
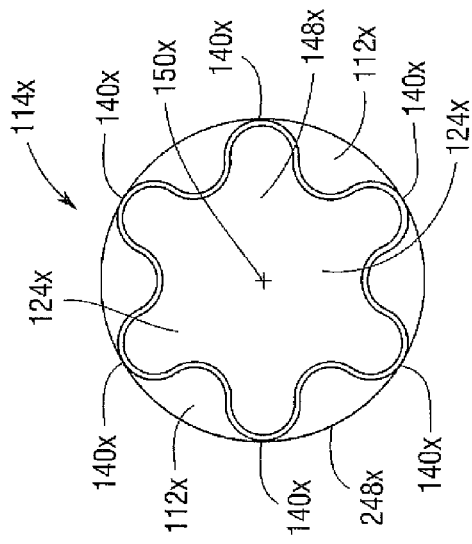
FIG. 32 depicts a cross sectional end view of an insert heat exchanger of the invention.

FIG. 30 depicts a comparable insert heat exchanger 114*v* of the invention having three eccentric wings 140*v* that create three eccentric spiral paths for the products of energy generation. Also comparable is FIG. 31, which depicts an insert heat exchanger 114*y* of the invention having a unidirectional flow path 148*y* and four wings 140*t* providing four spiral paths for the products of energy generation, and the insert heat exchanger 114*x* of FIG. 32, which includes six reduced length six wings 140*x* creating six reduced sized spiral paths. FIG. 33 depicts an insert heat exchanger 114*y* of the invention having five eccentric wings 140*y* creating five eccentric spiral paths.

FIG. 34 depicts an insert heat exchanger 114*z* of the invention having a unidirectional flow path 148*z* and an enlarged fluent channel 124*z* created by increased spacing between the outer ceramic walls 112*z*.

FIG. 35 depicts an insert heat exchanger 114*aa* of the invention having a counter flow path 121*aa* along the center exchanger axis 150*aa* which allows for heat transfer fluid to return through two parallel flow paths 125*aa* that are located in the wings 140*aa* and away from the axis 150*aa*. It will be appreciated that a similar configuration having a single counter flow path along a center exchanger axis and parallel flow paths located in two wings is also possible.

FIG. 36 depicts an insert heat exchanger 114*ab* of the invention having a counter flow path 121*ab* along the center exchanger axis 150*ab* which allows for heat transfer fluid to return through three parallel flow paths 125*ab* that are located in the wings 140*ab* and away from the axis 150*ab*. It will be appreciated that a similar configuration having a single counter flow path along a center exchanger axis and parallel flow paths located in three wings is also possible.

FIG. 37 depicts an insert heat exchanger 114*ac* of the invention having both a counter flow path 121*ac* and a counter flow path 121*ac* divided with an inter path division 129*ac*. Though similar to the insert heat exchanger 114*a* of FIG. 2, the insert heat exchanger 114*ac* of FIG. 26 includes a wider counter flow path 121*ac* and parallel flow path 125*ac* due to increased spacing between the outer ceramic walls 112*ac*.

FIG. 38 depicts an insert heat exchanger 114*ad* of the invention having two wings 140*ad* and a fluent channel 124*ad* that comprises a unidirectional flow path 148*ad*. Though similar to the insert heat exchanger 114*m* of FIG. 21, the insert heat exchanger 114*ad* of FIG. 38 includes a narrower flow path 148*ad* due to reduced spacing between the outer ceramic walls 112*ad*.

It will be further appreciated that such variations in the cross sectional shapes of insert heat exchangers fabricated according to the invention can also allow for variations in the cross sectional shapes of surrounding fluid path enclosures according to the invention. For purposes of comparison in FIGS. 40 through 42, FIG. 39 depicts a cross sectional view of an insert heat exchanger 114ae, similar to the insert heat exchanger 114c depicted in FIGS. 6-8, the insert heat exchanger 114ae of FIG. 39 being positioned within a surrounding fluid path enclosure 105ae that is represented with two coaxial circles. The outermost dimension of each wing 140ae contacts the inside surface of the surrounding fluid path enclosure 105ae to create multiple, separate spiral paths for the products of energy generation.

FIG. 40 depicts an insert heat exchanger 114af of the invention positioned within a three-wing surrounding fluid path enclosure 105af. The surrounding fluid path enclosure 105af is helical, with the visible profile of the helical shape being represented with the visible enclosure ring 254af. The surrounding fluid path enclosure 105af also has a twist rate that matches that of the helical insert heat exchanger 114af that it surrounds, allowing the outermost dimension of each wing 140af of the insert heat exchanger 114af to match and contact the inside surface of corresponding enclosure wings 256af, creating multiple and separated spiral paths for the products of energy generation.

FIG. 41 depicts a three-wing insert heat exchanger 114ag of the invention similar to that of FIG. 39 positioned within a surrounding fluid path enclosure 105ag having a circular cross sectional shape. However, the insert heat exchanger 114ag and surrounding fluid path enclosure 105ag are sized to allow for a slight clearance 258ag to exist between the outermost extent of each wing 140ag of the heat exchanger 114ag, as best understood with reference to the visible outer profile ring 248ag, and the inside surface of the surrounding fluid path enclosure 105ag. The inclusion of the clearance 258ag between the heat exchanger 114ag and fluid path enclosure 105ag allows for some fluid products of energy generation to be shared between the separate spiral paths throughout the length of the fluid path enclosure 105ag.

FIG. 42 depicts an insert heat exchanger 114ah of the invention positioned within a helical, three-wing surrounding fluid path enclosure 105ah, the visible profile of the helical shape of the enclosure 105ah being represented with the visible enclosure ring 254ah. The surrounding fluid path enclosure 105ah also has a twist rate that matches that of the helical insert heat exchanger 114ah that it surrounds, allowing the outermost dimension of each wing 140ah of the insert heat exchanger 114ah to match that of the inside surface of corresponding enclosure wings 256ah. However, the insert heat exchanger 114ah and surrounding fluid path enclosure 105ah are sized to allow for a slight clearance 258ah to exist between the outermost extent of each wing 140ah of the heat exchanger 114ah, as best understood with reference to the visible outer profile ring segments 248ah of the heat exchanger 114ah and the inside surface of the surrounding fluid path enclosure 105ah, allowing for some fluid products of energy generation to be shared between the separate spiral paths throughout the length of the fluid path enclosure 105ah.

Figure 43:
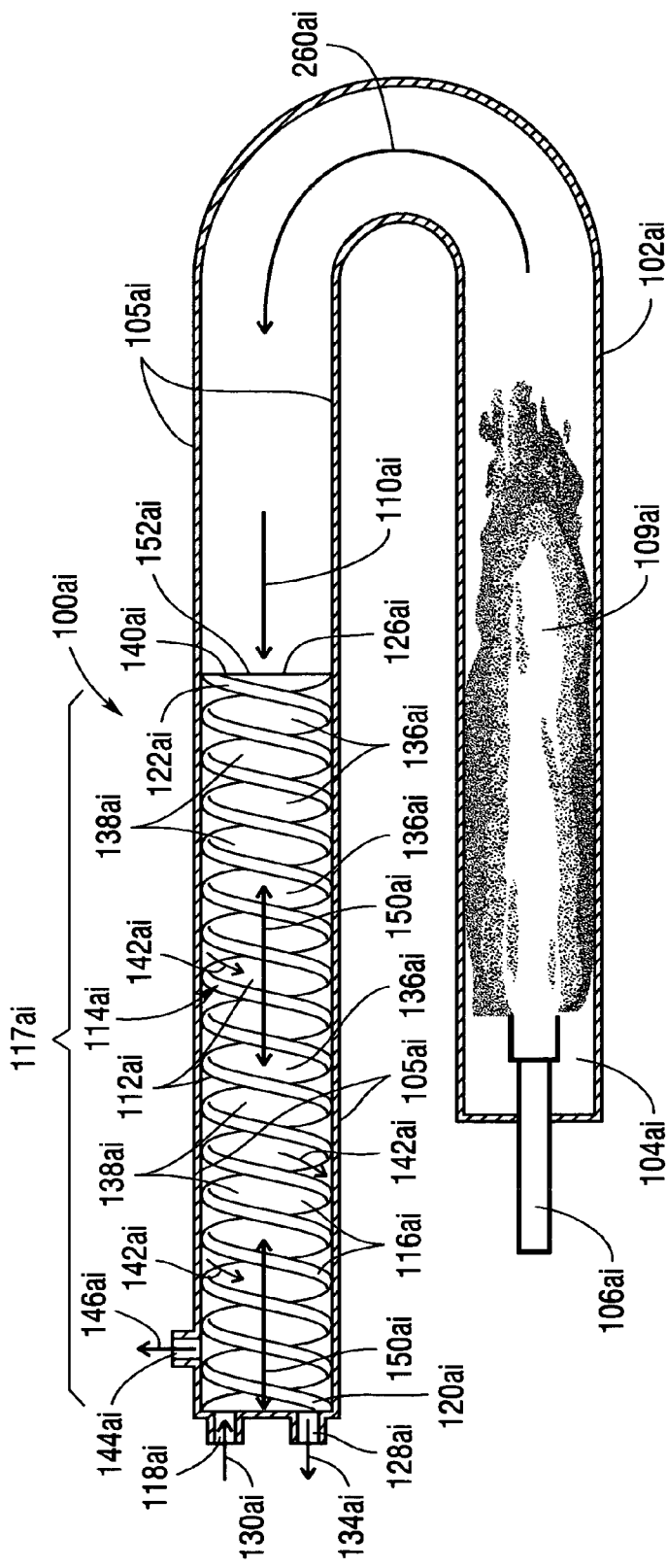
FIG. 43 depicts a cross sectional view of an insert heat exchanger and surrounding fluid path enclosure of the invention.

Although the invention has been shown and described as being used a heated energy system that includes a linear shaped radiant tube, it will be appreciated that other system configurations are also possible. FIG. 43 depicts a side cross sectional view of a heated energy system 100ai of the invention that includes a u-shaped radiant tube 102ai having a combustion chamber 104ai and a surrounding fluid path enclosure 105ai. Fuel, such as natural gas or other combustible fluid enters the radiant tube 102ai through an inlet 106ai and is ignited with a burner 108ai. The combusting fuel 109ai produces products of energy generation within the combustion chamber 104ai, and then travel along a u-shaped section 260ai of the surrounding fluid path enclosure 105ai, in the downstream direction 110a, before contacting and interacting with the outer ceramic wall 112ai of the integral ceramic insert heat exchanger 114ai similar to that depicted in FIGS. 1 and 2. Such a configuration can allow for reductions in overall system size and possibly improvements in system efficiency.

Figure 44:
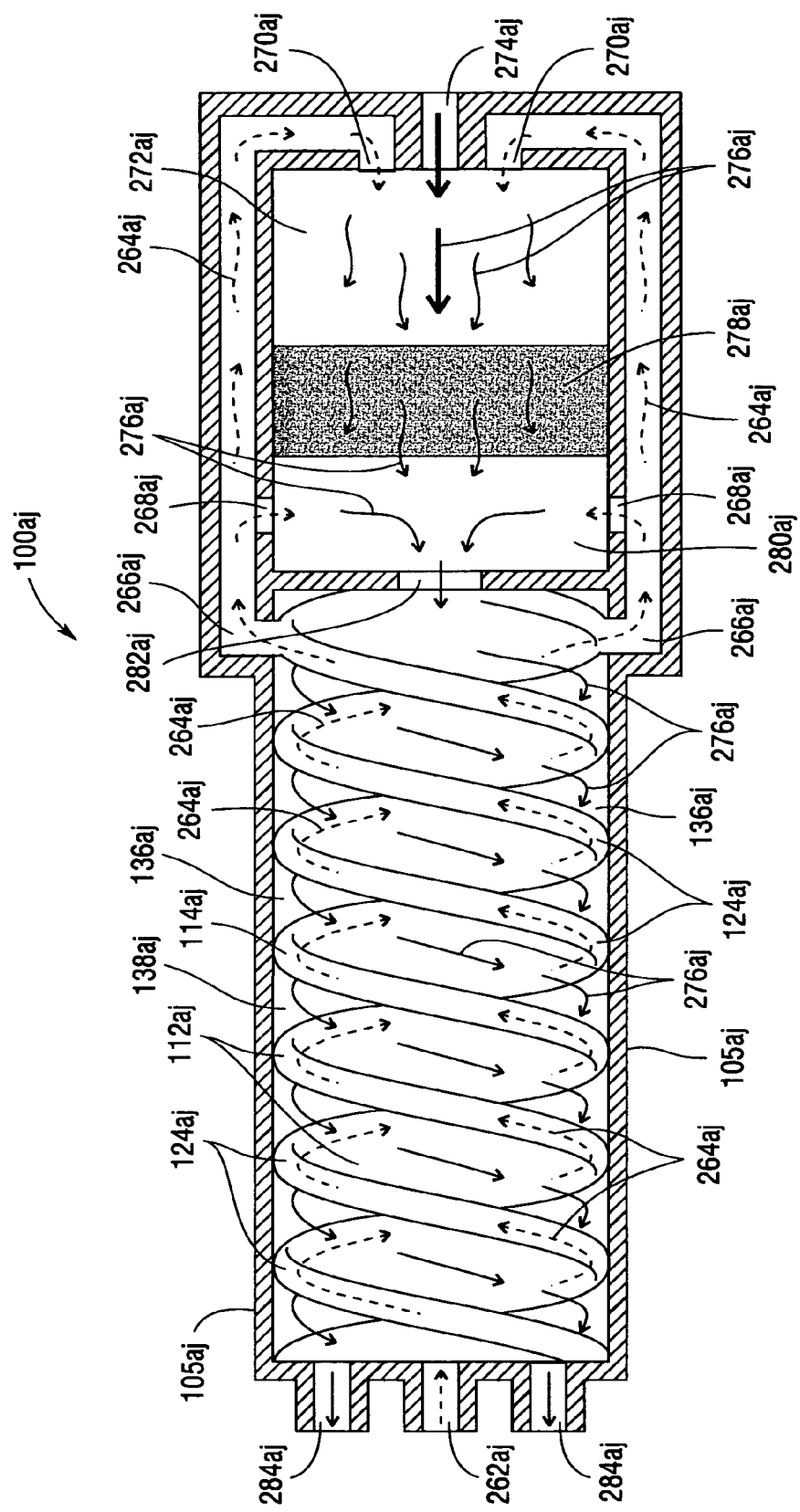
FIG. 44 is a partial side cross sectional view of a heated energy system of the invention.

It will be further appreciated that insert heat exchangers of the invention can also be used with heated energy systems that utilize different types of fuel. For example, FIG. 44 depicts a side cross sectional view of an insert heat exchanger 114aj of the invention incorporated into a heated energy system 100aj that is a catalytic fuel system. An oxidant, which can be atmospheric air, enters the helical, internal ceramic fluent channel 124aj through a cold side inlet 262aj, the oxidant flow pattern 264aj being depicted with dotted arrows in FIG. 44. The oxidant absorbs heat energy from the products of energy generation through the outer ceramic walls 112aj of the insert heat exchanger 114aj as it continues to flow through the fluent channel 124aj. Upon exiting the insert heat exchanger 114aj through hot oxidant manifolds 266aj, some of the heated oxidant is removed through secondary oxidant injection ports 268aj, the remainder of the heated oxidant being manifolded to primary oxidant injection ports 270aj for injection into a fuel chamber 272aj.

A hydrocarbon fuel, such as natural gas, is injected into the fuel chamber 272aj through a fuel injection port 274aj, where the hydrocarbon fuel, mixes with heated oxidant, heating the fuel. The flow pattern of fuel 276aj, as it is mixed with heated oxidant, is depicted with solid arrows in FIG. 44. From the fuel chamber 272aj, the combined mixture of fuel and heated oxidant encounters and permeates a catalytic bed 278aj. The catalytic bed can have many configurations, but typically includes a catalyst material, such as nickel or platinum, which is coated over beads to allow the fuel to and heated oxidant mixture to permeate and penetrate the bed 278aj while interacting with the catalyst material contained therein. The additional heat from the heated oxidant is normally sufficient to allow energy-generating catalytic reactions between the fuel, heated oxidant, and catalyst to initially occur much more efficiently and completely than would occur without such pre-heating, though substantial additional quantities of heat are also generated as a result of the catalytic reactions themselves. The flow pattern of fuel 276aj (solid arrows) also represents the flow of products of energy generation downstream from the catalytic bed 278aj.

After permeating the catalytic bed 278aj, fuel, heated oxidant, and other resulting products of energy generation enter a post-catalytic chamber 280aj, where the collective products are mixed with additional heated oxidant from the secondary oxidant injection port 268aj and are then channeled through a hot side inlet 282aj into the first spiral path 136aj and second spiral path 138aj between the insert heat exchanger 114aj and surrounding fluid path enclosure 105aj. While flowing through the spiral paths 136aj and 138aj, heat energy of the products of energy generation is transferred through the outer ceramic walls 112ai of the insert heat exchanger 114ai to the flowing oxidant in the fluent channel 124aj before the heated products are expelled from the system 100aj through exhaust ports 284aj.

Figure 45:
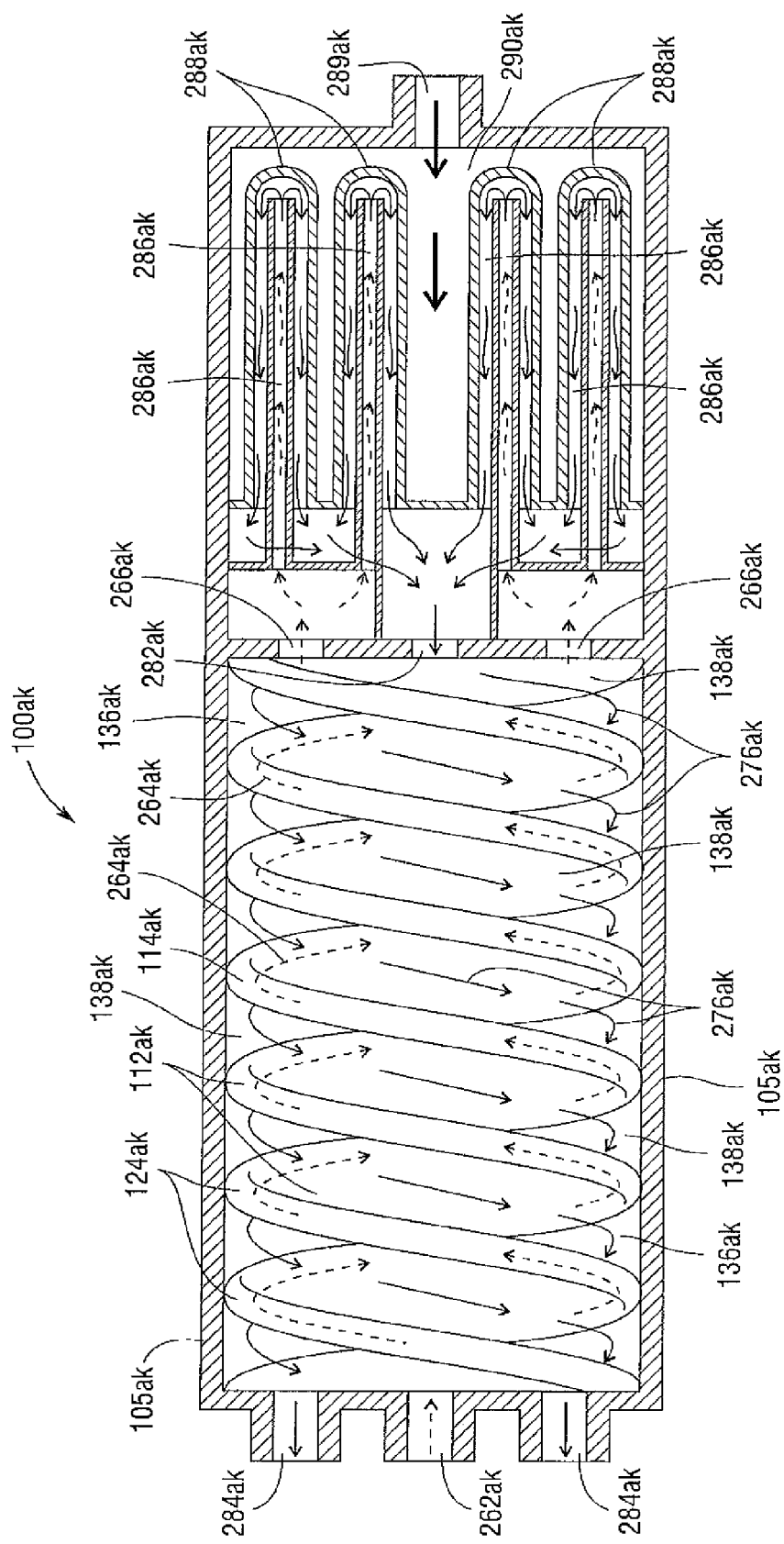
FIG. 45 is a partial side cross sectional view of a heated energy system of the invention.

FIG. 45 depicts a side cross sectional view of an insert heat exchanger 114ak of the invention incorporated into a heated energy system 100ak that is a fuel cell system. An oxidant, which can be atmospheric air, enters the helical, internal ceramic fluent channel 124*ak* through a cold side inlet 262*ak*, the oxidant flow pattern 264*ak* being depicted with dotted arrows. The oxidant absorbs heat energy from the products of energy generation through the outer ceramic walls 112*ak* of the insert heat exchanger 114*ak* as it continues to flow through the fluent channel 124*ak*. Heated oxidant exits the insert heat exchanger 114*ak* through hot oxidant manifolds 266*ak* and is channeled into oxidant feed tubes which further channel the heated oxidant into the fuel cell membranes 288*ak* that are located in a fuel cell chamber 289*ak*.

Hydrogen is injected through a hydrogen port 289*ak* into the fuel cell chamber 289*ak*, where the hydrogen encounters the exterior surfaces of the fuel cell membranes 288*ak*. The flow of hydrogen and the flow of heated oxidant, once supplied to the fuel cell membranes 228*ak*, is represented by solid arrows in FIG. 45. The hydrogen permeates the fuel cell membranes 288*ak*, loosing negatively charged electrons which are used for the generation of energy. Resulting positively charged hydrogen ions then combine with the heated oxidant within the membranes 288*ak* to produce water, heat, and other products of energy generation. The additional heat from the heated oxidant within the fuel cell membranes 228*ak* significantly increases the efficiency and completeness of the reaction between the hydrogen and fuel cell membrane and the combination of the resulting hydrogen ions with the heated oxidant, collectively becoming fuel cell effluents that are products of energy generation.

The fuel cell effluents are subsequently collected at a collection manifold 294*ak* and are then channeled through a hot side inlet 282*ak* into the first spiral path 136*ak* and second spiral path 138*ak* of the insert heat exchanger 114*ak*. While flowing through the spiral paths 136*ak* and 138*ak*, heat energy of the fuel cell effluents is transferred through the outer ceramic walls 112*ak* of the insert heat exchanger 114*ak* to the flowing oxidant in the fluent channel 124*ak* before the effluents are expelled from the system 100*ak* through exhaust ports 284*ak*.

It is contemplated that according to the invention, in some heated energy systems, the surrounding fluid path enclosure in which the insert heat exchanger is located can also be formed of a ceramic material, the surrounding fluid path enclosure being formed and fabricated along with the insert heat exchanger itself. Some contemplated embodiments of the invention also incorporate more sophisticated tooling configurations. For example, FIGS. 46A-D depict a tool 162*al* for simultaneously fabricating an insert heat exchanger and surrounding fluid path enclosure as a unitary ceramic component.

Figure 46A:
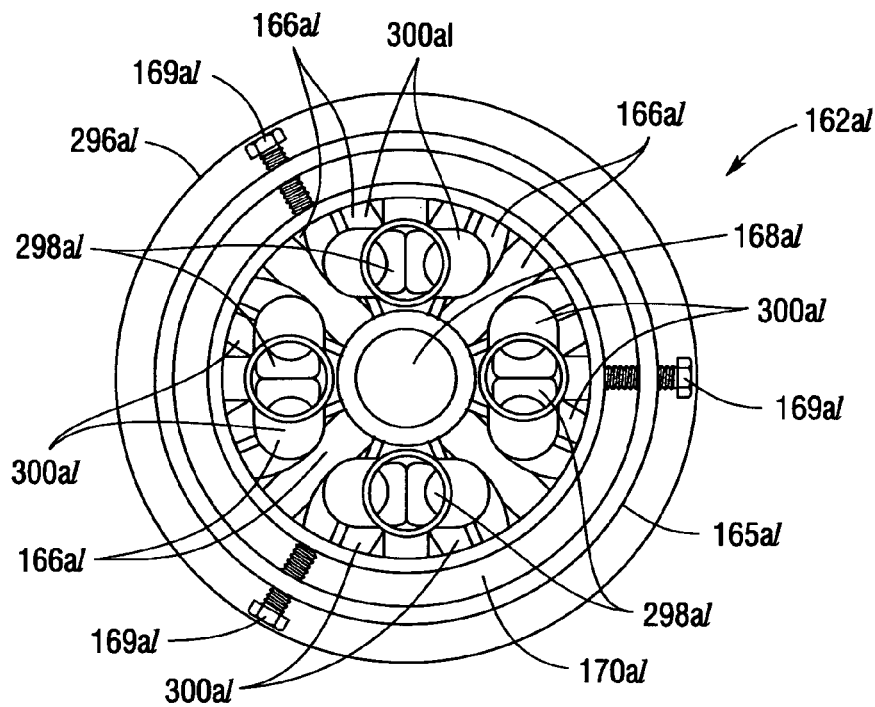
FIG. 46A is a top view of a tool positioned on a funnel tube according to one embodiment of the invention.
Figure 46B:
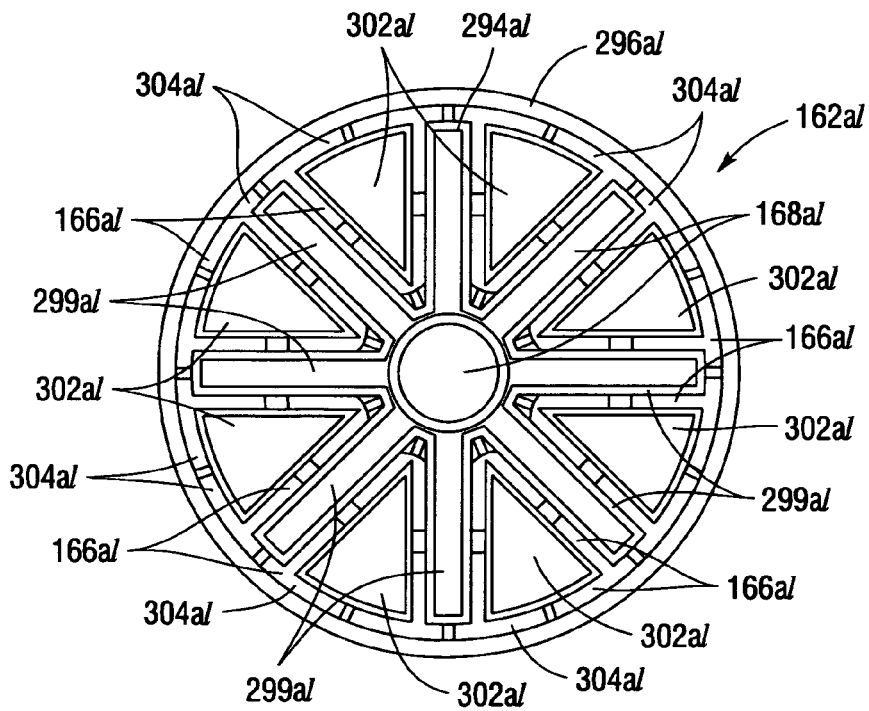
FIG. 46B is a bottom view of the tool of FIG. 46A.

The configuration of the tool 162*al* is best understood by comparing its top view depicted in FIG. 46A, its bottom view, depicted in FIG. 46B, one side view, with outer bell funnel 296*al* removed, depicted in FIG. 46C, and another side view, with outer bell funnel 296*al* shown, depicted in FIG. 46D. A funnel tube 165*al* (not shown in FIGS. 46B-D) supplies cavity fill comprising silicon powder and resin to a cavity channel 168*al*. The cavity channel 168*al* has a circular cross sectional shape near the top of the tool 162*al* but spreads out into eight separate cross sectional cavity wings 299*al* near the bottom of the tool 162*al*.

Near the top of the tool 162*al*, four separate silicon inlets 298*al* receive silicon powder and resin from the funnel tube 165*al*, each silicon inlet 298*al* spreading into two separate silicon chutes 300*al* that each lead to one of eight silicon channels 302*al* at the bottom of the tool 162*al*. Each silicon channel 302*al* is positioned approximately between two adjacent cavity wings 299*al* of the cavity channel 168*al*, but are entirely surrounded by a silicon carbide channel 166*al*, which is generally the space within the outer bell funnel 296*al* that is not occupied by the cavity channel 168*al*, cavity wings 299*al*, silicon inlet 298*al*, silicon chutes 300*al*, or silicon channels 302*al*. A clearance gap 304*al* separates the cavity wings 299*al* and silicon channels 302*al* from the inside surface of the outer bell funnel 296*al* around its entire circumference at the bottom of the tool 162*al*. A reclaim channel 170*al* is provided between the funnel tube 165*al* and outer surface of the bell funnel 296*al*

As best understood by comparing FIGS. 46A-D with FIGS. 47A and B, the tool 162*al* can be used to fabricate an insert heat exchanger 114*al* of the invention in which a surrounding fluid path enclosure 105*al* is fabricated with the heat exchanger 114*al* as part of a unitary ceramic component 306*al*. FIG. 47A depicts an exterior perspective view such a fabricated unitary ceramic component 306*al* as manufactured by the tool 162*al*. For comparison, FIG. 47B depicts an interior view of the unitary ceramic component 306*al* with its surrounding fluid path enclosure 105*al* removed.

The fabrication of a unitary ceramic component 306*al* of FIGS. 47A and B, involves using the tool 162*al* and funnel tube 165*al* with an appropriate forming machine (not shown), which typically includes roller wheels (not shown in FIGS. 46A-47B) and a container for receiving cavity fill, silicon powder, silicon carbide powder, resin, and loose fill, similar to those of FIGS. 12A-19B. This fabrication is best understood by comparing FIGS. 47A and B with FIGS. 26A-C, noting the fabrication process discussed above with respect to FIGS. 12A-19B. Roller wheels of a forming machine are rotated on their orientation mountings to allow the funnel tube 165*al* and tool 162*al* to be lowered vertically along a rotational axis, without being rotated, into the container until the tool 162*al* contacts the container bottom.

Without rotating the roller wheels on their orientation mountings, the tool 162*al* is raised from contact with the container bottom 210*e* about along the rotational axis. As the tool 162*al* and funnel tube 165*al* are raised, cavity fill of silicon powder and resin flows through the cavity channel 168*al* and its wings 299*al*, silicon carbide powder and resin flows through the silicon carbide channel 166*al*, silicon powder and resin flows through each of the silicon inlets 298*al*, silicon chutes 300*al*, and silicon channels 302*al*, and loose fill flows through the reclaim channel 170*al* and outside the bell funnel 296*al* into the container. The tool 162*al* and funnel tube 165*al* continue to be raised a short distance without the changing pitch angles of the roller wheels so that a segment of the resulting columns of cavity fill, silicon carbide and resin, and silicon and resin are non helical in shape. An outer enclosure layer of silicon carbide powder and resin is also formed as part of the column of silicon carbide powder and resin due to the flow of silicon carbide powder and resin through the clearance gap 304*al*.

As best understood by comparing FIGS. 47A and B, after heating the columns of cavity fill, silicon carbide powder and resin, and silicon powder and resin first to a resin binding temperature and then to silicon-melting and silicon wicking temperatures, a surrounding fluid path enclosure 105*al* is formed around the resulting insert heat exchanger 114*al*, the surrounding fluid path enclosure 105*al* being depicted in FIG. 47A as part of the resulting unitary ceramic component 306*al*. Referring to the interior view of the unitary ceramic component 306*al* shown without the surrounding fluid path enclosure 105*al* in FIG. 47B, the non-rotation of the tool 162*al* about the rotational axis also results in a bottom non-helical segment 308*al* of the insert heat exchanger 114*al* being formed. Evacuation and wicking of silicon powder and/or cavity fill during heating also allows for the creation of an eight-winged fluent channel 124*al*.

After raising the tool 162*al* and funnel tube 165*al* sufficiently to create columns of cavity fill, silicon carbide and resin, and silicon and resin that will result in the bottom non-helical segment 308*al* of the insert heat exchanger 114*al*, the roller wheels are then rotated on their orientation mountings to a common, selected orientation angle. This allows for the creation of helical segments of the columns of cavity fill, silicon carbide powder and resin, and silicon powder and resin, which ultimately results in the creation of a helical main segment 310*al* of the insert heat exchanger 114*al* having eight spiral paths 312*al* for the flowing products of energy generation, the eight-winged fluent channel 124*al* also being helical. The tool 162*al* and funnel tube 165*al* continue to be rotated about the rotational axis until the columns of cavity fill, silicon carbide powder and resin, and silicon powder and resin are sufficiently long to produce the desired length of the helical main segment 310*al*. The roller wheels are then rotated again to allow the tool 162*al* and funnel tube 165*al* to be raised without being rotated about the rotational axis to allow for the eventual creation of the top non-helical segment 314*al*. Bottom ceramic layers 316*al* and top ceramic layers 320*al* are added to enclose the fluent channel 124*al* and a bottom manifold 318*al* and top manifold 322*al* are added to channel heat transfer fluid in and out of the insert heat exchanger 114*al*.

Figure 48B:
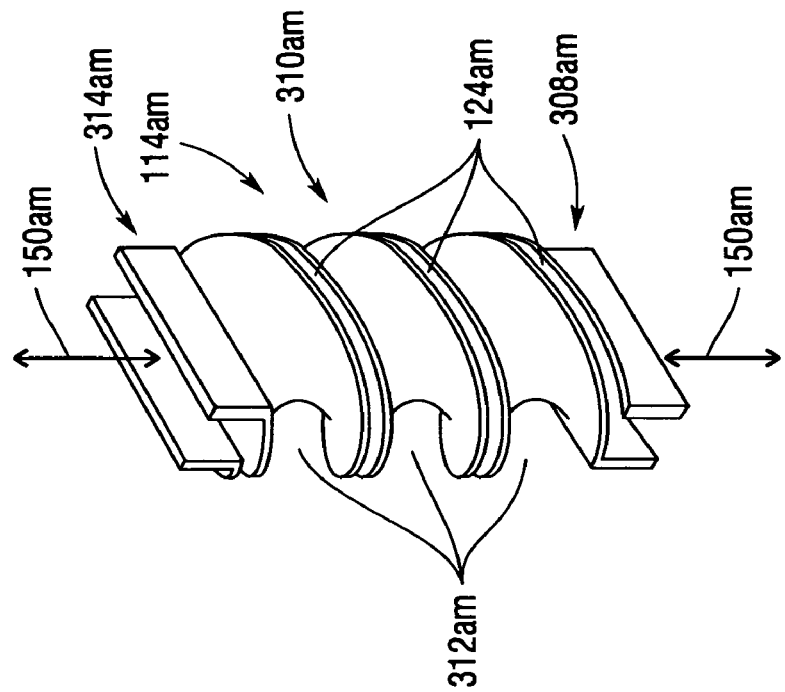
FIG. 48B depicts an interior view of the unitary ceramic component of FIG. 48A with its surrounding fluid path enclosure removed.

It will be further appreciated that simpler unitary ceramic components can also be constructed with a surrounding fluid path enclosure. For example, FIGS. 48A and B depict a configuration according to the invention in which a two-wing insert heat exchanger 114*am* and surrounding fluid path enclosure 105*am* are formed into a unitary ceramic component 306*am*. Referring to the interior view of the unitary ceramic component 306*am* in FIG. 48B depicting the insert heat exchanger 114*am* without the surrounding fluid path enclosure 105*am*, the insert heat exchanger 114*am* is limited to two spiral paths 312*am* for the products of energy generation. Though simpler tooling is required due to a reduced number of heat exchanger wings, the bottom non-helical segment 308*am*, helical main segment 310*am*, and top non-helical segment 314*am* are all created by rotating roller wheels on their orientation mountings to selectively cause tool rotation or non-rotation about a rotational axis during the fabrication process in a manner analogous to that described with respect to FIGS. 47A and B above.

Figure 48A:
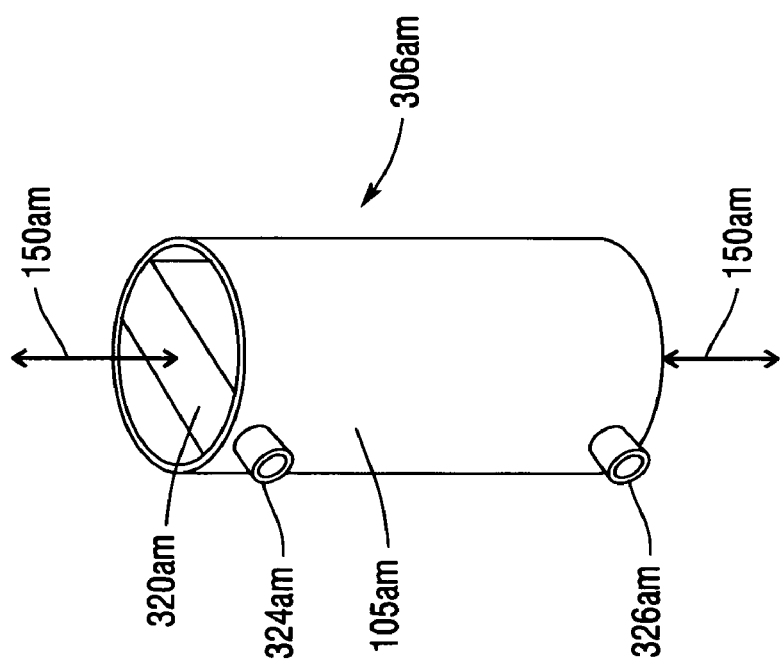
FIG. 48A depicts an exterior perspective view of a unitary ceramic component fabricated according to one embodiment of the invention.

Comparing the view of the unitary ceramic component 306*am* in FIG. 48A that includes the surrounding fluid path enclosure 105*am* with FIG. 47B, a top side-extending manifold 324*am* is added to extend from the top non-helical segment 314*am* of the insert heat exchanger 114*am* through the surrounding fluid path enclosure 105*am* rather than extending through the top ceramic layer 320*am* that is added to enclose the fluent channel 124*am*. A bottom side-extending manifold 326*am* is similarly added to extend from the bottom non-helical segment 308*am* of the insert heat exchanger 114*am* through the surrounding fluid path enclosure 105*am*.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

What is claimed is:

1. An integral ceramic insert heat exchanger for a heated energy system, the energy system including a fluid path for products of energy generation that is located within a surrounding fluid path enclosure, said heat exchanger comprising:

an insert body, said insert body having an integral ceramic construction having an outer ceramic wall that is helical in shape and allows for the conductive transfer of heat therethrough, said outer ceramic wall forming, when said heat exchanger is positioned within the surrounding fluid path enclosure, at least one spiral path between the surrounding fluid path enclosure and said outer ceramic wall for flowing products of energy generation;

said insert body being located along a first length of the surrounding fluid path enclosure, no more than one insert body being present along said first length of the surrounding fluid path enclosure, said outer ceramic wall of said insert body positioned to be exposed to the products of energy generation and to allow said insert body to receive heat energy from the products of energy generation when the products of energy generation flow through said at least one spiral path;

said outer ceramic wall defining a hollow helical internal ceramic fluent channel within said insert body;

said insert body including a fluid inlet to allow for the entry of a heat transfer fluid therein to said fluent channel to allow for the absorption of heat energy produced by products of energy generation through said insert body to the heat transfer fluid, and a fluid outlet from said fluent channel to allow for the expulsion of the heat transfer fluid after the heat transfer fluid has absorbed the heat energy through said insert body in said fluent channel;

said fluent channel having an inter path divider with a parallel flow path and a counter flow path along the length of said insert body in which one of said parallel flow path or said counter flow path defines a central or straight flow path along the central axis of said insert body and the other has a substantially flat cross section extending from said central axis; and said fluid inlet, said fluent channel, and said fluid outlet being positioned to allow the heat transfer fluid to absorb heat energy produced by products of energy generation of said heated energy system without allowing the products of energy generation to come into contact with the heat transfer fluid before the heat transfer fluid is expelled from said fluid outlet.

2. The integral ceramic insert heat exchanger of claim 1, said heat exchanger being included as part of a heated energy system that includes a combustion chamber, the products of energy generation being the products of combustion from a combustion process occurring within the combustion chamber.

3. The integral ceramic insert heat exchanger of claim 1, said heat exchanger being included as part of a heated energy system that includes a radiant tube, the products of energy generation being the products of combustion from a combustion process occurring within the radiant tube.

4. The integral ceramic insert heat exchanger of claim 1, said heat exchanger being included as part of a heated energy system that includes a fuel cell, the products of energy generation being the products of the fuel cell reaction occurring within the fuel cell.

5. The integral ceramic insert heat exchanger of claim 1, said heat exchanger being included as part of a heated energy system that includes a catalytic system, the products of energy generation being the products of the catalytic reaction occurring within the catalytic system.

6. The integral ceramic insert heat exchanger of claim 1, said fluent channel having a helical shape.

7. The integral ceramic insert heat exchanger of claim 1, said fluent channel having a non-helical shape.

8. The integral ceramic insert heat exchanger of claim 1, said insert body having two helical wings.

9. The integral ceramic insert heat exchanger of claim 1, said ceramic construction of said insert body comprising silicon carbide.

10. The integral ceramic insert heat exchanger of claim 1, said ceramic construction of said insert body comprising siliconized silicon carbide.

11. The integral ceramic insert heat exchanger of claim 1, said ceramic construction of said insert body comprising sintered silicon carbide.

12. The integral ceramic insert heat exchanger of claim 1, said ceramic construction of said insert body comprising reaction-bonded silicon carbide.

13. The integral ceramic insert heat exchanger of claim 1, said ceramic construction of said insert body comprising nitrate-bonded silicon carbide.

14. The integral ceramic insert heat exchanger of claim 1, said fluid outlet being manifolded to channel the heat transfer fluid away from the heated energy system to prevent the heat transfer fluid from coming into contact with the products of energy generation before the heat transfer fluid is expelled from the heated energy system.

15. The integral ceramic insert heat exchanger of claim 1, said fluid outlet being manifolded to channel at least a portion of the heat transfer fluid back into the heated energy system, after the heat transfer fluid has been expelled from said fluid outlet, to be in contact with and transfer heat energy to the products of energy generation when the products of energy generation flow through at least one of said at least one fluid path.

16. The integral ceramic insert heat exchanger of claim 1, said fluid outlet being manifolded to channel at least a portion of the heat transfer fluid back into the heated energy system, after the heat transfer fluid has been expelled from said fluid outlet, to be in contact with and transfer heat energy to fuel of the heated energy system prior to the use of the fuel for energy generation.

17. The integral ceramic insert heat exchanger of claim 1, said insert body and said surrounding fluid enclosure being formed as a unitary ceramic component.

18. The integral ceramic insert heat exchanger of claim 1 further comprising said substantially flat cross section extending from said central axis comprises two wings extending from said central axis.

19. An integral ceramic insert heat exchanger for a heated energy system, the energy system including a fluid path for products of energy generation that is located within a surrounding fluid path enclosure, said heat exchanger comprising:

an insert body, said insert body having an integral ceramic construction having an outer ceramic wall that is helical in shape and said outer ceramic wall defining a hollow helical internal ceramic fluent channel that allows for the conductive transfer of heat therethrough, said outer ceramic wall forming, when said insert is positioned within the surrounding fluid path enclosure, at least one spiral path of said integral ceramic construction for flowing products of energy generation;

said insert body being located along a first length of the surrounding fluid path enclosure, no more than one insert body having an outer wall that is helical in shape being present along said first length of the surrounding fluid path enclosure, said outer ceramic wall of said insert body positioned to be exposed to the products of energy generation and to allow said insert body to receive heat energy from the products of energy generation when the products of energy generation flow through said at least one fluid path;

said insert body including a fluid inlet to allow for the entry of a heat transfer fluid therein to said fluent channel to allow for the absorption of heat energy produced by products of energy generation through said insert body to the heat transfer fluid, and a fluid outlet from said fluent channel to allow for the expulsion of the heat transfer fluid after the heat transfer fluid has absorbed the heat energy through said insert body in said fluent channel;

said fluent channel having an inter path divider with a parallel flow path and a counter flow path along the length of said insert body in which one of said parallel flow path or said counter flow path defines a central or straight flow path along the central axis of said insert body and the other has a substantially flat cross section extending from said central axis; and said fluid inlet, said fluent channel, and said fluid outlet being positioned to allow the heat transfer fluid to absorb heat energy produced by products of energy generation of said heated energy system without allowing the products of energy generation to come into contact with the heat transfer fluid before the heat transfer fluid is expelled from said fluid outlet.

20. The integral ceramic insert heat exchanger of claim 19, said heat exchanger being included as part of a heated energy system that includes a combustion chamber, the products of energy generation being the products of combustion from a combustion process occurring within the combustion chamber system.

21. The integral ceramic insert heat exchanger of claim 19, said heat exchanger being included as part of a heated energy system that includes a radiant tube, the products of energy generation being the products of combustion from a combustion process occurring within the radiant tube.

22. The integral ceramic insert heat exchanger of claim 19, said heat exchanger being included as part of a heated energy system that includes a fuel cell, the products of energy generation being the products of the fuel cell reaction occurring within the fuel cell.

23. The integral ceramic insert heat exchanger of claim 19, said heat exchanger being included as part of a heated energy system that includes a catalytic system, the products of energy generation being the products of the catalytic reaction occurring within the catalytic system.

24. The integral ceramic insert heat exchanger of claim 19, said fluent channel having a helical shape.

25. The integral ceramic insert heat exchanger of claim 19, said fluent channel having a non-helical shape.

26. The integral ceramic insert heat exchanger of claim 19, said insert body having two helical wings.

27. The integral ceramic insert heat exchanger of claim 19, said ceramic construction of said insert body comprising silicon carbide.

28. The integral ceramic insert heat exchanger of claim 19, said ceramic construction of said insert body comprising siliconized silicon carbide.

29. The integral ceramic insert heat exchanger of claim 19, said ceramic construction of said insert body comprising sintered silicon carbide.

30. The integral ceramic insert heat exchanger of claim 19, said ceramic construction of said insert body comprising reaction-bonded silicon carbide.

31. The integral ceramic insert heat exchanger of claim 19, said ceramic construction of said insert body comprising nitrate-bonded silicon carbide.

32. The integral ceramic insert heat exchanger of claim 19, said fluid outlet being manifolded to channel the heat transfer fluid away from the heated energy system to prevent the heat transfer fluid from coming into contact with the products of energy generation before the heat transfer fluid is expelled from the heated energy system.

33. The integral ceramic insert heat exchanger of claim 19, said fluid outlet being manifolded to channel at least a portion of the heat transfer fluid back into the heated energy system, after the heat transfer fluid has been expelled from said fluid outlet, to be in contact with and transfer heat energy to the products of energy generation when the products of energy generation flow through at least one of said at least one fluid path.

34. The integral ceramic insert heat exchanger of claim 19, said fluid outlet being manifolded to channel at least a portion of the heat transfer fluid back into the heated energy system, after the heat transfer fluid has been expelled from said fluid outlet, to be in contact with and transfer heat energy to fuel of the heated energy system prior to the use of the fuel for energy generation.

35. The integral ceramic insert heat exchanger of claim 19, said insert body and said surrounding fluid enclosure being formed as a unitary ceramic component.

36. The integral ceramic insert heat exchanger of claim 19 further comprising said substantially flat cross section extending from said central axis comprises two wings extending from said central axis.

37. A heated energy system comprising:
a fluid path for products of energy generation and a surrounding fluid path enclosure;
an integral ceramic insert heat exchanger, said heat exchanger having an insert body, said insert body having an integral ceramic construction having an outer ceramic wall that is helical in shape and said outer ceramic wall defining a hollow helical internal ceramic fluent channel that allows for the conductive transfer of heat there through, said outer ceramic wall forming, when said insert body is positioned within the surrounding fluid path enclosure, at least one spiral path of said integral ceramic construction for flowing products of energy generation;
said insert body being located along a first length of the surrounding fluid path enclosure, no more than one insert body being present along said first length of the surrounding fluid path enclosure, said outer ceramic wall of said insert body positioned to be exposed to the products of energy generation and to allow said insert body to receive heat energy from the products of energy generation when the products of energy generation flow through said at least one fluid path;
said insert body including a fluid inlet to allow for the entry of a heat transfer fluid therein to said fluent channel to allow for the absorption of heat energy produced by products of energy generation through said insert body to the heat transfer fluid, and a fluid outlet from said fluent channel to allow for the expulsion of the heat transfer fluid after the heat transfer fluid has absorbed the heat energy through said insert body in said fluent channel;
said fluent channel having an inter path divider with a parallel flow path and a counter flow path along the length of said insert body in which one of said parallel flow path or said counter flow path defines a central or straight flow path along the central axis of said insert body and the other has a substantially flat cross section extending from said central axis; and
said fluid inlet, said fluent channel, and said fluid outlet being positioned to allow the heat transfer fluid to absorb heat energy produced by products of energy generation of said heated energy system without allowing the products of energy generation to come into contact with the heat transfer fluid before the heat transfer fluid is expelled from said fluid outlet.

38. The heated energy system of claim 37, said heated energy system including a combustion chamber, the products of energy generation being the products of combustion from a combustion process occurring within the combustion chamber.

39. The heated energy system of claim 37, said heated energy system including a radiant tube, the products of energy generation being the products of combustion from a combustion process occurring within the radiant tube.

40. The heated energy system of claim 37, said heated energy system including a fuel cell system, the products of energy generation being the products of the fuel cell reaction occurring within the fuel cell.

41. The heated energy system of claim 37, said heated energy system including a catalytic system, the products of energy generation being the products of the catalytic reaction occurring within the catalytic system.

42. The heated energy system of claim 37, said fluent channel of said insert body having a helical shape.

43. The heated energy system of claim 37, said fluent channel of said insert body having a non-helical shape.

44. The heated energy system of claim 37, said insert body having two helical wings.

45. The heated energy system of claim 37, said integral ceramic construction of said insert body comprising silicon carbide.

46. The heated energy system of claim 37, said integral ceramic construction of said insert body comprising siliconized silicon carbide.

47. The heated energy system of claim 37, said integral ceramic construction of said insert body comprising sintered silicon carbide.

48. The heated energy system of claim 37, said integral ceramic construction of said insert body comprising reaction-bonded silicon carbide.

49. The heated energy system of claim 37, said integral ceramic construction of said insert body comprising nitrate-bonded silicon carbide.

50. The heated energy system claim 37, said fluid outlet being manifolded to channel the heat transfer fluid away from said heated energy system to prevent the heat transfer fluid from coming into contact with the products of energy generation before the heat transfer fluid is expelled from said heated energy system.

51. The heated energy system of claim 37, said fluid outlet being manifolded to channel at least a portion of the heat transfer fluid back into said heated energy system, after the heat transfer fluid has been expelled from said fluid outlet, to be in contact with and transfer heat energy to the products of energy generation when the products of energy generation flow through at least one of said at least one fluid path.

52. The heated energy system of claim 37, said fluid outlet being manifolded to channel at least a portion of the heat transfer fluid back into said heated energy system, after the heat transfer fluid has been expelled from said fluid outlet, to be in contact with and transfer heat energy to fuel of said heated energy system prior to the use of the fuel for energy generation.

53. The heated energy system of claim 37, said insert body and said surrounding fluid enclosure being formed as a unitary ceramic component.

54. The heated energy system of claim 37 further comprising said substantially flat cross section extending from said central axis comprises two wings extending from said central axis.

* * * * *